US 8,249,981 B2

(12) United States Patent
Keenan et al.

(10) Patent No.: US 8,249,981 B2
(45) Date of Patent: Aug. 21, 2012

(54) METHODS AND SYSTEMS FOR GENERATING TRANSITION PROBABILITY MATRICES THROUGH AN OPTIMIZATION FRAMEWORK

(75) Inventors: Sean Coleman Keenan, Norwalk, CT (US); Vishwanath Avasarala, Schenectady, NY (US); Jason Wayne Black, Clifton Park, NY (US); Kete Chalermkraivuth, Niskayuna, NY (US); John Andrew Ellis, Niskayuna, NY (US); Radu Neagu, Niskayuna, NY (US); Rajesh Venkat Subbu, Clifton Park, NY (US); Jingjiao Zhang, Seattle, WA (US); David Chienju Li, Forest Hills, NY (US)

(73) Assignee: GE Corporate Financial Services, Inc., Norwalk, CT (US)

( * ) Notice: Subject to any disclaimer, the term of this patent is extended or adjusted under 35 U.S.C. 154(b) by 806 days.

(21) Appl. No.: 12/336,360

(22) Filed: Dec. 16, 2008

(65) Prior Publication Data
US 2011/0246386 A9  Oct. 6, 2011

(51) Int. Cl.
G06Q 40/00 (2006.01)
(52) U.S. Cl. .................. 705/38; 705/36 R; 705/35
(58) Field of Classification Search ............ 705/35, 705/36 R, 40
See application file for complete search history.

(56) References Cited

U.S. PATENT DOCUMENTS

| | | | |
|---|---|---|---|
| 6,078,903 A | 6/2000 | Kealhofer | |
| 6,085,175 A | 7/2000 | Gugel et al. | |
| 6,249,775 B1 | 6/2001 | Freeman et al. | |
| 7,010,510 B1 | 3/2006 | Schellhorn | |
| 7,020,631 B2 | 3/2006 | Freeman et al. | |
| 7,050,999 B1 | 5/2006 | Ota | |
| 7,171,385 B1 | 1/2007 | Dembo et al. | |
| 7,236,951 B2 | 6/2007 | Lipton et al. | |
| 7,277,869 B2 | 10/2007 | Starkman | |
| 7,313,541 B2 | 12/2007 | Wise et al. | |
| 2002/0116325 A1 | 8/2002 | Wise et al. | |
| 2003/0135448 A1 | 7/2003 | Aguias et al. | |
| 2003/0135450 A1 | 7/2003 | Aguais et al. | |
| 2003/0208431 A1 | 11/2003 | Raynes et al. | |
| 2004/0111363 A1 | 6/2004 | Trench et al. | |
| 2004/0236657 A1 | 11/2004 | Sinha et al. | |
| 2005/0021452 A1 | 1/2005 | Lipton et al. | |
| 2005/0027645 A1 | 2/2005 | Lui et al. | |

(Continued)

OTHER PUBLICATIONS

J.P. Morgan, "CreditMetrics—Technical Document"; Apr. 2, 1997, New York, 200 pages.

*Primary Examiner* — James Vezeris
(74) *Attorney, Agent, or Firm* — Armstrong Teasdale LLP

(57) ABSTRACT

A method for generating an optimized transition probability matrix (OTPM) is provided. The method is performed using a computer system coupled to a database. The method includes storing in the database financial data including obligor credit ratings, generating multi-period empirical transition probability matrices (ETPMs) for a selected time horizon using the financial data stored within the database, generating a mathematical expression to minimize a difference between target ETPM values and candidate OTPM values, and calculating the OTPM from the generated mathematical expression and the financial data stored within the database, wherein the calculated OTPM includes a first set of optimized transition probability values for predicting a likelihood that a credit rating of an obligor will migrate from one credit state to another credit state during a first time interval in the future.

51 Claims, 25 Drawing Sheets

U.S. PATENT DOCUMENTS

| | | |
|---|---|---|
| 2005/0080704 A1 | 4/2005 | Erlach et al. |
| 2005/0144117 A1 | 6/2005 | Misra et al. |
| 2005/0209959 A1 | 9/2005 | Tenney |
| 2006/0195373 A1 | 8/2006 | Flaxer et al. |
| 2006/0195391 A1 | 8/2006 | Stanelle |
| 2007/0027786 A1 | 2/2007 | Lipton et al. |
| 2007/0124227 A1 | 5/2007 | Dembo et al. |
| 2009/0276234 A1* | 11/2009 | Metz ............................ 705/1 |

* cited by examiner

FIG. 18

|     | AAA    | AA     | A      | BBB    | BB     | B      | CCC    | C      | D      |
|-----|--------|--------|--------|--------|--------|--------|--------|--------|--------|
| AAA | 91.48% | 6.77%  | 1.46%  | 0.13%  | 0.12%  | 0.01%  | 0.01%  | 0.00%  | 0.02%  |
| AA  | 4.84%  | 79.12% | 10.92% | 3.74%  | 0.84%  | 0.19%  | 0.17%  | 0.07%  | 0.11%  |
| A   | 1.17%  | 13.58% | 68.42% | 13.26% | 2.60%  | 0.35%  | 0.32%  | 0.05%  | 0.26%  |
| BBB | 0.20%  | 1.76%  | 8.61%  | 73.39% | 11.67% | 3.13%  | 0.66%  | 0.21%  | 0.37%  |
| BB  | 0.10%  | 0.30%  | 2.39%  | 12.72% | 66.07% | 9.91%  | 3.87%  | 3.60%  | 1.04%  |
| B   | 0.09%  | 0.09%  | 0.11%  | 0.11%  | 11.97% | 58.96% | 21.30% | 2.31%  | 5.06%  |
| CCC | 0.03%  | 0.13%  | 0.20%  | 0.20%  | 0.25%  | 6.85%  | 63.74% | 16.76% | 11.83% |
| C   | 0.02%  | 0.02%  | 0.15%  | 0.88%  | 1.35%  | 2.03%  | 13.55% | 48.78% | 33.22% |

CASE 1

CASE 2

CASE 3

CASE 4

CASE 5

CASE 6

CASE 2

CASE 5

METHODS AND SYSTEMS FOR GENERATING TRANSITION PROBABILITY MATRICES THROUGH AN OPTIMIZATION FRAMEWORK

BACKGROUND OF THE INVENTION

This invention relates generally to calculating credit migration for an obligor over a given time horizon and, more particularly, to network-based methods and systems for calculating an optimized transition probability matrix for more accurately predicting a likelihood that a credit rating of an obligor will migrate from one credit state to another credit state over a given time horizon.

Commercial lenders generally engage in the business of providing financing to individuals and other business entities, generally referred to as obligors, by using financial instruments that include standard loans as well as structured finance products and corporate bonds. Many of these obligors are assigned a letter-based rating grade or some other type of credit rating that is representative of the commercial obligors' credit worthiness. These credit rating grades for an obligor may shift, or migrate, over time as financial conditions associated with each obligor vary. For example, if a particular commercial obligor has an initial credit rating of AAA assigned via Standard and Poor's rating system, the credit rating may temporarily shift downward to a AA rating, and then return to a AAA rating thereafter over a certain time horizon. Also, for example, there may be a finite possibility that a commercial obligor with an initial credit rating of AAA may transition to a default rating over a certain time horizon. These credit rating shifts may result from changes in the financial condition of the obligor, changes in the financial conditions of the overall market or a combination of many financial factors. Also, a commercial lender will typically have a plurality of obligors in a portfolio.

Transition probability matrices (TPMs), which indicate a likelihood of an obligor's credit rating migrating from one credit state to another credit state over a given time horizon, have been used in various credit applications ranging from pricing of financial instruments, loan evaluation, portfolio risk analysis, and economic capital assessment. Typically, these TPMs are initially constructed from historical, or empirical credit ratings data. Moreover, the standard methodology for calculating TPMs includes using a discrete, cohort approach, and often employs using two assumptions that include, firstly, the TPMs follow a first-order Markov process, or Markov chain, and that, secondly, the data inherently includes a predetermined homogeneity.

In general, TPMs typically have a rectangular, tabular structure that is at least partially representative of a range of discrete credit ratings. Each credit rating includes an associated numerical value that is representative of an estimated future transition probability of a rating migration from a first credit rating to a second credit rating within the period the TPM was calculated for. Such a TPM also includes values that are representative of a probability of the associated obligor's credit rating remaining static in that period. Moreover, such a TPM likely includes a "default" state, wherein the default state indicates a probability that an obligor may default in that period on the associated financial instrument, or a plurality of instruments. Such an estimated default probability provides a lender with an estimated probability of default associated with a particular group of obligors. Specifically, a financial portfolio of all obligors, a financial portfolio of a particular group of obligors, or a financial portfolio of a single obligor is multiplied by a TPM to generate a risk forecast associated with the associated portfolio.

In addition, a range of estimated transition probabilities across a range of credit ratings provides some measure of estimated credit rating transition rates for a lender. These values provide commercial lenders with at least some data that can be used to predict whether a particular obligor will transition from one credit rating to another including a default credit rating so that the lender can decide whether to provide a particular financial instrument to the obligor, determine an extent of financing to be provided to the obligor, and determine a financing rate that is at least partially reflective of the associated risk.

Empirical TPMs, or ETPMs, are TPMs generated from empirical (i.e., known historical data) rating and rating transition data, and are published regularly by rating agencies over several years. These ETPMs are typically generated and published for a one-year forecast. Users of these ETPMs have tended to use these published matrices either directly, or after applying one of several smoothing techniques. A need for such smoothing is typically due to imprecise characteristics of empirical matrices that include a tendency for these ETPMs to be affected by idiosyncratic historical events, a sparse data population for plausible future scenarios, and/or vintage effects induced by the temporal location of the underlying data relative to the credit cycle.

Moreover, ETPMs are often required for use over time periods longer than the widely published one-year time horizon. While ETPMs can be constructed over any time horizon, longer time horizon calculations typically reduce sample size, thereby exacerbating idiosyncratic effects in proportion to less idiosyncratic effects and subsequently generating an ETPM with distorted values. Using the aforementioned smoothing techniques may help to reduce the distortions, but such smoothing techniques do not generate a matrix that will accurately predict transition probabilities for an obligor over a multi-year time horizon. Accordingly, many lenders use standard methods of applying one-year ETPMs iteratively, or more specifically, multiplying the one-year ETPM by itself for a discrete number of periods. Such a matrix raised to a specific power corresponding to the number of periods generates probability values for rating transition drift over multi-year horizons. One of the consequences of this method is that in practice, as the time horizon increases, an estimation "bias" induced by shortages in sample sizes is introduced into generation of the TPMs. Such estimation "bias" may be propagated throughout the entire matrix and may potentially undermine the validity and usefulness of these ETPMs. For example, monotonicity and/or smoothness of the resultant ETPM may not meet predetermined standards.

At least one known use of TPMs is described in a technical document entitled *Credit Metrics*™ by J.P. Morgan & Co., Incorporated (1997). *Credit Metrics*™ describes an approach of working backwards from a cumulative default table to create an implied transition matrix. Specifically, the *Credit Metrics*™ document describes creating a transition matrix using a least-squares fit to the cumulative default rates. *Credit Metrics*™, however, only describes using a simple least-square function for measuring a "fit" to historical data. *Credit Metrics*™ does not describe using any other functions, and as discussed below, a simple least-square function does not include all of the desired properties for generating an algorithm that optimizes the "fit" to historical data. In addition, *Credit Metrics*™ only describes fitting the cumulative default rates, and does not describe fitting the whole TPM. The approach described in *Credit Metrics*™ does not allow for adjusting a desired area in a TPM (e.g., upgrade/downgrade, default, volatility), it does not describe time weights, and it does not mention a technique for solving a large scale problem such as a 23×23 matrix.

Accordingly, it would be desirable to provide a process and/or a system that enables a lender to generate a TPM that more accurately models historical data such as obligors' credit ratings and credit migrations over a period of time, and more accurately predicts a future migration of an obligor's credit rating over a multi-year period of time.

BRIEF DESCRIPTION OF THE INVENTION

In one aspect, a method for generating an optimized transition probability matrix (OTPM) is provided. The method is performed using a computer system coupled to a database. The method includes storing in the database financial data including obligor credit ratings, generating multi-period empirical transition probability matrices (ETPMs) for a selected time horizon using the financial data stored within the database wherein each generated ETPM includes transition probability values indicating a likelihood that a credit rating of an obligor will migrate from one credit state to another credit state during a time period included within the selected time horizon and the transition probability values included within the generated ETPMs are defined as target ETPM values, generating a mathematical expression to minimize a difference between target ETPM values and candidate OTPM values wherein the mathematical expression is generated using an objective function including at least one of a probit transform function and an exponential function and by applying predetermined constraints to the objective function, and calculating the OTPM from the generated mathematical expression and the financial data stored within the database, wherein the calculated OTPM includes a first set of optimized transition probability values for predicting a likelihood that a credit rating of an obligor will migrate from one credit state to another credit state during a first time interval in the future.

In another aspect, a system for generating an optimized transition probability matrix (OTPM) is provided. The system includes a computer coupled to a database. The computer is configured to store within the database financial data including obligor credit ratings, generate multi-period empirical transition probability matrices (ETPMs) for a selected time horizon using the financial data stored within the database wherein each generated ETPM includes transition probability values indicating a likelihood that a credit rating of an obligor will migrate from one credit state to another credit state during a time period included within the selected time horizon and the transition probability values included within the generated ETPMs are defined as target ETPM values, generate a mathematical expression to minimize a difference between target ETPM values and candidate OTPM values wherein the mathematical expression is generated using an objective function including at least one of a probit transform function and an exponential function, and by applying predetermined constraints to the objective function, and calculate the OTPM from the generated mathematical expression and the financial data stored within the database, wherein the calculated OTPM includes a first set of optimized transition probability values for predicting a likelihood that a credit rating of an obligor will migrate from one credit state to another credit state during a first time interval in the future.

In a further aspect, a computer program embodied on a computer readable medium for generating an optimized transition probability matrix (OTPM) is provided. The program includes at least one code segment that stores in a database financial data including obligor credit ratings, generates multi-period empirical transition probability matrices (ETPMs) for a selected time horizon using the financial data stored within the database wherein each generated ETPM includes transition probability values indicating a likelihood that a credit rating of an obligor will migrate from one credit state to another credit state during a time period included within the selected time horizon and the transition probability values included within the generated ETPMs are defined as target ETPM values, generates a mathematical expression to minimize a difference between target ETPM values and candidate OTPM values wherein the mathematical expression is generated using an objective function including at least one of a probit transform function and an exponential function and by applying predetermined constraints to the objective function, and calculates the OTPM from the generated mathematical expression and the financial data stored within the database, wherein the calculated OTPM includes a first set of optimized transition probability values for predicting a likelihood that a credit rating of an obligor will migrate from one credit state to another credit state during a first time interval in the future.

The methods, or processes, and systems described herein facilitate calculating TPMs using an optimization methodology. Such methodology includes an optimization framework that incorporates multiple business requirements, such as: ensuring smooth surfaces with consistent probability mass distributions, reduction of impact from time homogeneity and Markov assumptions, and reduction of forecast errors for multiple time steps. The optimization framework includes generating trial values and comparing them with values within empirical TPMs developed using empirical cohort averages. The trial values are iteratively generated and compared with the empirical values until the results of the comparisons are reduced to near zero differences, wherein unsuccessful trial values outside of predetermined difference parameters are discarded and at least one successful trial value within the difference parameters is stored. The stored trial values form at least one resultant optimized TPM, or OTPM, wherein the OTPM closely corresponds to empirical credit rating transition data. The resultant OTPM is subsequently used to predict future transition probabilities, wherein the OTPM may be embedded within risk pricing models. The proposed optimization process results in OTPMs with significantly better predictive power and properties, including monotonicity and smoothness, that better suit many business applications.

BRIEF DESCRIPTION OF THE DRAWINGS

FIG. 18 is a table of credit ratings within an OTPM;

DETAILED DESCRIPTION OF THE INVENTION

Figure 1:
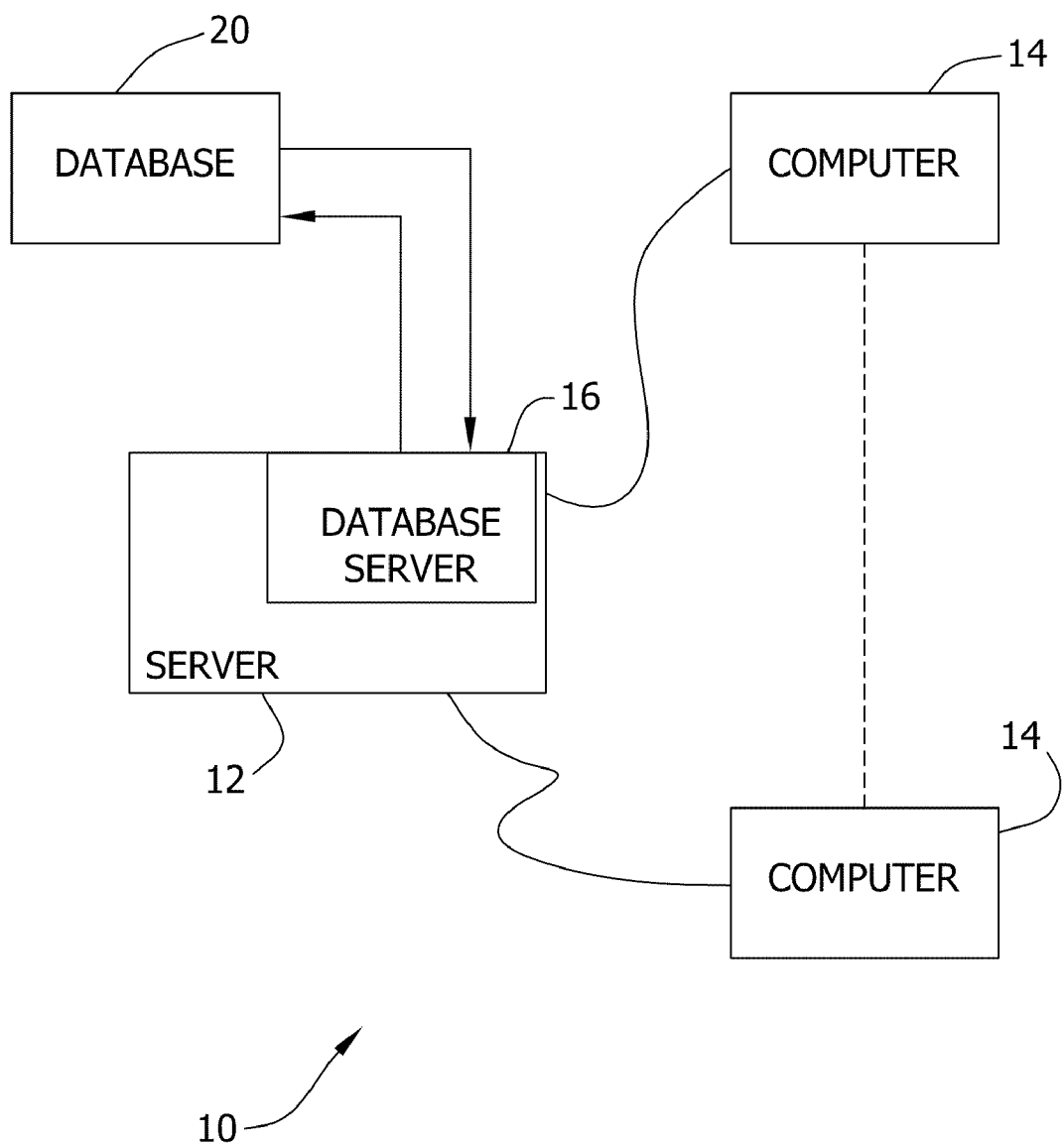
FIG. 1 is a simplified block diagram of an exemplary system in accordance with one embodiment of the present invention, wherein the system is referred to as an Optimized Transition Probability Matrix (OTPM) system.

As a matter of background, credit migration patterns have received increasing amounts of attention in recent years, primarily from two types of market participants. First, for example, by those financial and commercial entities involved in creating or investing in structured products that include collateralized debt obligations (CDOs), TPMs have been used to forecast credit deterioration for a given pool of obligations. These iterated forecasts are used for assigning an appropriate criteria for tranching (i.e., a likelihood that structural requirements will be violated), and a potential accumulation of defaults and losses in the pool over multi-year time horizons. The availability of agency-published transition matrices has facilitated this type of application, particularly when pooled assets are agency-rated obligations.

As used herein, a CDO is an investment-grade security backed by a pool of bonds, loans, and other assets, wherein these bonds, loans, and assets are often typically non-mortgaged. Moreover, as used herein, tranching is an arrangement whereby investment capital is split into a number of stages or slices wherein the size of each tranche, and the valuation of each tranche are pre-agreed to by the interested parties.

Secondly, banks and other financial institutions have used TPMs as inputs into their estimation of the appropriate levels for loan loss reserves and economic capital. In these cases, large parts of the portfolios analyzed are typically not covered by major rating agencies. Nevertheless, many banks may choose to use the agency rating process because they believe these agency ratings are more accurate and/or because the published transition matrices are simply considered an industry standard. Therefore, these banks may apply these published transition matrices to their own portfolios, notwithstanding at least some compositional differences. Larger financial institutions, and particularly those wishing to comply with Basel II requirements, have sought to produce a sufficient volume and quality of internal ratings to allow them to calculate transition probabilities based on their own internal data, wherein the greater relevancy of these data provide a more sound basis for forecasting.

In the context of this disclosure, Basel II requirements result from an international monetary and financial agreement to create an international standard for banking regulators to create regulations for how much capital banks need to put aside to guard against financial and operational risks the banks may face.

Regardless of whether or not analysts use published transition matrices directly, or calculate them from proprietary data sources, the methodology for calculating them is overwhelmingly pioneered by the major rating agencies, that is, the methodology used is the discrete, cohort-based approach as described herein. Such an approach includes the advantages of being both intuitive and relatively easy to apply. However, some disadvantages of this approach include the disproportionate effect of outliers (i.e., either specific periods or even outcomes for individual obligors) and differences by various practitioners with respect to appropriate techniques and degrees of smoothing. Moreover, at least one finding is that ETPMs as described herein, smoothed or otherwise, are not Markovian, that is, they contain asymmetries that create large biases in forecast results when they are applied iteratively to a portfolio based on the current ratings of the individual exposures.

By way of further background, migration of an obligor's credit rating may be based on factors such as, but not limited to, the financial vitality of the particular industry that the obligor is a member of, financial decisions of the obligor, and successes and setbacks of the obligor with respect to its overall financial performance. The obligor's credit rating may migrate from one credit rating to another over a period of time and commercial lenders may elect to adjust their behavior with respect to the obligor depending upon the obligor's credit rating. TPMs may be used in the pricing of credit obligations, particularly when the default risk is low, and investor risk derives largely from potential value loss associated with obligor downgrades. For example, if an obligor's credit rating is likely to improve after a certain period of time, extensions of credit to the obligor may be more strongly considered. Alternatively, if a probability of the obligor defaulting on its financial commitments exceeds a predetermined threshold level, further extensions of credit may be withheld and defensive measures towards recovering the present investment may be considered.

There are at least three key technical considerations associated with the creation of TPMs. The first technical consideration is whether future rating transitions are discrete-time stochastic transitions, that is, whether the transitions are independent of past ratings and past rating transitions, wherein such an assumption is more generally referred to as a Markov assumption. Therefore, under this type assumption, future transitions are a result of a probabilistic process rather than a deterministic process. The second technical consideration is whether transition probabilities are solely a function of the distance between dates and independent of the calendar dates themselves, wherein such an assumption is more generally referred to as a homogeneity assumption. The third technical consideration is whether the migration data is discrete or continuous in the time dimension.

In general, the industry standard for estimating time-credit TPMs is the discrete, cohort model, sometimes referred to as the cohort approach and cohort estimator. The cohort model is a discrete model using discrete data exclusively, in contrast to continuous data, and employs both the Markov and homogeneity assumptions. Therefore, the cohort model uses a discrete-time Markov chain to generate a TPM "P" that includes a plurality of "estimations of likelihood" values in the form of probabilities of transition from a first credit rating category to a second credit rating category. Specifically, P illustrates for each credit rating a value substantially representative of a probability of transition from a first credit rating, or category "i" to a second credit rating, or category "j" over a single time interval of "T".

The discrete data used to generate TPM P is empirical, historical data. Therefore, TPM P is an empirical TPM, or ETPM. The accuracy of these probability values is at least partially based on an amount and quality of empirical, historical data that is used. In general, the greater the volume of data, the more accurate the ETPM should be. An example of a volume of data that may be used to generate an ETPM is all of the available credit ratings data for a large number of obligors since April 1982, that is, when Moody's Investors Services shifted to the current rating structure. Alternatively, any amount of data for any time frame may be used to generate the ETPM.

The expression for generating such empirical P is given by:

$$P_{ij}(T)=N_{ij}(T)N_i(T) \quad (1)$$

wherein $N_{ij}$ is the number of obligors migrating from rating categories i to j during the period ending at time T, $N_i$ is the number of obligors in rating category i at the beginning of the period ending at time T, $P_{ij}$ is the element in the P matrix that represents the transition probability from the $i^{th}$ to $j^{th}$ categories. Typically, T is selected as one year such that a yearly-ETPM is generated, and such yearly-ETPM has a usefulness expectancy of one year. In order to generate ETPMs that include forecasts of credit migration probabilities that exceed a one year time frame, a "m-period" transition matrix is generated by a m-fold product of the single period, or yearly-ETPM, wherein the matrix is multiplied by itself m times for m years, wherein m is an integer. More specifically, the yearly-ETPM P is raised to, or pushed forward by, the $m^{th}$ power to generate $P^m$.

The result of the matrix multiplication operation is a number m of sequential yearly-ETPMs, each illustrating a probability of transition for each credit rating to all of the other credit ratings for each respective year in the future out to the m. Matrix multiplication is typically a complicated process that potentially requires a significant amount of computing resources and time to execute the large number of multiplication and addition algorithms that accompany such matrix multiplication. Moreover, time periods including sparse data or individual data outliers may inject inaccuracies into each successive yearly-ETPM wherein these inaccuracies may grow exponentially to adversely affect yearly-ETPMs for the out years.

Described in detail below are exemplary embodiments of methods and systems for calculating credit migration for an obligor over a given time horizon and, more particularly, to network-based methods and systems for calculating an optimized transition probability matrix for more accurately predicting a likelihood that a credit rating of an obligor will migrate from one credit state to another credit state over a given time horizon.

These processes and systems are applied iteratively over a predetermined number of periods and thereby provide an improve forecasting capability of the calculated matrices. Moreover, these processes and systems include an integrated approach to estimation and smoothing that produce matrices that are "optimal" for forecasting, that is, more accurately forecast, an obligor's credit rating migration. Specifically, these processes and systems produce results that more closely resemble known credit rating migrations as compared to known methods of using already generated TPMs that are based on the cohort approach. TPMs obtained using this optimization approach closely match certain key aspects of the empirical data, while exhibiting properties that make them better suited to their most important business applications, and help to provide a contextual benchmark against which certain aspects of the credit cycle can be highlighted and understood. For example, the methods and systems described herein may be used to estimate a one-year transition matrix that, when raised to successive powers, produces default rates that more closely resemble the cumulative average default rates rather than the empirical transition rates produced with a "push-through-time" method. The "push-through-time" method being a one-year empirical TPM calculated with a cohort method from known data that is raised to successive powers for estimating default rates into the future.

The systems and processes described herein enable, for example, generation of optimized TPMs, or OTPMs, for extended time periods of over one year, including time periods of five years or more, wherein these OTPMs exhibit more precise credit rating migration probabilities in contrast to standard empirical TPMs, or ETPMs. A technical effect of the systems and processes described herein include at least one of (a) selecting a business or geographical sector for creating multi-period ETPMs (e.g., metals and mining sector or North America sector); (b) selecting a time horizon for creating the ETPMs; (c) retrieving financial data from a database for creating the ETPMs, wherein the retrieved financial data includes obligor credit ratings for obligors included within the selected sector during the selected time horizon; (d) selecting a sampling technique for creating the ETPMs, wherein the sampling technique includes either overlapping or non-overlapping sampling; (e) generating the ETPMs for the selected sector based on the retrieved financial data and the selected sampling technique, wherein the generated ETPMs are based purely on known historical financial data for the selected sector and the selected time horizon, and each generated ETPM includes transition probability values indicating a likelihood that a credit rating of an obligor will migrate from one credit state to another credit state during a time interval included within the selected time horizon, the transition probability values included within the generated ETPMs are also known as target ETPM values; (f) selecting an objective function from a plurality of objective functions for calculating an OTPM, the plurality of objective functions including at least (1) a probit transform function; and (2) an exponential function; (g) generating a mathematical expression to minimize a difference between target ETPM values and candidate OTPM values by applying predetermined constraints to the selected objective function, wherein the predetermined constraints include (1) strict equality constraints (i.e., summation of each row of values included within the OTPM equaling one), (2) monotonic decreasing property constraints, and (3) monotonic increasing rating categories constraints; (h) calculating a baseline OTPM from the generated mathematical expression and the retrieved financial data, wherein the calculated baseline OTPM includes a first set of optimized transition probability values for predicting a likelihood that a credit rating of an obligor will migrate from one credit state to another credit state during a first time interval in the future; and (i) calculating additional sets of optimized transition probability values by raising the calculated OTPM to successive powers wherein each successive power represents a subsequent future time interval, and each additional set of optimized transition probability values predicts a likelihood that a credit rating of an obligor will migrate from one credit state to another credit state during the corresponding future time interval.

In the exemplary embodiment, the generated OTPMs provide improved estimations of credit rating migration of obligors over a given time horizon, wherein commercial lenders can use the OTPMs to assess credit risk and make financial decisions based on these risks.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T, New York, N.Y.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a simplified block diagram of an exemplary system 10 in accordance with one embodiment of the present invention. System 10 is a computer system for accessing financial data including obligor credit ratings, creating ETPMs, calculating OTPMs, and calculating additional sets of optimized transition probability values for a given time horizon. System 10 is referred to as an Optimized Transition Probability Matrix (OTPM) system. System 10 includes a server system 12, and a plurality of client sub-systems, also referred to as client systems 14, connected to server system 12. Computerized modeling and grouping tools, as described below in more detail, are stored in server system 12 and can be accessed by a requester at any one of client systems 14. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Database 20 includes stored financial data, for example, but not limited to, historical obligor credit ratings data, rating migration data, and previous ETPMs and OTPMs. Moreover, database 20 may include, but is not limited to, operator user settings and mathematical expressions for generating ETPMs and OTPMs, including default and operator-selected parameters and constraints.

The embodiments illustrated and described herein as well as embodiments not specifically described herein but within the scope of aspects of the invention constitute exemplary means for calculating OTPMs, and more particularly, constitute exemplary means for calculating an optimized TPM that accurately predicts a likelihood that a credit rating of an obligor will migrate from one credit state to another credit state during a determine future time interval. For example, the server system 12 or the client system 14, or any other similar computer device, programmed with computer-executable instructions to execute processes and techniques as described herein, constitutes exemplary means for assessing a probability of a particular credit rating migrating to another credit rating.

Figure 2:
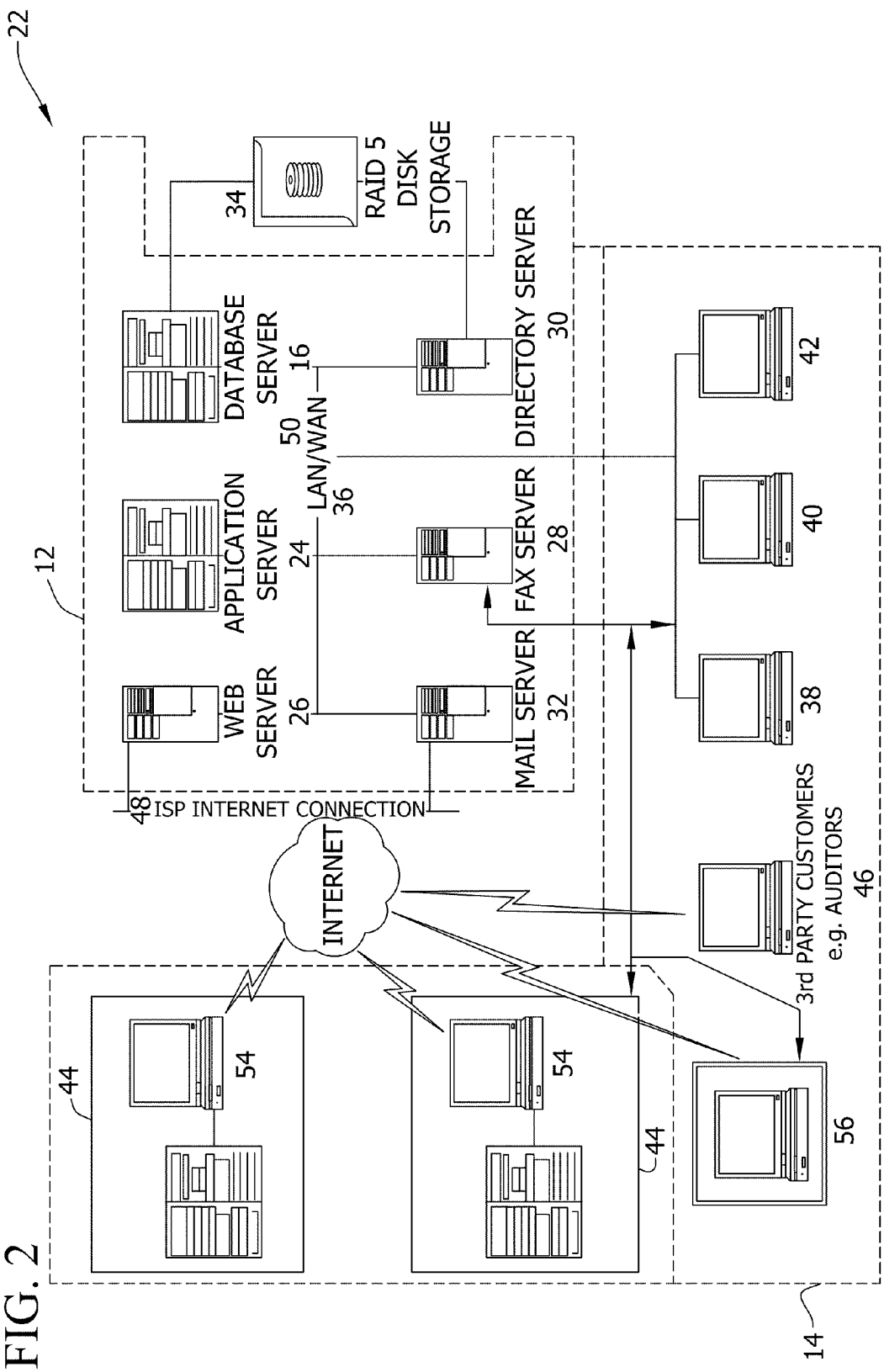
FIG. 2 is an expanded block diagram of an exemplary embodiment of a server architecture of a system in accordance with one embodiment of the present invention.

FIG. 2 is an expanded block diagram of an exemplary embodiment of a server architecture of a system 22 in accordance with one embodiment of the present invention. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user's workstation 40, and a supervisor's workstation 42 are coupled to LAN 36. Alternatively, workstations 38, 40, and 42 are coupled to LAN 36 using an Internet link or are connected through an intranet.

Each workstation, 38, 40, and 42 is a personal computer having a web browser. Although the functions performed at the workstations typically are illustrated as being performed at respective workstations 38, 40, and 42, these functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., auditors/customers 46 using an ISP Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access system 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a manager workstation 56 using a telephone link. Fax server 28 is configured to communicate with other client systems 38, 40, and 42 as well.

Figure 3:
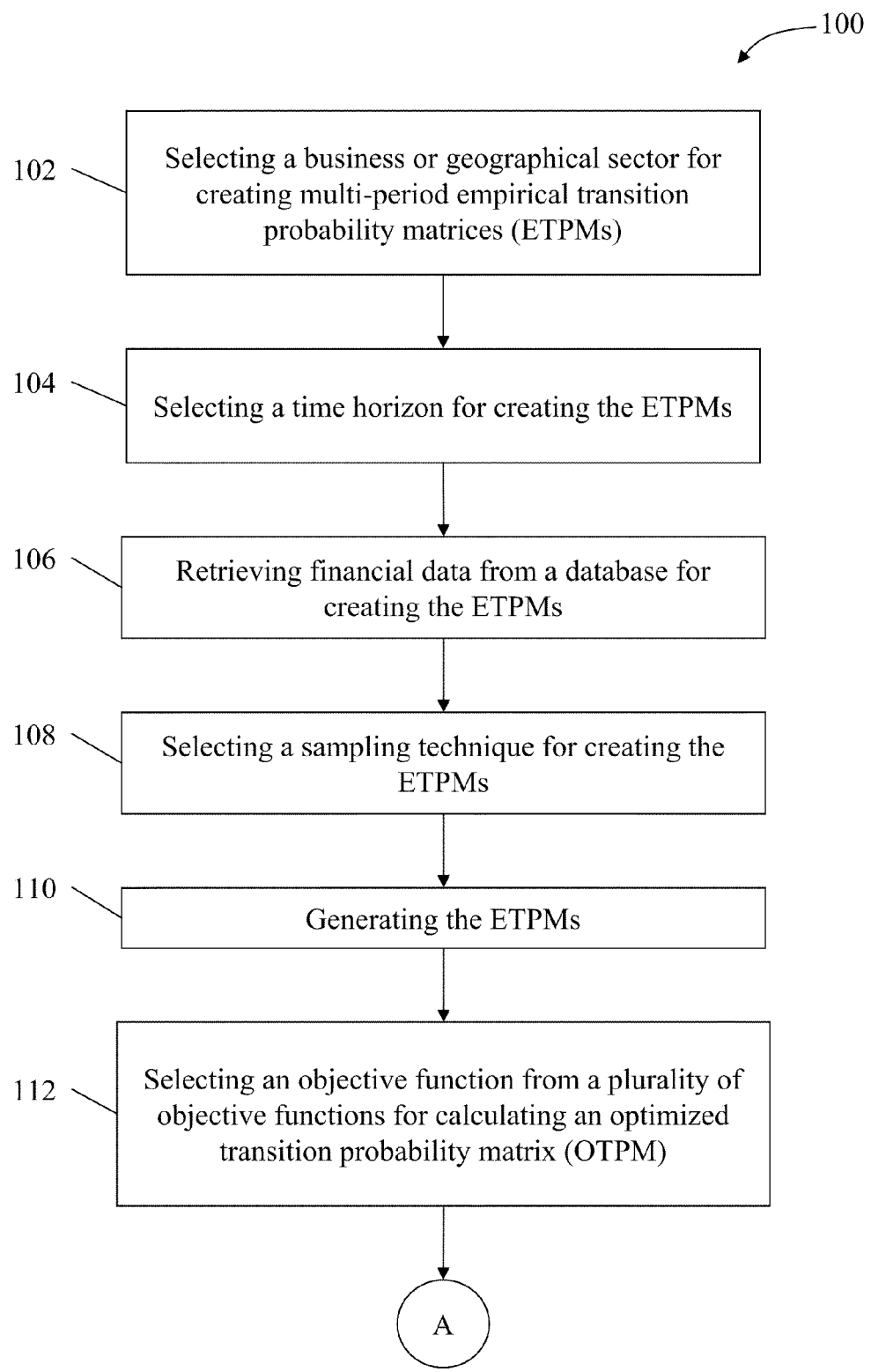
FIG. 3 is a portion of a flowchart illustrating exemplary processes utilized by the system shown in FIG. 1 for generating an optimized transition probability matrix (OTPM)

FIG. 3 is a portion of a flowchart 100 illustrating exemplary processes utilized by system 10 (shown in FIG. 1) for generating an optimized transition probability matrix (OTPM). In the example embodiment, system 10 may be utilized by a risk or finance manager associated with a commercial lender or any other type of lender contemplating issuing a financial instrument, or instruments, to a borrower. These financial instruments include, but are not limited to, structured products, corporate bonds, and private and commercial loans. These structured products include, but are not limited to, residential mortgage-backed securities (RMBSs), commercial mortgage-backed securities (CMBSs), asset-backed securities (ABSs), and collateralized debt obligations (CDOs). System 10 may be utilized by a risk or finance manager to assess or predict loss potential associated with the financial instrument(s) for a particular lender, loss potential associated with an existing obligor, and/or loss potential associated with a particular group of obligors or all of the obligors of the lender.

The technical effects of the processes and systems described herein are achieved when a risk manager selects 102 a business or geographical sector for creating multi-period ETPMs (e.g., metals and mining sector or North America sector), and then selects 104 a time horizon for creating the ETPMs. In the example embodiment, a lender, considering whether to provide financing to an obligor or more than one obligor within a particular business sector or geographical sector, uses system 10 to calculate a likelihood of default or a likelihood that the credit rating of the obligor will migrate from one credit rating to another during a selected period of time. The lender can make these predictions by generating an OTPM using obligor financial data for obligors included within the business sector or geographical section of interest. The assumption is that such an OTPM, one that is based on data for the same sector, will be predictive of the obligor going forward into the future.

The selected time horizon is typically more than a year and can be divided into substantially equal time intervals. Each time interval may include a substantially similar number of observation periods. For example, an overall future time horizon of eight observation periods, wherein each observation period is one year, may be broken into two substantially equal time intervals of four observation periods each.

After selecting 102 a business or geographical sector and selecting 104 a time horizon, system 10 then retrieves 106 financial data from the database for creating the ETPMs for the selected sector during the selected time horizon. Specifically, the retrieved financial data (sometimes referred to herein as "ratings data") includes obligor credit ratings for obligors included within the selected sector during the selected time horizon. In the example embodiment, system 10 stores actual, historical financial ratings data in database 20 for a plurality of obligors. This ratings data is collected from a variety of sources, including, but not limited to, Standard and Poor's™, Moody's™, and Moody's KMV (Kealhofer, McQuown and Vasicek), or, MKMV, and General Electric® proprietary data. In the exemplary embodiment, ratings data associated with over 6,000 obligors for a period extending from April 1982 to the present is used. Alternatively, any amount of ratings data from any source that enables determining OTPMs as described herein may be used.

System 10 then prompts the user to select 108 a sampling technique for creating the ETPMs. In an alternative embodiment, system 10 automatically selects a sampling technique for creating the ETPMs. The sampling techniques include either overlapping or non-overlapping sampling.

System 10 generates 110 the ETPMs for the selected sector based on the retrieved financial data and the selected sampling technique. The generated ETPMs are based purely on known historical financial data for the selected sector and the selected time horizon. Each generated ETPM includes transition probability values indicating a likelihood that a credit rating of an obligor will migrate from one credit state to another credit state during a time interval included within the selected time horizon. The transition probability values included within the generated ETPMs are also known as target ETPM values. These ETPMs are generated using the cohort methodology.

System 10 then selects 112 an objective function from a plurality of objective functions for calculating an OTPM. In the example embodiment, the plurality of objective functions include at least a probit transform function, and an exponential function. These objective functions are discussed in greater detail hereinbelow. In an alternative embodiment, system 10 prompts the risk manager to select an objective function from a list of objective functions for calculating an OTPM.

Figure 4:
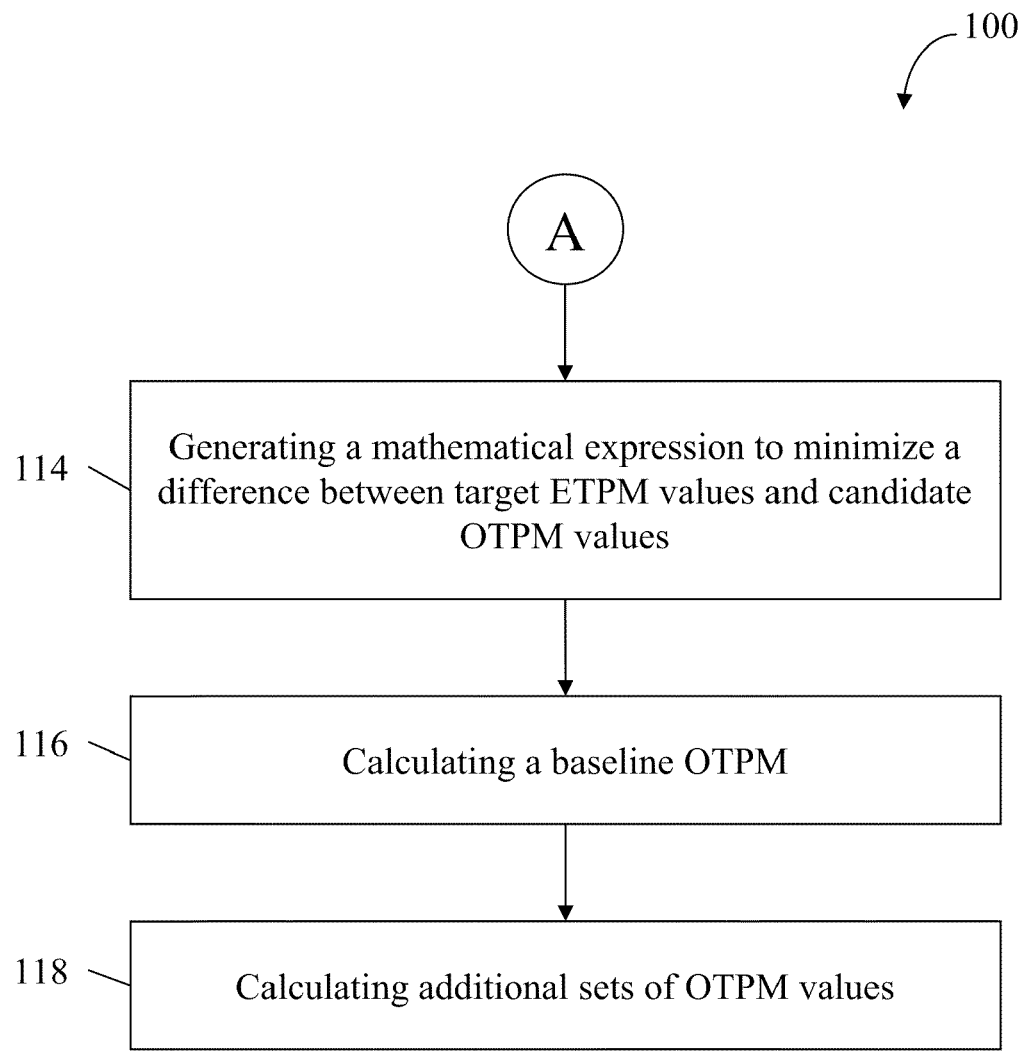
FIG. 4 is a portion of the flowchart continued from FIG. 3.

FIG. 4 is a portion of flowchart 100 continued from FIG. 3. After selection 112, system 10 generates 114 a mathematical expression for minimizing a difference between target ETPM values and candidate OTPM values by applying predetermined constraints to the selected objective function. The predetermined constraints include: (1) strict equality constraints (i.e., summation of each row of values included within the OTPM equaling one), (2) monotonic decreasing property constraints, and (3) monotonic increasing rating categories constraints. System 10 then calculates 116 a baseline OTPM from the generated mathematical expression and the retrieved financial data. The calculated baseline OTPM includes a first set of optimized transition probability values for predicting a likelihood that a credit rating of an obligor will migrate from one credit state to another credit state during a first time interval in the future. In the example embodiment, the baseline OTPM is calculated by performing an element-wise comparison between each target transition probability value generated in the ETPM and each candidate transition probability value in the OTPM.

System will also calculate 118 additional sets of optimized transition probability values by raising the calculated baseline OTPM to successive powers wherein each successive power represents a subsequent future time interval, and each additional set of optimized transition probability values predicts a likelihood that a credit rating of an obligor will migrate from one credit state to another credit state during the corresponding future time interval. The optimized TPMs, or OTPMs, result in improved predictive power and properties that better suit many business applications as contrasted to standard ETPMs.

Referring again to FIG. 3, after selecting 102 a business or geographical sector for creating the multi-period empirical transition probability matrices (ETPMs), the process also includes selecting 104 a time horizon for creating the ETPMs. The selected time horizon is typically more than a year and can be divided into substantially equal time intervals. For example, the predetermined time horizons may extend from one year to ten years in annual increments, wherein each time interval may include a substantially similar number of observation periods, and the numbers of annual increments, time intervals, and observation periods are integers. Therefore, the predetermined time horizon is divided into a predetermined number of time intervals, and each time interval is divided into a predetermined number of observation periods. Moreover, each time interval includes substantially the same number of observation periods, wherein each observation period has substantially the same time value. Time horizons, time intervals, and observation periods are discussed further below.

In the exemplary embodiment, the input data for the optimization targets is comprised of ten ETPMs with time horizons extending from one year to ten years in annual increments, wherein each observation period includes a number of annual periods that is an integer. Alternatively, any number of ETPMs are used with any time horizon that enables the processes and systems as described herein. For each time horizon, the matrices are calculated by looking at the initial and final ratings only over the given time interval. For a two-year matrix, for instance, an obligor rated AA− on January 1997 and rated A+ on January 1999 is counted as a transition from AA− to A+ over the two-year interval, regardless of any interim transitions within the two-year period.

Figure 5:
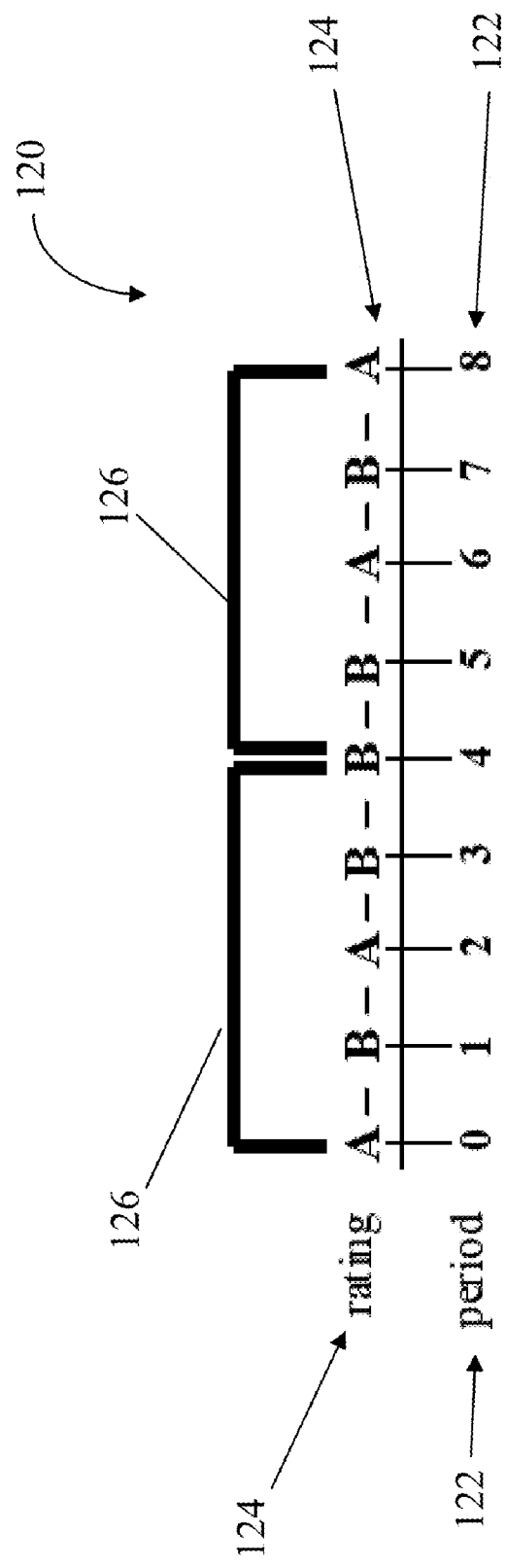
FIG. 5 is an example overall future time horizon used to determine an empirical transition probability matrix (ETPM)

FIG. 5 is an example overall future time horizon 120 used to determine an ETPM. Time horizon 120 includes a plurality of observation periods 122, that are one year each. Also, time horizon 120 includes a plurality of credit rating values 124, wherein each rating value 124 represents the assigned credit rating for at least one of the beginning of the associated observation period 122 and/or the predominant credit rating throughout the associated observation period 122. Further, time horizon 120 includes a plurality of time intervals 126, wherein each time interval 126 includes a substantially equal number of observation periods 122. Moreover, time horizon 120 shows, for example, eight observation periods 122, wherein each observation period 122 is one year, and is broken into two substantially equal time intervals 126 of four observation periods each.

After selecting 104 a time horizon for creating the ETPMs as shown in FIG. 3, the process further includes retrieving 106 financial data from a database for creating the ETPMs and inputting empirical, historical data that will be used to determine the ETPM, wherein such data is stored within database 20 (shown in FIG. 1). In the exemplary embodiment, the retrieved financial data includes obligor credit ratings for obligors included within the selected sector, or sectors during the selected time horizon. Also, in the exemplary embodiment, data from at least one of Standard and Poor's (S&P)™, Moody's™, and MKMV datasets is used to develop the empirical transition matrices used in the optimization process. Specifically, in the exemplary embodiment, these datasets are imported into one large dataset. Also, specifically, each dataset is mapped during importation to correspond to a proprietary GEC® Rating Scale, that is, the ratings that are used to estimate transitions are translated to appropriate GE Scale ratings, thereby forming one large GE dataset.

In the exemplary embodiment, and hereon, the S&P rating scale is used. For example, in the exemplary embodiment, ratings data from Standard and Poor's for over 6,000 obligors over a time horizon from 1989 to 2005 is used. Such data is associated with a broad variety of business sectors. Also, such data includes 21 rating classes that are condensed to eight classes corresponding to S&P major ratings categories plus a default category for the optimization operation, wherein the OTPM has a total of nine ratings categories. In the exemplary embodiment, these ratings categories are AAA, AA, A, BBB, BB, B, CCC, C, and D, wherein D corresponds to default. Alternatively, any data source and or/sources, any scaling mechanism, and any number of credit rating categories are used to enable development of the OTPM and operation of system 10 as described herein.

In order to calculate the ETPMs for each time interval 126, two techniques are considered, specifically, overlapping sampling and non-overlapping sampling. Overlapping sampling allows for the use of the full set of monthly transitions. Although it weights transitions during the middle observation periods 122 of the dataset more heavily than transitions at the beginning and end of the observation periods 122, the benefits of using the full dataset greatly outweigh this limitation. Each of the non-overlapping and overlapping techniques are discussed further below.

Referring again to FIG. 3, after retrieving 106 financial data from a database for creating the ETPMs, the process also includes selecting 108 a sampling technique for creating the ETPMs, the sampling technique including either overlapping or non-overlapping sampling.

Figure 6:
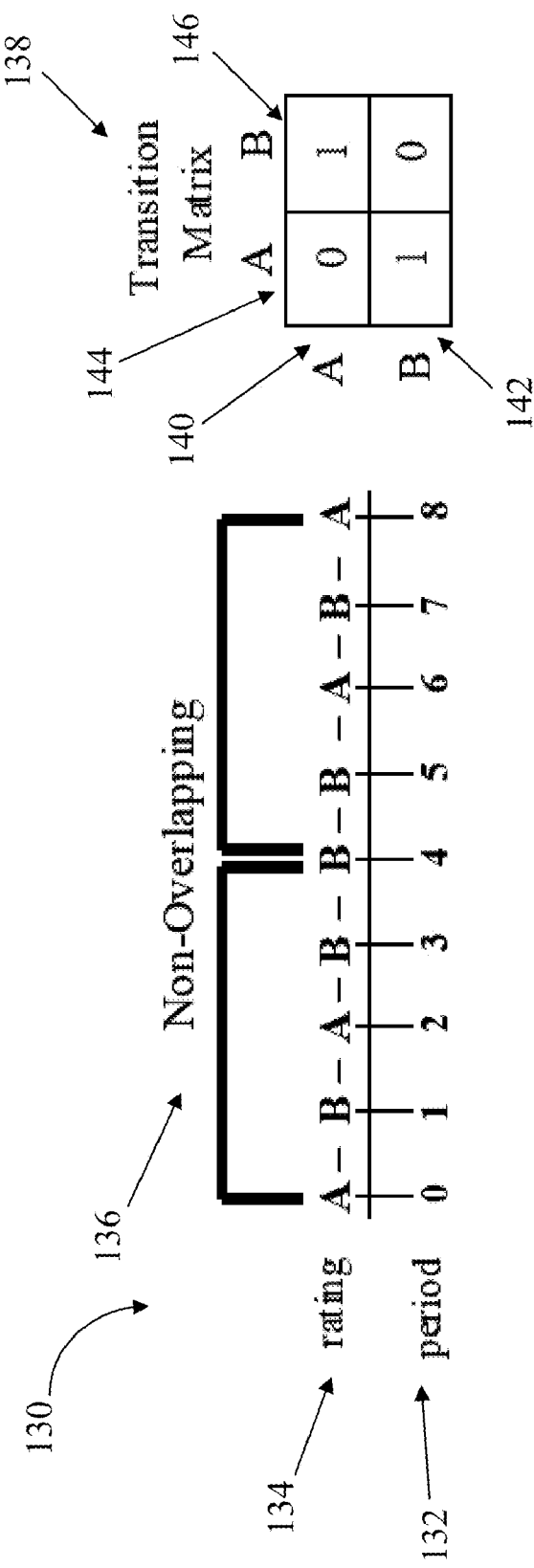
FIG. 6 is an example non-overlapping sampling illustration used to determine an ETPM.

FIG. 6 is an example non-overlapping sampling illustration 130 used to determine an ETPM and an OTPM. Illustration 130 is similar to time horizon 120 (shown in FIG. 5) and includes a plurality of observation periods 132, that are one year each. Also, illustration 130 includes a plurality of credit rating values 134, wherein each rating value 134 represents the assigned credit rating for at least one of the beginning of the associated observation period 132 and/or the predominant credit rating throughout the associated observation period 132. Further, illustration 130 includes a plurality of time intervals 136, wherein each time interval 136 includes a substantially equal number of observation periods 132. Moreover, illustration 130 shows, for example, eight observation periods 132, wherein each observation period 132 is one year, and is broken into two substantially equal non-overlapping time intervals 136 of four observation periods each.

Illustration 130 also includes two possible rating states, that is, A and/or B, wherein each time interval 136 is four periods, and there are eight observation periods 132 with a total of six transitions and two observations of stationary ratings. Illustration 130 further includes a transition matrix 138, wherein such matrix 138 includes a first row 140, a second row 142, a first column 144, and a second column 146. Remaining in the same state from the beginning to the end of a time interval 136, that is A to A and B to B, is counted in the transition matrix as an observation along the diagonal. Illustration 130 shows that in this non-overlapping example only two transition observations are captured, that is one transition from A to B and one transition from B to A. Therefore, a cell within matrix 138 defined by an intersection of first row 140 and first column 144 includes a value of "0", thereby indicating that an A to A non-transition probability is approximately zero percent. Also, a cell within matrix 138 defined by an intersection of first row 140 and second column 146 includes a value of "1", thereby indicating that an A to B transition probability is approximately 100%. Similarly, a cell within matrix 138 defined by an intersection of second row 142 and first column 144 includes a value of "1", thereby indicating that a B to A transition probability is approximately 100%. Further, similarly, a cell within matrix 138 defined by an intersection of second row 142 and second column 146 includes a value of "0", thereby indicating that a B to B non-transition probability is approximately zero percent.

Figure 7:
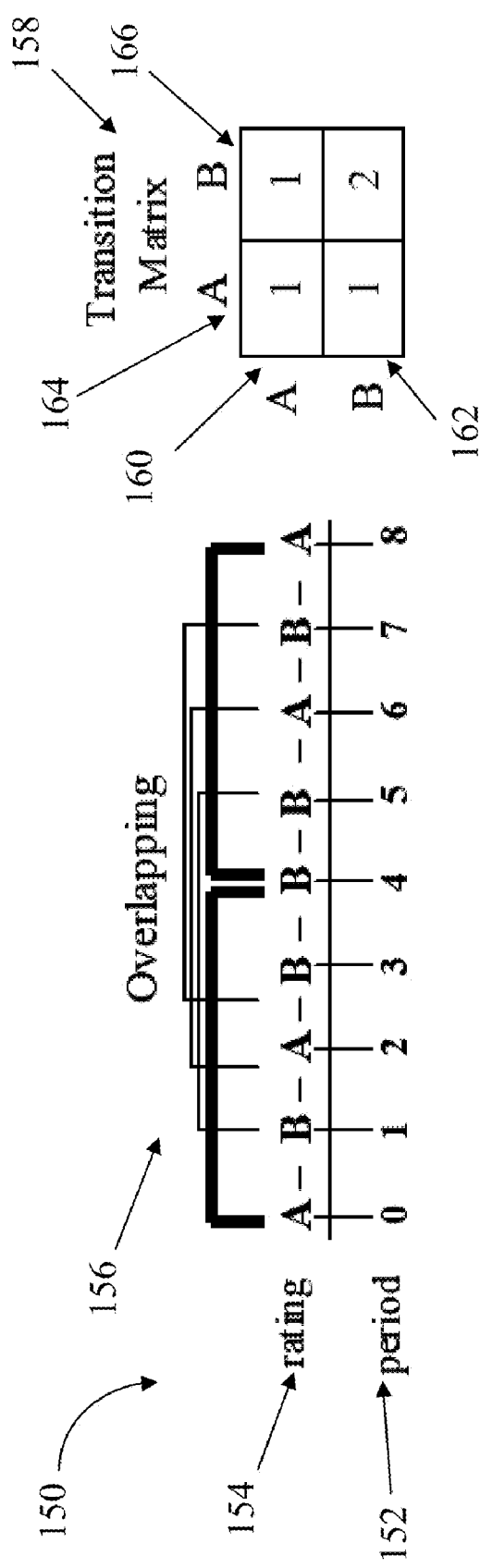
FIG. 7 is an example overlapping sampling illustration used to determine an ETPM.

FIG. 7 is an example overlapping sampling illustration 150 used to determine an ETPM and an OTPM. Illustration 150 is similar to time horizon 120 (shown in FIG. 5) and includes a plurality of observation periods 152, that are one year each. Also, illustration 150 includes a plurality of credit rating values 154, wherein each rating value 154 represents the assigned credit rating for at least one of the beginning of the associated observation period 152 and/or the predominant credit rating throughout the associated observation period 152. Further, illustration 150 includes a plurality of time intervals 156, wherein each time interval 156 includes a substantially equal number of observation periods 152. Moreover, illustration 150 shows, for example, eight observation periods 152, wherein each observation period 152 is one year, and is broken into five substantially equal overlapping time intervals 156 of four observation periods each.

Illustration 150 also includes two possible rating states, that is, A and/or B, wherein each time interval 156 is four periods, and there are eight observation periods 152 with a total of six transitions and two observations of stationary ratings. Illustration 150 further includes a transition matrix 158, wherein such matrix 158 includes a first row 160, a second row 162, a first column 164, and a second column 166. Remaining in the same state from the beginning to the end of a time interval 156, that is A to A and B to B, is counted in the transition matrix as an observation along the diagonal. Illustration 150 shows that in this overlapping example two transition observations are captured, that is one transition from A to B and one transition from B to A. Moreover, three non-transition observations are also captured, that is, one A to A non-transition and two B to B transitions.

Therefore, a cell within matrix 158 defined by an intersection of first row 160 and first column 164 includes a value of "1". Also, a cell within matrix 158 defined by an intersection of first row 160 and second column 166 includes a value of "1". The total of the two observations is 2, thereby indicating that an A to A non-transition probability is approximately 50% percent and that an A to B transition probability is approximately 50%. Similarly, a cell within matrix 158 defined by an intersection of second row 162 and first column 164 includes a value of "1". Further, similarly, a cell within matrix 158 defined by an intersection of second row 162 and second column 166 includes a value of "2". The total of the three observations is 3, thereby indicating that a B to A transition probability is approximately 33%. And that a B to B non-transition probability is approximately 67% percent.

The technical effect of using the overlapping technique as compared to the non-overlapping technique includes significantly increasing the number of observations such that the results in transition probabilities more closely match with reality. The non-overlapping case as described above contains only two observations and would indicate a four-period probability of approximately 100% from A to B and vice versa and a probability of approximately 0% of remaining in any current state four periods later. In contrast, the overlapping case as described above contains five observations and indicates a probability of transitioning from A to B of approximately 50% over a four-period interval, and from B to A, a probability of approximately 33%. Moreover, there is a probability that a rating of A will not transition over four observation periods of approximately 50% and that a rating of B will not transition over four observation periods of approximately 67%. Therefore, the non-overlapping technique captured two of the six transitions while the overlapping technique captured five of the six transitions.

By utilizing an overlapping sampling technique, most, if not all, of the transitions are taken into account, regardless of the time interval. Although multiple transitions are occurring throughout the time period, the non-overlapping case misses these transitions, while the overlapping case captures them. This becomes especially important when there are multiple rating categories, as is the case with our data. For longer time horizons, there may be multiple different ratings during the interval of interest and using the non-overlapping technique is likely to miss some of these, leading to not only misleading transition matrices, but also sparse data in some areas. The non-overlapping technique misses intra-interval transitions, while the overlapping technique captures these transitions. The non-overlapping technique could lead to underestimation of ratings volatility, especially as the interval approaches the total number of periods.

A homogeneity assumption, as described further below, includes assuming that transition probabilities are solely a function of the distance between dates and independent of the calendar dates themselves. The data must be homogenous so that no one single period contains a fundamentally different probability of transition. Even if there is homogeneity across periods, there must also be sufficient data to ensure that random fluctuations between obligor transitions are smoothed out. The overlapping technique is reliant on the assumption of homogeneity to a greater degree than the non-overlapping technique. The overlapping technique allows for the full use of data, which provides a significant advantage in terms of providing additional observations and ensuring that all transitions are included in the empirical matrices. If the data is not homogeneous, then the overlapping data unequally weights transitions in the middle of the time period of interest. For instance, if there is ten years worth of data and the transition time step is five years, the non-overlapping technique would look only at two transition steps, that is, from the beginning of the dataset to year 5 (the middle) and then from year 5 to the end. The overlapping technique is affected by transitions in years 4 through 6 for almost all the selected observations, while with years 1 and 10 is utilized less often. Therefore, the homogeneity assumption facilitates the use of the overlapping technique since it assumes that transition probabilities are substantially constant across all time periods.

Using the overlapping technique enables the use of a much greater portion of the data and ensures that even as the time interval becomes long there are sufficient observed transitions to calculate a reliable empirical matrix. The non-overlapping technique would not allow for nearly the number of observations, leading to scarcity in many portions of the empirical transition matrices for long time intervals.

Referring again to FIG. 3, after selecting 108 a sampling technique for creating the ETPMs, the process further includes generating 110 the ETPMs. Specifically, generating 110 the ETPMs includes generating the ETPMs for the selected sector based on the retrieved financial data and the selected sampling technique, as described above. The generated ETPMs are based purely on known historical financial data for the selected sector and the selected time horizon, each generated ETPM including transition probability values indicating a likelihood that a credit rating of an obligor will migrate from one credit state to another credit state during a time interval included within the selected time horizon.

More specifically, each ETPM generated using this process is a multi-year empirical (target) transition probability matrix and the transition probability values included within the generated ETPMs are known as target ETPM values, or target values. Such multi-year ETPMs are generated using a cohort averaging methodology. The benchmark, or target ETPM is a one-year empirical TPM calculated with a discrete, cohort method (as described above) from the portions of the process described above that includes selecting 102 a business or geographical sector, selecting 104 a time horizon, retrieving 106 financial data, and selecting 108 a sampling technique for creating the ETPMs, that in the exemplary embodiment, is the overlapping technique.

The generating 110 the ETPMs portion of the process described herein includes pushing such one-year ETPM generated as described above forward by raising it to the $t^{th}$ power, where t equals the particular year of interest. The value of t is determined by selecting 104 a time horizon to determine the ETPM that includes selecting a number of observation periods and a time interval to determine the ETPM. Therefore, the targets include multi-year empirical TPMs over the same time period calculated from the data discussed previously.

Referring again to FIG. 3, after generating 110 the ETPMs for the selected sector based on the retrieved financial data and the selected sampling technique, the process further includes selecting 112 an objective function from a plurality of objective functions for calculating an optimized transition probability matrix (OTPM).

Figure 8:
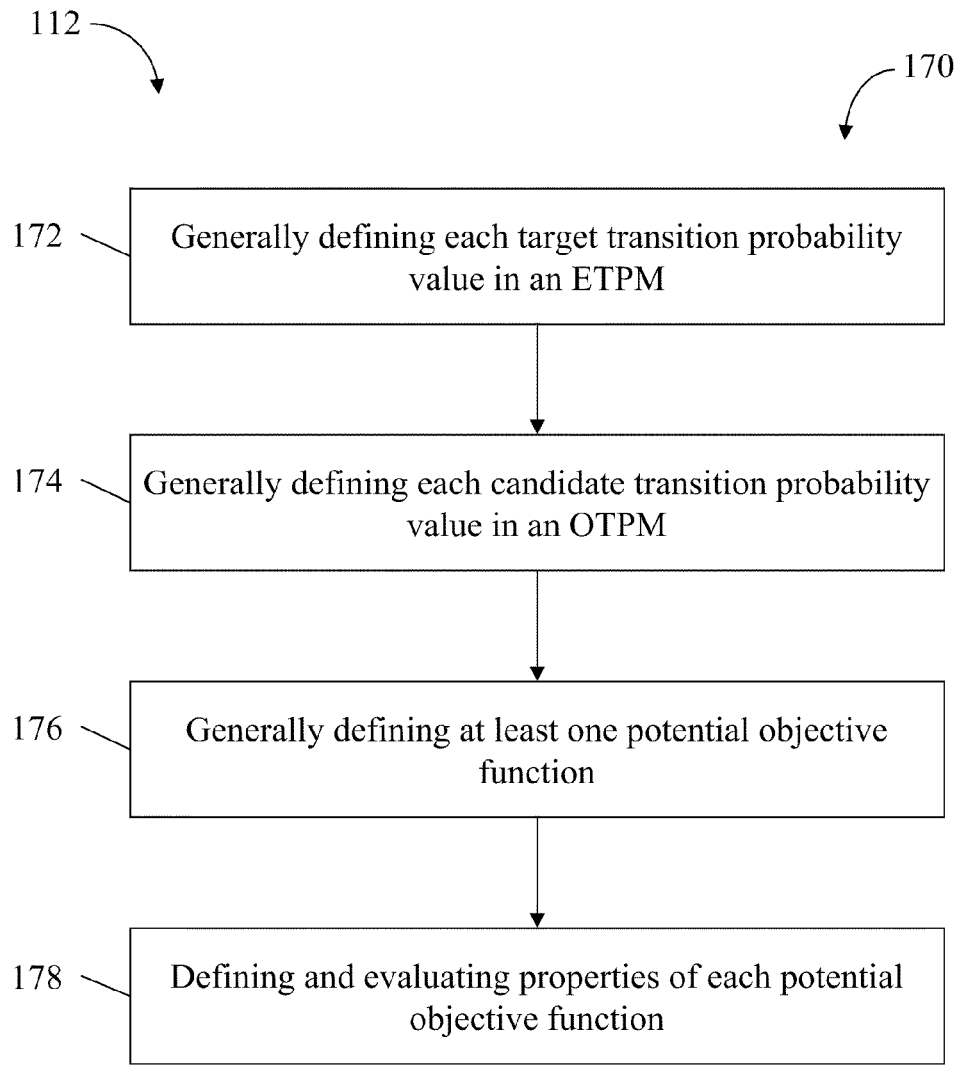
FIG. 8 is a more detailed flowchart illustrating exemplary processes utilized by the system shown in FIG. 1 relating to selecting at least one objective function for generating an OTPM.

FIG. 8 is a flowchart 170 illustrating exemplary processes relating to selecting 112 (FIG. 3) an objective function from a plurality of objective functions for calculating an OTPM. The process for selecting an objective function includes defining 172 each target transition probability value in a multi-year ETPM as "x" and defining 174 each candidate transition probability value in a trial OTPM as "y". Applying these general definitions in the form of standard mathematical variables enables a general discussion of subsequent mathematical processes. A plurality of objective functions are evaluated for use within the process as described herein and each is discussed further below. The process further includes performing an element-wise comparison as described herein includes defining 176 at least one potential objective function as "f( )". The process then includes performing an element-wise comparison as described herein including defining 178 and evaluating properties of each potential objective function, wherein a suitable objective function is at least partially defined by at least one of the properties discussed in more detail herein.

A first property to be evaluated in determining suitable objective functions is symmetry, or, more specifically, the objective function should treat positive and negative gaps of substantially similar sizes equally. For example, the function value should be substantially similar for a candidate value of 51% in the trial OTPM versus a target value of 50% in the ETPM and a candidate value of 49% versus a target value of 50% in the OTPM and ETPM, respectively. The expression for evaluating such symmetry is given by:

$$f(y=51\%, x=50\%)=f(y=49\%, x=50\%) \quad (2)$$

wherein the variable "x" is defined as a target transition probability value in the multi-year ETPM and the variable "y" is defined as a candidate transition probability value in the trial OTPM, both as described in defining 172 each target transition probability in an ETPM and defining 174 each candidate transition probability value in an OTPM, respectively, above.

A second property to be evaluated in determining suitable objective functions is relativity, or, more specifically, the function should treat gaps on a relative scale. In other words, a 1% gap for a 0.3% transition probability should be more heavily weighted than the same gap for an 80% transition probability. The expression for evaluating such relativity is given by:

$$f(y=1.3\%, x=0.3\%) > f(y=81\%, x=80\%) \quad (3)$$

wherein the variable "x" is defined as a target transition probability value in the multi-year ETPM and the variable "y" is defined as a candidate transition probability value in the trial OTPM, both as described in defining 172 each target transition probability in an ETPM and defining 174 each candidate transition probability value in an OTPM, respectively, above.

A third property to be evaluated in determining suitable objective functions is robustness, or, more specifically, the objective function should be robust for the full range of probability space, that is, between 0 and 1, wherein the function should be defined for all extreme values. The expression for evaluating such robustness is given by:

$$f(x, y)=\text{real number, for all possible x and y, wherein} \quad (4)$$

in particular, f(y|x=0%)=real number f(y|x=100%)=real number wherein the variable "x" is defined as a target transition probability value in the multi-year ETPM and the variable "y" is defined as a candidate transition probability value in the trial OTPM, both as described in defining 172 each target transition probability in an ETPM and defining 174 each candidate transition probability value in an OTPM, respectively, above.

A fourth property to be evaluated in determining suitable objective functions is monotonicity, that is, the objective function should have the least (most preferably, zero) value when the target value and the candidate value are equal. That is, a decreasing or increasing trend stays decreasing or increasing, respectively, through the entire range of the associated parameters. The expression for evaluating such monotonicity is given by:

$$f(y=x) \leq f(y \neq x) \quad (5)$$

wherein the variable "x" is defined as a target transition probability value in the multi-year ETPM and the variable "y" is defined as a candidate transition probability value in the trial OTPM, both as described in defining 172 each target transition probability in an ETPM and defining 174 each candidate transition probability value in an OTPM, respectively, above. More specifically, the objective function should increase and/or decrease monotonically with the size of the difference between x and y. The expression for implementing such monotonical increase is given by:

$$\text{Let } \Delta=y-x, \text{ therefore } f(\Delta_1) \leq f(\Delta_2), \text{ when } \Delta_1 < \Delta_2, \forall x \quad (6a)$$

and the expression for such monotonical decrease is given by:

$$\text{Let } \Delta=y-x, \text{ therefore } f(\Delta_1) > f(\Delta_2), \text{ when } \Delta_1 > \Delta_2, \forall x \quad (6b)$$

wherein $\Delta_1$ represents a first difference between y and x, $\Delta_2$ represents a second difference between y and x, $f(\Delta_1)$ represents a value of the objective function resulting from the first difference, and $f(\Delta_2)$ represents a value of the objective function resulting from the second difference. Therefore, the objective function should increase and/or decrease exponentially, wherein the monotonicity property enables closing larger gaps.

A fifth property to be evaluated in determining suitable objective functions is simplicity, or, more specifically, the objective function should make efficient use of computation resources, wherein such property is required for implementation of an efficient optimization algorithm, such algorithm being intuitive and containing minimal arbitrary parameters.

Referring again to FIG. 3, and specifically selecting 112 an objective function, a plurality of potential objective functions are evaluated using at least the criteria described above. In the exemplary embodiment, at least two potential objective functions are evaluated. Alternatively, any objective functions may be evaluated that enables the processes and systems as described herein.

A first objective function to be evaluated is known as a weighted probit transform function. The expression for the probit transform function is given by:

$$f=|\Phi^{-1}[(y+\epsilon)/2-\Phi^{-1}(x+\epsilon)/2]| \quad (7)$$

wherein the variable "x" is defined as a target transition probability value in the multi-year ETPM and the variable "y" is defined as a candidate transition probability value in the trial OTPM, both as described in defining 172 each target transition probability in an ETPM and defining 174 each candidate transition probability value in an OTPM, respectively, above. Moreover, an adder 8 is used to comply with the robustness property when the value of x is zero.

Figure 9:
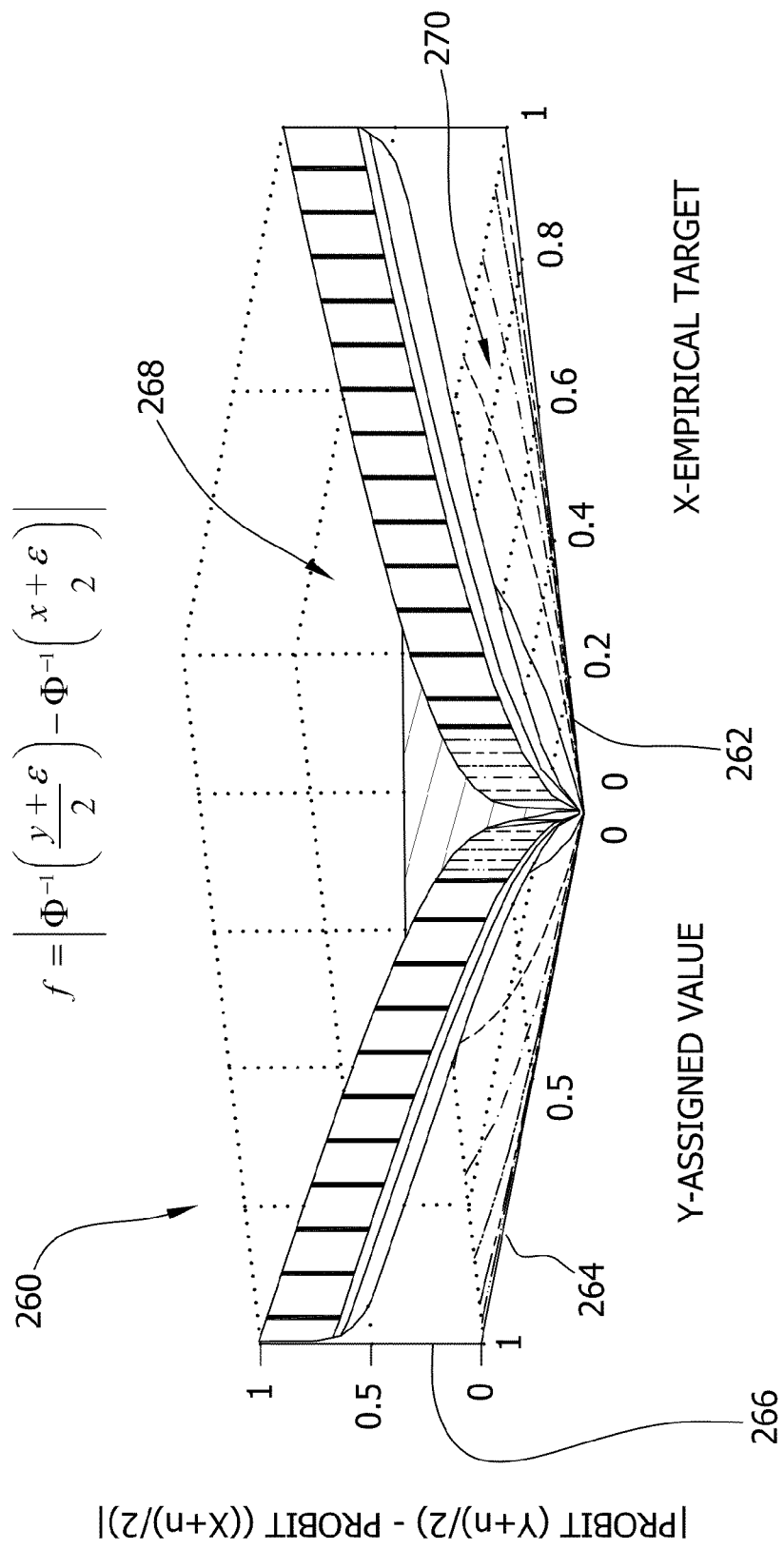
FIG. 9 is a three-dimensional graphical representation of a probit transform function wherein adder $\epsilon=0.0001$.

FIG. 9 is a three-dimensional graphical representation, or 3-D graph 260 of a probit transform function, wherein adder $\epsilon=0.0001$ and such adder value is substantially equivalent to one basis point. In the exemplary embodiment, adder $\epsilon$ is a value that is predetermined to tune the function. Graph 260 includes an abscissa, or x-axis 262 that is representative of empirical target values that provide the reference for the subsequent operations as described herein. Moreover, x-axis 262 includes a range of values that extends from 0 to 1 in increments of 0.2. The increments defined on x-axis 262 are unitless and are selected for illustrative purposes. Therefore, x-axis 262 is at least partially analogous to a range of empirical target values associated with an ETPM (not shown), wherein the variable "x" is defined as a target transition probability value in the multi-year ETPM.

Graph 260 also includes an ordinate, or y-axis 264 that is representative of a range of assigned values that provide candidate values used for the subsequent operations as described herein. Moreover, y-axis 264 includes a range of values that extends from 0 to 1 in increments of 0.5. The increments defined on y-axis 264 are unitless and are selected for illustrative purposes. Therefore, y-axis 264 is at least partially analogous to a range of candidate values associated with a trial OTPM (not shown), wherein the variable "y" is defined as a candidate transition probability value in the trial OTPM.

Graph 260 further includes a f-axis 266 that is representative of a range of values resulting from the operation indicated by equation (7) (shown above). Moreover, f-axis 266 includes a range of values that extends from 0 to 1 in increments of 0.5. The increments defined on f-axis 266 are unitless and are selected for illustrative purposes.

Graph 260 also includes a surface plot 268 that is representative of the entire set of possible values on f-axis 266 derived from operations of equation (7) over the entire ranges of x-axis 262 and y-axis 264. Moreover, graph 260 includes a contour plot 270 that is representative of at least a portion of surface plot 268 collapsed into a two-dimensional representation of surface plot 268.

Figure 10:
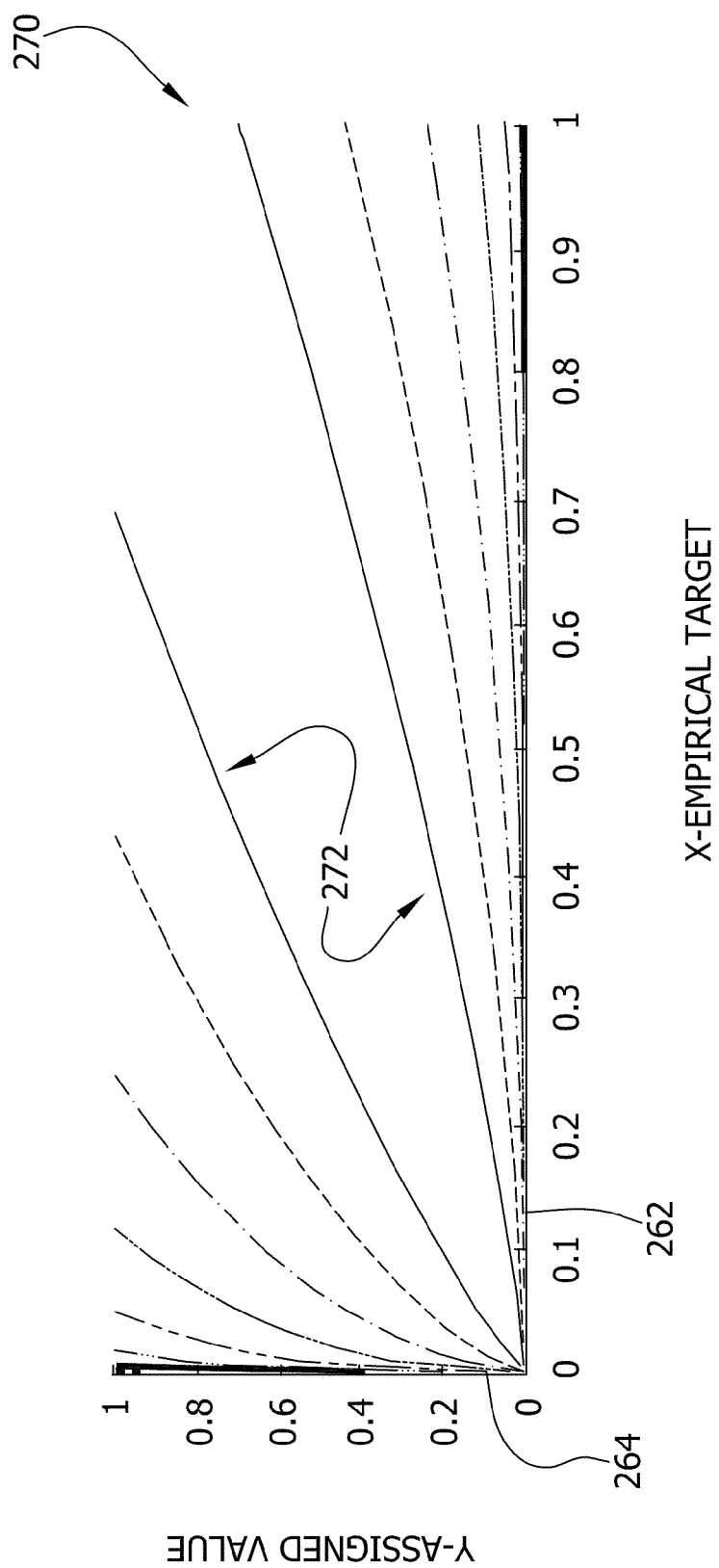
FIG. 10 is a two-dimensional graphical representation of a probit transform function wherein adder $\epsilon=0.0001$.

FIG. 10 is a graphical two-dimensional graphical representation, or contour plot 270 of the probit transform function shown in FIG. 9, wherein adder $\epsilon$=0.0001 and wherein the adder is substantially equivalent to one basis point. Plot 270 includes x-axis 262 as described above with 0.1 unit increments and y-axis 264 as described above with 0.2 unit increments. Moreover, plot 270 also includes a plurality of contours 272 that are representative of portions of graph 260.

Referring to FIGS. 9 and 10, a plurality of trial values from y-axis 264 are compared to target values from x-axis 262 via equation (7) one at a time, wherein execution of such comparison is performed within system 10 (shown in FIG. 1) and values for f are determined. As these values of f diverge from zero or values close to zero, subsequent trial values are compared to the target values until the smallest value of f is achieved, preferably having a value as close to zero as practical. Specifically, for illustrative purposes using FIGS. 9 and 10, all possible values of x and y are used to generate surface plot 268 and contour plot 270, with contours 272. Surface plot 268 illustrates a large number of values of f along a diagonal extending from a point defined by x=0, y=0, and f=0 to a point defined by x=1, y=1, and f=0. Surface plot 268 also illustrates a concentration in the number of values of f along each of x-axis 262 and y-axis 264, wherein the function $f$ provides higher values in the low probability region and function $f$ values increase with gap size.

Moreover, FIGS. 9 and 10 demonstrate that the probit transform function complies with the symmetry property, the relativity property, the robustness property, the monotonicity property, and the simplicity property.

A second objective function to be evaluated is the exponential function. The expression for the exponential function is given by:

$$f=(e^{|y-x|}-1)/e^x \qquad (8)$$

wherein the variable "x" is defined as a target transition probability value in the multi-year ETPM and the variable "y" is defined as a candidate transition probability value in the trial OTPM, both as described in generally 172 defining each target transition probability in an ETPM and generally 174 defining each candidate transition probability value in an OTPM, respectively, above.

Figure 11:
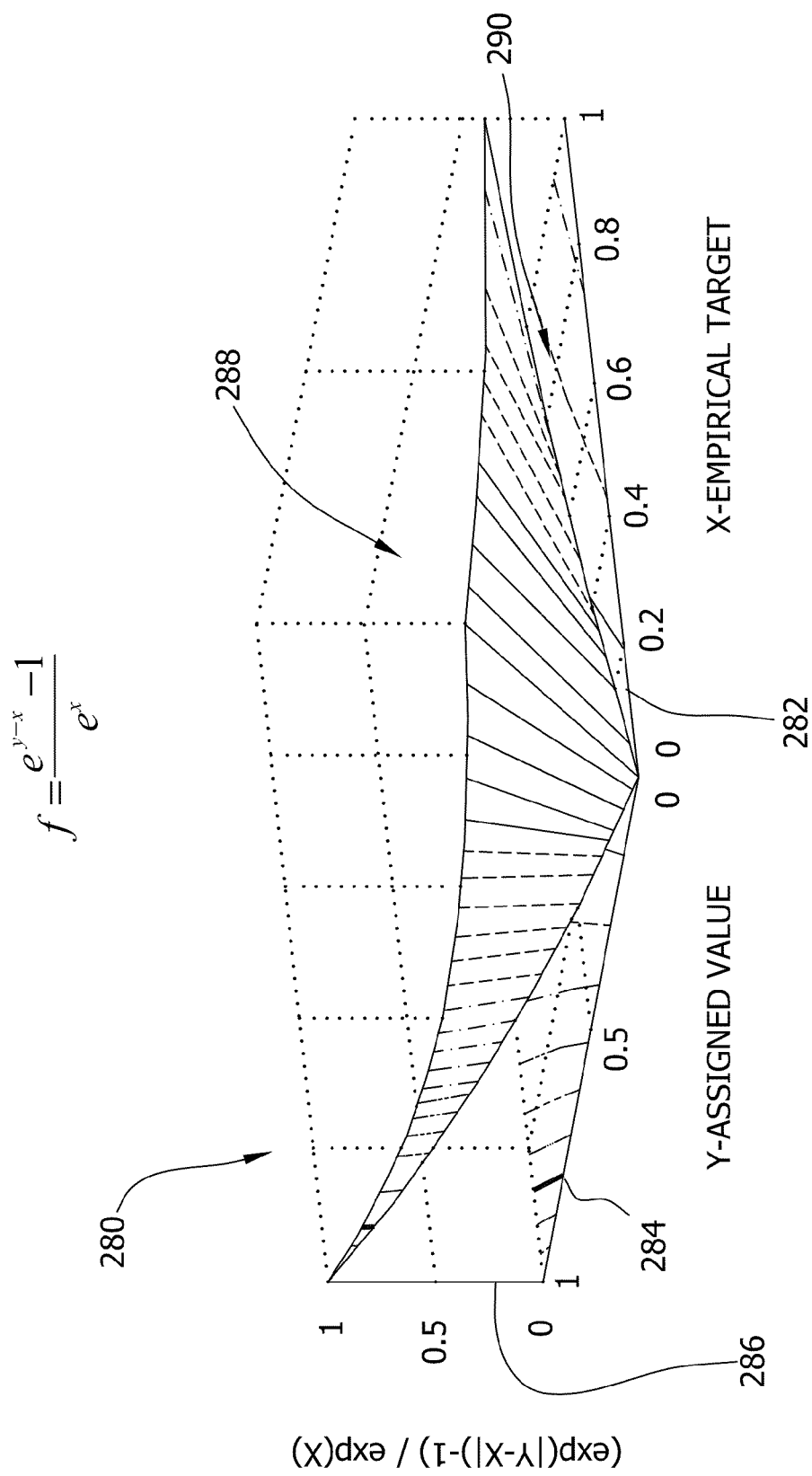
FIG. 11 is a three-dimensional graphical representation of a exponential function.

FIG. 11 is a three-dimensional graphical representation, or 3-D graph 280 of an exponential function. Graph 280 includes an abscissa, or x-axis 282 that is representative of empirical target values that provide the reference for the subsequent operations as described herein. Moreover, x-axis 282 includes a range of values that extends from 0 to 1 in increments of 0.2. The increments defined on x-axis 282 are unitless and are selected for illustrative purposes. Therefore, x-axis 282 is at least partially analogous to a range of empirical target values associated with an ETPM (not shown), wherein the variable "x" is defined as a target transition probability value in the multi-year ETPM.

Graph 280 also includes an ordinate, or y-axis 284 that is representative of a range of assigned values that provide candidate values used for the subsequent operations as described herein. Moreover, y-axis 284 includes a range of values that extends from 0 to 1 in increments of 0.5. The increments defined on y-axis 284 are unitless and are selected for illustrative purposes. Therefore, y-axis 284 is at least partially analogous to a range of candidate values associated with a trial OTPM (not shown), wherein the variable "y" is defined as a candidate transition probability value in the trial OTPM.

Graph 280 further includes a f-axis 286 that is representative of a range of values resulting from the operation indicated by equation (8) (shown above). Moreover, f-axis 286 includes a range of values that extends from 0 to 1 in increments of 0.5. The increments defined on f-axis 286 are unitless and are selected for illustrative purposes.

Graph 280 also includes a surface plot 288 that is representative of the entire set of possible values on f-axis 286 derived from operations of equation (8) over the entire ranges of x-axis 282 and y-axis 284. Moreover, graph 280 includes a contour plot 290 that is representative of at least a portion of surface plot 288 collapsed into a two-dimensional representation of surface plot 288.

Figure 12:
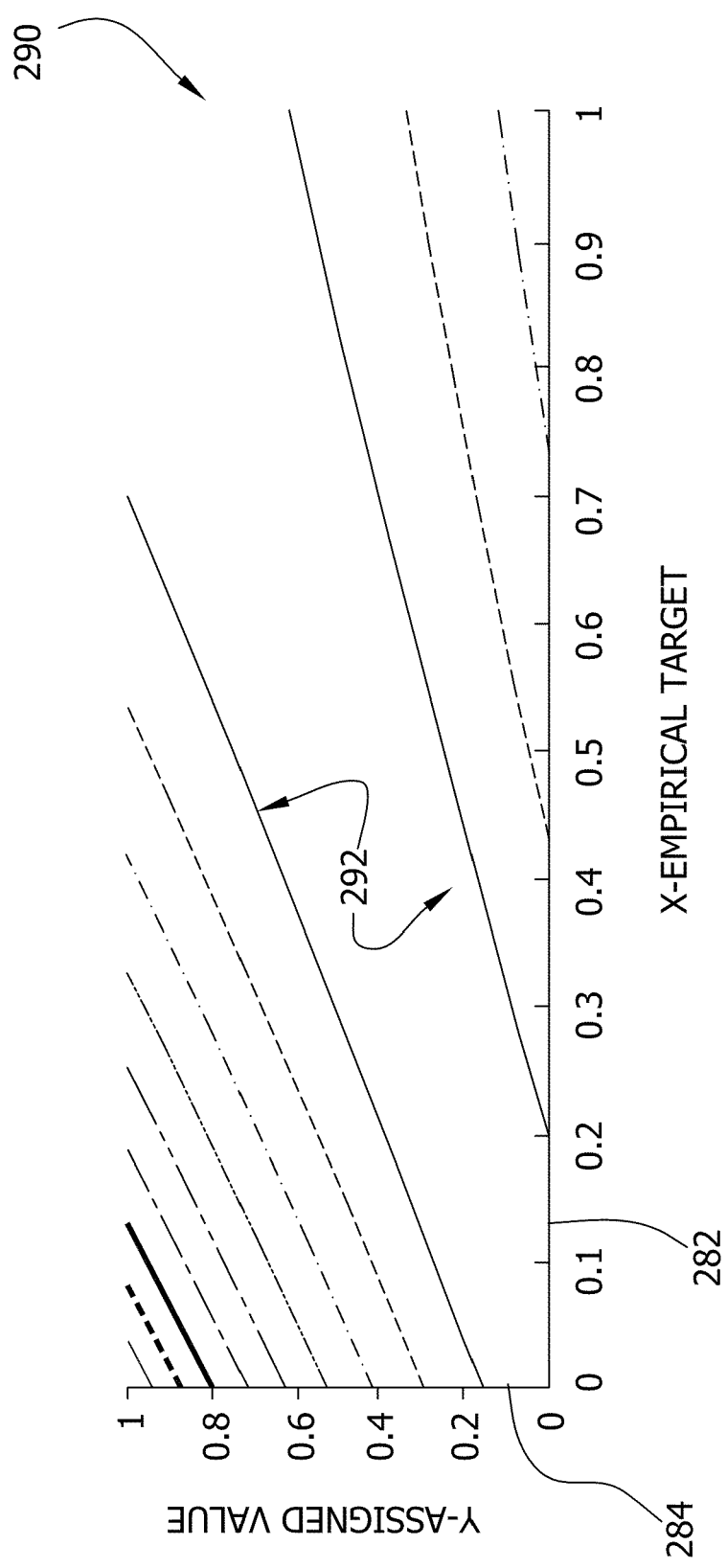
FIG. 12 is a two-dimensional graphical representation of a exponential function.

FIG. 12 is a graphical two-dimensional graphical representation, or contour plot 290 of the exponential function shown in FIG. 11. Plot 290 includes x-axis 282 as described above with 0.1 unit increments and y-axis 284 as described above with 0.2 unit increments. Moreover, plot 290 also includes a plurality of contours 292 that are representative of portions of graph 280.

Referring to FIGS. 11 and 12, a plurality of trial values from y-axis 284 are compared to target values from x-axis 282 via equation (8) one at a time, wherein execution of such comparison is performed within system 10 (shown in FIG. 1) and values for f are determined. As these values off diverge from zero or values close to zero, subsequent trial values are compared to the target values until the smallest value of f is achieved, preferably having a value as close to zero as practical. Specifically, for illustrative purposes using FIGS. 11 and 12, all possible values of x and y are used to generate surface plot 288 and contour plot 290, with contours 292. Surface plot 288 illustrates a large number of values of f along a diagonal extending from a point defined by x=0, y=0, and f=0 to a point defined by x=1, y=1, and f=0. Surface plot 288 also illustrates a steady reduction in the number of values of f as each of x and y individually approach a value of 1, wherein f also approaches 1 and approximately 0.632. Further, the function $f$ provides a curved surface plot 288, wherein function $f$ values increase exponentially with gap size.

Moreover, FIGS. 11 and 12 demonstrate that the exponential function complies with the symmetry property, the relativity property, the robustness property, the monotonicity property, and the simplicity property.

In the exemplary embodiment, the exponential and probit transform functions are used within the optimization framework since both functions substantially satisfy all of the desired properties and therefore substantially provide the predetermined behavior. The technical effect of selecting the exponential and probit transform functions includes selection of the algorithms that are used to enable the optimization framework. Alternatively, any function that satisfies the required properties and enables operation of system 10 as described herein is used. Such alternative functions include, but are not limited to, squared delta, relative absolute delta, and weighted square delta functions.

Referring to FIG. 4, wherein FIG. 4 is a portion of flowchart 100 continued from FIG. 3, after selecting 112 an objective function from a plurality of objective functions for calculating an OTPM, the process also includes generating 114 a mathematical expression to minimize a difference between target ETPM values and candidate OTPM values within server system 12 (shown in FIG. 1).

Figure 13:
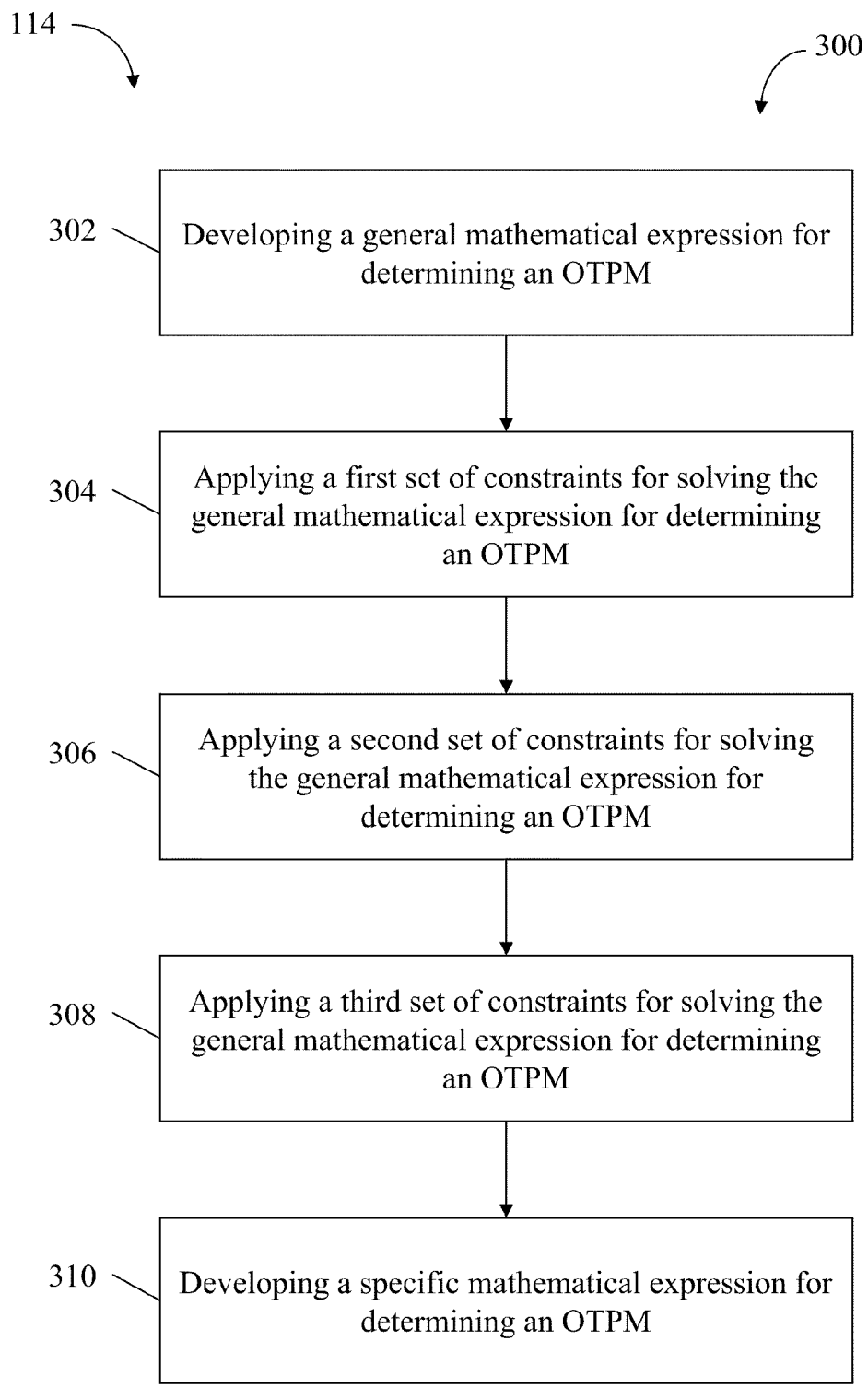
FIG. 13 is a more detailed flowchart illustrating exemplary processes utilized by the system shown in FIG. 1 relating to developing a general expression for determining an OTPM.

FIG. 13 is a more detailed flowchart 300 illustrating exemplary processes relating to generating 114 (FIG. 4) at least one mathematical expression to minimize a difference between target ETPM values and candidate OTPM values (shown in FIG. 4). Flowchart 300 includes developing 302 a general mathematical expression for determining an OTPM. The general expression for the optimization process is:

$$\operatorname*{Min}_{M} f(M_t, M'_t, w_t, w_{ij}) \tag{9}$$

wherein Min represents the mathematical minimize operation, $M_t$ represents a determined OTPM raised to the $t^{th}$ year, that is, $M_t = M^t$, $M'_t$ represents a $t^{th}$ year ETPM, $w_t$ represents a predetermined optimization weight for the $t^{th}$ year, and $w_{ij}$ represents a predetermined optimization weight for transition probability from an $i^{th}$ to $j^{th}$ credit rating categories, wherein each are discussed further below. In the exemplary embodiment, $M_t$ represents a variable, that is, a plurality of trial matrix values used to determine the OTPM. Also, in the exemplary embodiment, $M'_t$ represents a constant, that is, a plurality of constant empirical matrix values based on historical data. Further, in the exemplary embodiment, $w_t$ and $w_{ij}$ represent weighting constants that are predetermined as described further below. Alternatively, $M'_t$ represents a plurality of historical matrix values that are generated as a function of time and business parameters as selected by the operator of system 10. Also, alternatively, $w_t$ and $w_{ij}$ represent variable weighting values that are generated as a function of time and business parameters as selected by the operator of system 10. Moreover, the function $f(M_t, M'_t, w_t, w_{ij})$ represents either of the selected objective functions, that is, the exponential function or the probit transform function with the variables and constants of $M_t$, $M'_t$, $w_t$, and $w_{ij}$ as described above.

Equation (9) as defined above facilitates reducing differential values between $M_t$ and $M'_t$ to a substantial minimum, or more specifically, a difference represented by $M_t$ minus $M'_t$ for each of the associated values within the matrices. Minimizing such a difference enables generating an OTPM, or $M_t$ that is representative of historical data within a target ETPM, or $M'_t$. Such difference is defined by an operator selection of objective function and weights. The technical effect is that system 10 generates a matrix of values, or $M_t$, by iteratively solving equation (9) for values of $M_t$ that have a near-zero, or zero, variance from the associated values within $M'_t$. A plurality of constraints are applied to the operation of determining $M_t$ via solving equation (9). In the exemplary embodiment, three constraints are applied to equation (9). Alternatively, any number of constraints that enables use of equation (9) within system 10 as described herein is used.

Flowchart 300 also includes applying 304 a first set of constraints for solving the general mathematical expression, that is equation (9), for determining an OTPM. The technical effect of an application of a first set of constraints includes determining each row of $M_t$ (the $t^{th}$ year OTPM) such that a sum of each row is substantially equivalent to one. This constraint is a strict equality constraint and is represented by:

$$\sum_{j=1}^{N} m_{t,ij} = 1, \forall i \in \{1, \ldots, N\}, \forall t \in \{1, \ldots, T\} \tag{10}$$

wherein, $m_{t,ij}$ represents a cell in the $i^{th}$ row and $j^{th}$ column of $M_t$, wherein $M_t$ has N rows and N columns.

Flowchart 300 further includes applying 306 a second set of constraints for solving the general mathematical expression, that is, equation (9) for determining an OTPM. The technical effect of an application of a second set of constraints includes implementation of the monotonic decreasing property as described above, including using equation (6b). That is, a decreasing trend of the result from equation (9) above remains substantially decreasing through the ranges of all y and x. Moreover, the second constraint of decreasing monotonicity acts as a mechanism to smooth out the probability surface of the associated three-dimensional graphical representation of the associated objective function, wherein the probability surface is similar to those illustrated in FIGS. 9 and 11. Such a decreasing monotonic constraint is represented by:

$$m_{t,ik} < m_{t,ij} < m_{t,ii}, \text{ if } i > j > k, \forall i \in \{1, \ldots, N-1\}, \forall t \in \{1, \ldots, T\} \tag{11a}$$

$$m_{t,ii} > m_{t,ij} > m_{t,ik}, \text{ if } i < j < k, \forall i \in \{1, \ldots, N-1\}, \forall t \in \{1, \ldots, T\} \tag{11b}$$

wherein, these constraints are established wherein $M_t$ has N increments in the x-dimension associated with i, N increments in the y-dimension associated with j, and N increments in the z-dimension associated with k. Further, these constraints are established wherein $m_{t,ik}$ represents a cell defined by the $i^{th}$ increment along the x-axis and $k^{th}$ increment along the z-axis for a defined set of j within $M_t$, $m_{t,ij}$ represents a cell defined by the $i^{th}$ increment along the x-axis and the $j^{th}$ increment along the y-axis for a defined set of k within $M_t$, and $m_{t,ii}$ represents a cell at least partially defined by plurality of $i^{th}$ increments along the x-axis for a defined set of j and k within $M_t$.

In the exemplary embodiment, these monotonic decreasing constraints are applied to equation (9) within a framework of one-year TPMs exclusively such that an associated search space is defined by a linear polyhedron, wherein system 10 generates solutions to equation (9) using predetermined processing resources for a predetermined period of time, wherein such linear polyhedra facilitate expedient and efficient use of these resources and time due to a relative simplicity of these linear polyhedra. Alternatively, system 10 includes sufficient processing resources and is programmed and configured to use more complicated non-linear polyhedra, wherein the decreasing monotonic constraints are applied to matrices having greater than a one-year time horizon.

Flowchart 300 also includes applying 308 a third set of constraints for solving the general mathematical expression, that is, equation (9) for determining an OTPM. The technical effect of an application of a third set of constraints includes implementation of the monotonic increasing property as described above, including using equation (6a). That is, an increasing trend of the result from equation (9) above remains substantially increasing through the ranges of all y and x. Moreover, the third constraint of increasing monotonicity cooperates with the second, or decreasing monotonic constraint as discussed above, and acts as a mechanism to smooth out the probability surface of the associated three-dimensional graphical representation of the associated objective function, wherein the probability surface is similar to those illustrated in FIGS. 9 and 11. Such an increasing monotonic constraint is represented by:

$$m_{t,iN} < m_{t,Nj}, \text{ if } i < j, i \neq j \neq N, \forall t \in \{1, \ldots, T\} \tag{12}$$

wherein, $m_{t,iN}$ represents a cell in the $i^{th}$ row and $N^{th}$ column of $M_t$, $m_{t,Nj}$ represents a cell in the $N^{th}$ row and $j^{th}$ column of $M_t$, and $M_t$ has N rows and N columns. Therefore, in the exemplary embodiment, the default term structure is monotonically increasing with respect to the rating categories.

In alternative embodiments, additional constraints that facilitate monotonicity over time may also be introduced. As a result, the complexity associated with solution of equation (9) increases due to characteristics that include, but are not limited to, non-linearity.

As discussed above, and referring to equation (9), $w_t$ represents a predetermined optimization weight for the $t^{th}$ year, and $w_{ij}$ represents a predetermined optimization weight for transition probability from an $i^{th}$ to $j^{th}$ credit rating categories By varying these weights, optimization can be customized to emphasize defaults, transitions, or specific ratings categories, according to business needs.

Flowchart 300 further includes developing 310 a specific mathematical expression for determining an OTPM. Specifically, generating 114 at least one mathematical expression (shown in FIG. 4) is completed by directly applying the three constraints discussed above and defined in equations (10), (11a), (11b), and (12) to equation (9) to derive specific equations associated with each of the exponential and probit transform objective functions, respectively, as follows:

$$\operatorname*{Min}_{M} \sum_{t=1}^{T} \sum_{i=1}^{N} \sum_{j=1}^{N} w_t, w_{ij}\left[e^{|m_{t,ij} - m'_{t,ij}|} - 1\right] / e^{m'_{t,ij}} \quad (13)$$

and, $$\operatorname*{Min}_{M} \sum_{t=1}^{T} \sum_{i=1}^{N} \sum_{j=1}^{N} w_t, w_{ij}|\Phi^{-1}[(m_{t,ij} + \varepsilon)/2] - \Phi^{-1}[(m'_{t,ij} + \varepsilon)/2]| \quad (14)$$

wherein, $m'_{t,ij}$ represents a cell in the $i^{th}$ row and $j^{th}$ column of $M'_t$, wherein $M'_t$ has N rows and N columns.

In the exemplary embodiment, only one of the two functions as shown in equations (13) and (14) is used. Alternatively, both functions are used independently and the results of each are compared with each other. However, typically, it is not necessary to solve a multi-objective optimization with both functions simultaneously as there are not obvious benefits or tradeoffs between the two functions.

Referring again to FIG. 4, after generating 114 a mathematical expression to minimize a difference between target ETPM values and candidate OTPM values, the process further includes calculating 116 a baseline OTPM. The baseline OTPM includes a first set of optimized credit rating transition probability values for predicting a likelihood that a credit rating of an obligor will migrate from one credit state to another credit state during a first time interval in the future. In the exemplary embodiment, data is used from the dataset generated as described above per retrieving 106 financial data from a database for creating the ETPMs (shown in FIG. 3). Alternatively, any data that enables generation of a baseline OTPM via system 10 is used. Also, in the exemplary embodiment, an overall future time horizon of five years is selected per selecting 104 a time horizon (shown in FIG. 3), wherein such time horizon will be used to determine the baseline OTPM. Alternatively, any future time horizon that enables generation of a baseline OTPM via system 10 is used. Moreover, the process includes selecting a number of observation periods and a time interval to determine the baseline OTPM in a manner similar to that for generating an ETPM as described above.

Figure 14:
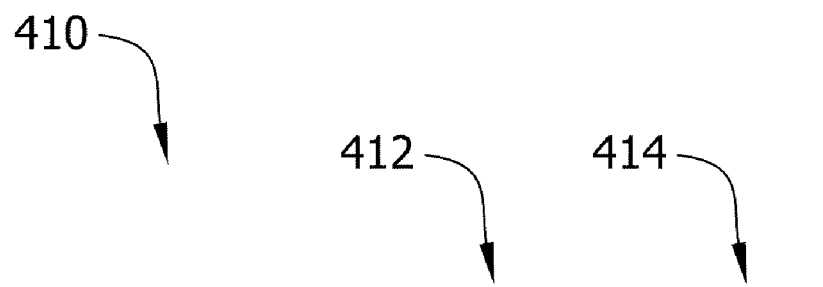
FIG. 14 is a table of time weights used to determine an OTPM.

As discussed above, and referring to equations (9), (13), and (14), $w_t$ represents a predetermined optimization weight for the $t^{th}$ year, and $w_{ij}$ represents a predetermined optimization weight for transition probability from an $i^{th}$ to $j_{th}$ credit rating categories By varying these weights, optimization can be customized to emphasize defaults, transitions, or specific ratings categories, according to business needs. FIG. 14 is a table 410 of time weights used to determine a baseline OTPM. Table 410 includes a plurality of values for $w_{ij}$ 412, wherein, in the exemplary embodiment, a substantially uniform set of values of 100% is selected for each one of the years 1 through 5. Such selection facilitates determining each probability of transition from one credit rating to another in each year as a function of empirical data and/or determined future probabilities purely as a function of such historical data and/or future probability determination without weighting any one year's data and/or probabilities any differently than the other years' data and/or probabilities. Table 410 also includes a plurality of values for $w_t$ 414, wherein, in the exemplary embodiment, a substantially uniform set of values of 100% is selected for each of years one through five. These values facilitate equal weighting of all five years. Alternatively, a substantially decreasing set of values of 100%, 71%, 51%, 36%, and 26% may be selected for years 1 through 5, respectively. These values facilitate emphasizing a relative importance of the closer years in contrast to the further years.

In the exemplary embodiment, baseline OTPMs are generated using both exponential and probit transform functions using equations (13) and (14), respectively, as discussed above to enable minimizing differences between the target ETPM and the generated OTPM trial values. In the exemplary embodiment, each objective function generates substantially similar results.

Further, in the exemplary embodiment, the baseline OTPMs are generated using a commercial solver stored within system 10 that is suitable for the complex nature of the nonlinear optimization determination. Such solver typically performs the iterative calculations for several hours and terminate when the determined values converge within a reasonable tolerance of difference from the associated ETPM values. These determination times are based on conditions that include, but are not limited to, processing resources, the quantity of empirical data, and the number of years of determined OTPMs.

In the exemplary embodiment, probabilities of transition for each of rating categories AAA, AA, A, BBB, BB, B, CCC, C, and default (D) are determined, wherein such credit ratings are referenced to the Standard and Poor's rating system. Alternatively, any number of credit ratings using any rating system are used.

Figure 15:
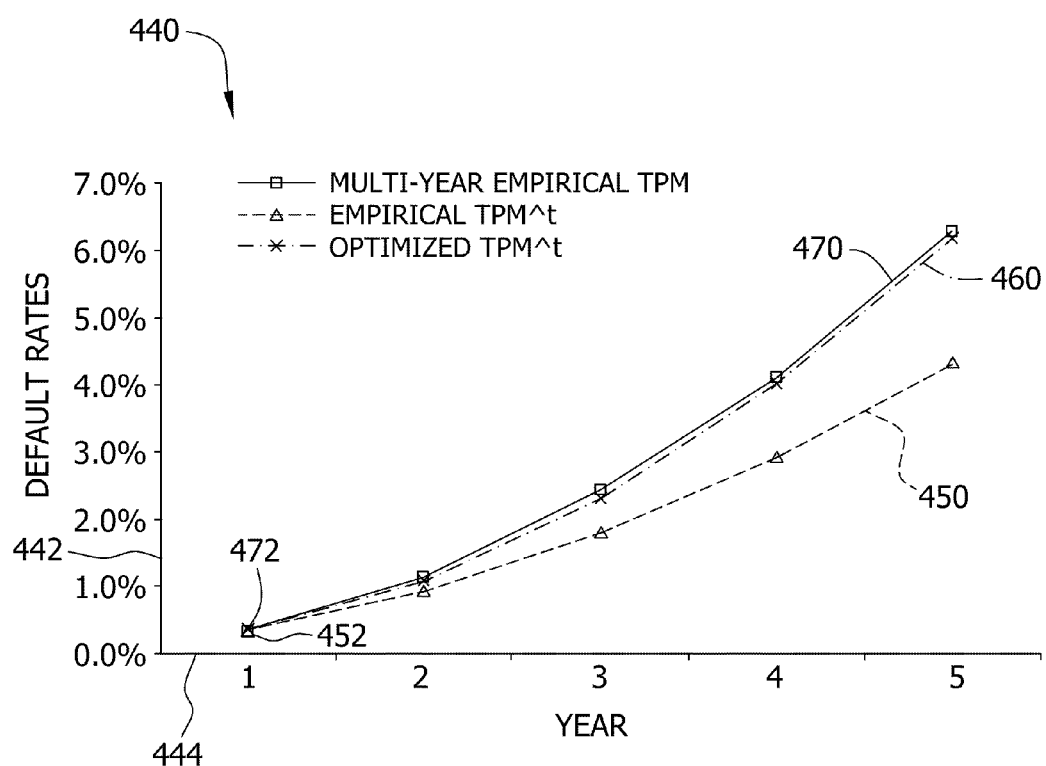
FIG. 15 is a graphical representation of a plurality of TPMs including a multi-year empirical TPM, an empirical TPM and an OTPM.

FIG. 15 is a graphical representation 440 of a plurality of TPMs forming a default term structure. For purposes of this disclosure, the performance of the TPMs is illustrated herein primarily focusing on the default (D) term structure over the five-year period. Therefore, specifically, FIG. 15 illustrates a probability of transition from a BBB credit rating to a D credit rating, or default condition, for each of the five years under consideration. Graph 440 includes a y-axis 442 that is graduated in increments of 1.0%. Graph 440 also includes a x-axis 444 that is graduated in increments of years, from year zero (0) to year five (5).

For exemplary purposes, the multi-year ETPM illustrated in FIG. 15, and described further below, is based on empirical data for the five year period shown. More specifically, for the multi-year ETPM exclusively, years 1 through 5 are years in the past, wherein year 0 is the baseline year five years ago. The multi-year ETPM is generated per generating 110 the ETPMs as described above, wherein data from a predetermined number of years prior to the baseline year, that is empirical historical data for each of the pre-baseline years under consideration, is used. The multi-year ETPM is generated in this manner, that is, using empirical data, to provide an "actuals curve". Such an "actuals curve" is a curve substantially representing actual transition data associated with transitions from a BBB credit rating to a D credit rating, or default condition, for each of the five years under consideration for the selected business(es) and/or geographical sector(s).

Further, for exemplary purposes, the OTPM illustrated in FIG. 15, and described further below, is based on calculating 116 a baseline OTPM at year 0 using the methods as described above. Specifically, the baseline OTPM is determined as described herein such that the difference between the OTPM and the multi-year ETPM prior to the baseline year is minimized. Also, for years 1 through 5, additional sets of OTPM values are calculated, wherein such future OTPMs are generated per calculating 118 additional sets of OTPM values, as described further below. Such additional sets of OTPM values, or OTPMs, are compared to actual, empirical data, that is, the multi-year ETPMs, in FIG. 15 to determine an effectiveness and reliability of such OTPMs.

Graph 440 further includes a curve 450 that represents a one-year discrete ETPM generated for year 0 raised to the $t^{th}$ power from year 0 as described herein, wherein t is the number of years (an integer) starting with year 1. Curve 450 includes a point 452 that is representative of matrix cell (not shown), wherein such matrix cell includes a probability value of a particular credit rating shifting from a BBB rating to a default state. Curve 450 also includes a plurality of data points, specifically, one data point for each of years 2 through 5 (not shown), wherein such curve 450 is illustrated as smoothed through such points.

Graph 440 also includes a curve 460 that represents a multi-year ETPM developed as described herein. Specifically, curve 460 is developed for years 1 through 5 per generating 110 the ETPMs as described above. In a manner similar to curve 450, curve 460 is formed from a plurality of points, wherein each point is generated for each of years 1 through 5, and each point represents a one-year actual probability of transition from a BBB credit rating to a D credit rating for that particular year.

Graph 440 further includes a curve 470 that represents an OTPM developed as described herein. Once the baseline OTPM is generated for year 0 as discussed above, such baseline OTPM is raised to the tth power, wherein t is the number of years of interest in the future, and wherein t is an integer representing the number of future years starting with year 1. Calculating additional sets of optimized transition probability values by raising the calculated OTPM to successive powers, wherein each successive power represents a subsequent future time interval, generates each additional set of optimized transition probability values that predicts a likelihood that a credit rating of an obligor will migrate from one credit state to another credit state during the corresponding future time interval.

Curve 470 includes a point 472 that is representative of a matrix cell (not shown), wherein such matrix cell includes a probability value of a particular credit rating shifting from a BBB rating to a default state. Curve 470 also includes a plurality of data points, specifically, one data point for each of years 2 through 5 (not shown), wherein such curve 470 is illustrated as smoothed through such points.

In the exemplary embodiment, curve 470 is substantially similar to curve 460 for year 1 through year 5. Therefore, OTPM curve 470, determined under the premise of years 1 through 5 being in the future using the processes described herein, is substantially similar to the multi-year ETPM curve 460 that is determined under the premise of years 1 through 5 providing historical data reflecting actual credit rating transitions for the period under consideration. Substantially similar results have been developed for all credit rating transition probabilities using this methodology, with the illustrated example being typical of the results. Therefore, the processes described herein for optimizing a framework for generating transition probability matrices (TPMs) provide a high degree of confidence for predicting future probabilities of credit rating migration.

Figure 16:
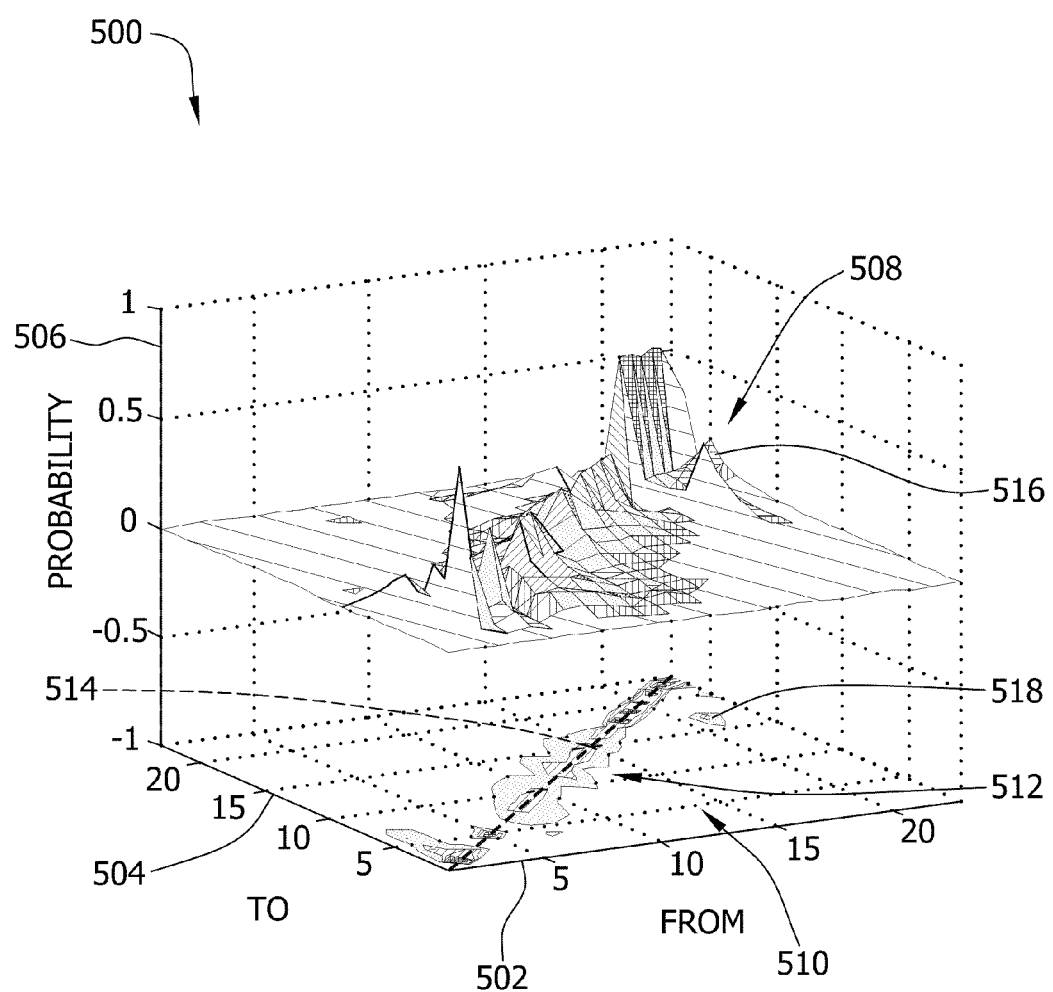
FIG. 16 is a three-dimensional graphical representation of a surface plot of a discrete cohort ETPM illustrating lack of the monotonicity property.

FIG. 16 is a three-dimensional graphical representation, or 3-D graph 500 of a surface plot of a discrete cohort ETPM (not shown) illustrating a lack of the monotonicity property, wherein the monotonicity property is described above, including equation (5). Graph 500 includes an abscissa, or x-axis 502 that is representative of a range of empirical "from" values, that is, values that represent the starting point for a potential transition. Moreover, x-axis 502 includes a range of values that extends from 0 to 22 in increments of 5 from 0 through 20 and an increment of 2 from 20 to 22. The increments defined on x-axis 502 are unitless and are selected for illustrative purposes. Therefore, x-axis 502 is at least partially analogous to a range of existing credit rating values associated with a discrete, cohort ETPM (not shown).

Graph 500 also includes an ordinate, or y-axis 504 that is representative of a range of empirical "to" values, that is, values that represent the end point for a potential transition. Moreover, y-axis 504 includes a range of values that extends from 0 to 22 in increments of 5 from 0 through 20 and an increment of 2 from 20 to 22. The increments defined on y-axis 504 are unitless and are selected for illustrative purposes. Therefore, y-axis 504 is at least partially analogous to a range of final credit rating values associated with a discrete, cohort ETPM (not shown).

Graph 500 further includes a P-axis 506 that is representative of a range of values associated with a probability of transition from a value on x-axis 502 to a value on y-axis 504. Moreover, P-axis 506 includes a range of values that extends from 0 to 1 in increments of 0.5. The increments defined on P-axis 506 are unitless and are selected for illustrative purposes. P-axis 506 also includes a range of values that extends from 0 to −1 in increments of 0.5, wherein these negative values representative of negative probabilities are not possible, yet inclusion of these values graphically facilitates visual interpretation of graph 500, as discussed further below.

Graph 500 also includes a surface plot 508 that is representative of the entire set of possible values on P-axis 506 as a function of all possible values of x-axis 502 and y-axis 504. Moreover, graph 500 includes a contour plot 510 that is representative of at least a portion of surface plot 508 collapsed into a two-dimensional representation of surface plot 508. Contour plot 510 includes a plurality of contours 512, wherein these contours 512 form a diagonal 514 extending from a point defined by x=0, y=0, and P=1 to a point defined by x=22, y=22, and P=−1. The negative range of P-axis 506 effectively raises surface plot 508 above contour plot 510 such that contour plot 510, contours 512, and diagonal 514 are clearly visible to facilitate interpretation of graph 500.

Graph 500 further includes a plurality of off-diagonal peaks 516 on surface plot 508 that are subsequently represented on contour plot 510 as a plurality of off-diagonal contours 518. These peaks 516 and contours 518 are representative of values and value trends that do not comport to the monotonicity property as defined herein.

Figure 17:
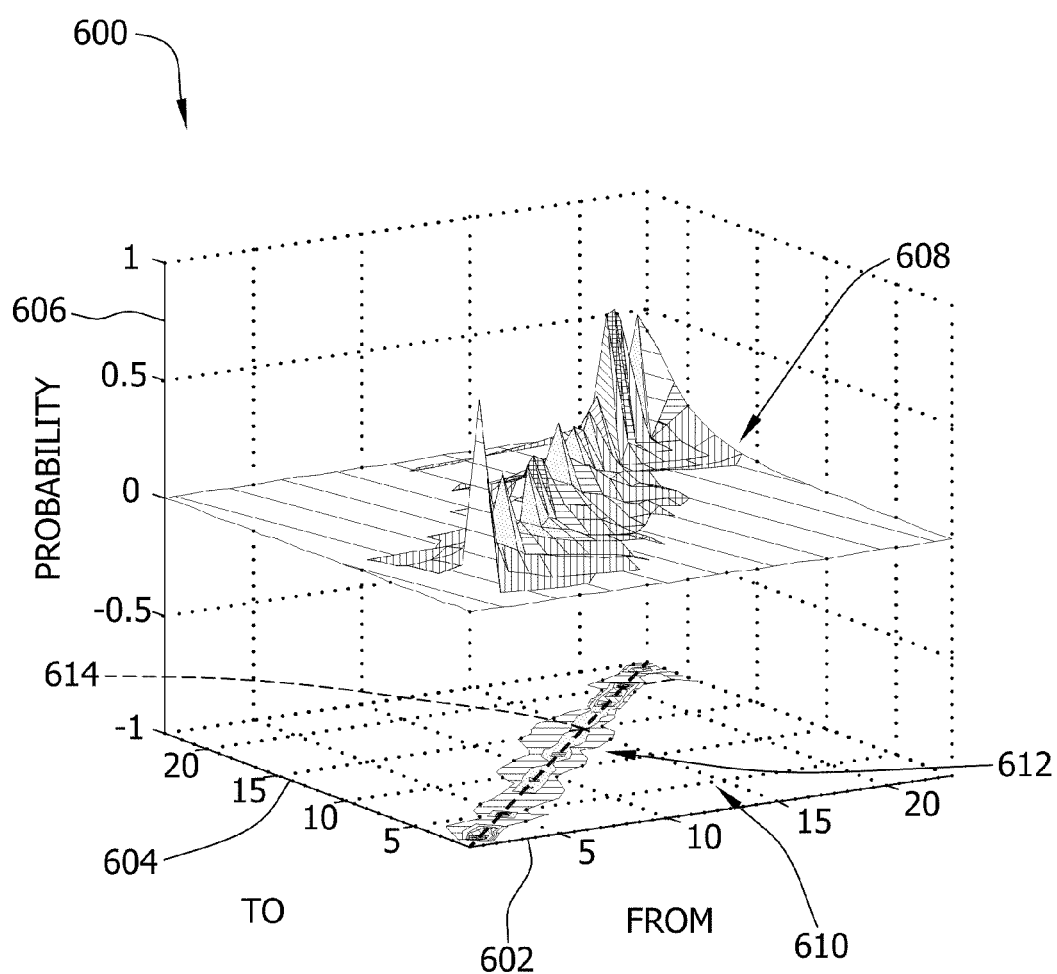
FIG. 17 is a three-dimensional graphical representation of a surface plot of a baseline OTPM illustrating the presence of the monotonicity property.

FIG. 17 is a three-dimensional graphical representation, or 3-D graph 600 of a baseline OTPM (not shown) illustrating a presence of the monotonicity property, wherein the monotonicity property is described above, including equation (5). Graph 600 includes an abscissa, or x-axis 602 that is representative of a range of empirical "from" values, that is, values that represent the starting point for a potential transition. Moreover, x-axis 602 includes a range of values that extends from 0 to 22 in increments of 5 from 0 through 20 and an increment of 2 from 20 to 22. The increments defined on x-axis 602 are unitless and are selected for illustrative purposes. Therefore, x-axis 602 is at least partially analogous to a range of existing credit rating values associated with an OTPM (not shown).

Graph 600 also includes an ordinate, or y-axis 604 that is representative of a range of empirical "to" values, that is, values that represent the end point for a potential transition. Moreover, y-axis 604 includes a range of values that extends from 0 to 22 in increments of 5 from 0 through 20 and an increment of 2 from 20 to 22. The increments defined on y-axis 604 are unitless and are selected for illustrative purposes. Therefore, y-axis 604 is at least partially analogous to a range of final credit rating values associated with an OTPM (not shown).

Graph 600 further includes a P-axis 606 that is representative of a range of values associated with a probability of transition from a value on x-axis 602 to a value on y-axis 604. Moreover, P-axis 606 includes a range of values that extends from 0 to 1 in increments of 0.5. The increments defined on P-axis 606 are unitless and are selected for illustrative purposes. P-axis 606 also includes a range of values that extends from 0 to −1 in increments of 0.5, wherein these negative values representative of negative probabilities are not possible, yet inclusion of these values graphically facilitates visual interpretation of graph 600, as discussed further below Graph 600 also includes a surface plot 608 that is representative of the entire set of possible values on P-axis 606 as a function of all possible values of x-axis 602 and y-axis 604. Moreover, graph 600 includes a contour plot 610 that is representative of at least a portion of surface plot 608 collapsed into a two-dimensional representation of surface plot 608. Contour plot 610 includes a plurality of contours 612, wherein these contours 612 form a diagonal 614 extending from a point defined by x=0, y=0, and P=1 to a point defined by x=22, y=22, and P=−1. The negative range of P-axis 606 effectively raises surface plot 608 above contour plot 610 such that contour plot 610, contours 612, and diagonal 614 are clearly visible to facilitate interpretation of graph 600.

In contrast to graph 500 (shown in FIG. 16), graph 600 does not include a plurality of off-diagonal peaks (such as peaks 516 shown in FIG. 16) on surface plot 608 that would be subsequently represented on contour plot 610 as a plurality of off-diagonal contours (such as contours 518 shown in FIG. 16). A lack of these peaks similar to peaks 516 and these contours similar to contours 518 is representative of values and value trends that comport to the monotonicity property as defined herein. Therefore, a baseline OTPM generated as described herein facilitates the monotonicity property, and subsequently, a matrix that when raised to a predetermined power is substantially accurate.

FIG. 18 is a table 630 of credit ratings within an OTPM determined using the process described herein. Table 630 includes a plurality of matrix cells, wherein an example of such matrix cells includes a matrix cell 632 that represents a calculated probability of transition from a BBB credit rating to a D, or default, credit rating of 0.11%. In the exemplary embodiment, probabilities of transition for each of rating categories AAA, AA, A, BBB, BB, B, CCC, C, and default (D) are determined. Alternatively, any number of credit ratings are determined.

Below is a description of at least some of the known approaches for using TPMs for estimating credit migration of an obligor, a description of at least some of the problems associated with using these known TPM approaches, and a description of the results generated from comparing some of these known TPM approaches to the optimized TPM systems and processes described herein.

Statistical transition probability matrices (TPMs), which indicate the likelihood of obligor credit state migration over a given time horizon, have been used in various credit decision-making applications. The standard for calculating TPMs is to form a one-year empirical TPM and then project it into the future based on Markov and time-homogeneity assumptions. However, the one-year TPM calculated from empirical data generally does not satisfy desired properties. The systems and processes described herein are an alternative methodology by formulating the problem as a constrained optimization problem requiring satisfaction of all the desired properties and minimize the forecasted error between multi-year predicted TPMs and empirical evidence. The problem is high dimensional, non-convex, and non-separable, and is not effectively solved by nonlinear programming methods. To address these difficulties, evolutionary algorithms (EAs) and problem representation schemas were investigated. A self-adaptive differential evolution algorithm (JADE), together with a new representation schema that automates constraint satisfaction, was discovered to be the most effective technique to resolve these problems.

Statistical transition probability matrices (TPMs), which indicate the likelihood of obligor credit state migration over a given time horizon, have been used in various high-dollar-value credit decision-making applications ranging from the pricing of financial instruments, loan evaluation, portfolio risk analysis, and economic capital assessment. Constructed from historical credit ratings data, a rectangular TPM contains information on the likelihood of migration from one credit state to another state. A TPM may include additional "outcome-only" states such as default, or "no longer observed". Empirical TPMs have been published regularly by rating agencies for many years and users have tended to use these published matrices either directly or after applying a certain smoothing technique.

The need for TPM data smoothing stems from the fact that empirical matrices are strongly affected by idiosyncratic historical events, sparse data for plausible future scenarios, and vintage effects caused by the temporal location of the underlying data relative to the credit cycle. Also, it is important to note that TPMs are often required for use over time periods longer than the widely published one-year time horizon. While empirical TPMs can be constructed over any time horizon, longer time horizon calculations reduce sample size, exacerbating idiosyncratic efforts. Thus, practitioners usually calculate one-year empirical TPMs by the discrete cohort approach and apply it iteratively for analysis over multi-year horizons.

The problem of one-year empirical TPMs however is that they usually lack desired properties such as structural stability and satisfaction of default probability constraints. The former comes from the natural tendency of obligors to maintain status quo and to have a greater probability of migrating to a nearer credit rating than a farther one. In other words, it is expected that in a TPM matrix the diagonal value for any particular rating is greater than off-diagonal values and the off-diagonal values decrease monotonically with the distance to the diagonal term. The probability of default is also expected to satisfy monotonic properties: the default probability increases over time for each credit rating, and in each year a higher rating tends to have a lower probability of default than a lower rating. These properties however may or may not be satisfied by the one-year empirical obtained by the discrete cohort approach.

Another consequence of applying the one-year empirical is that in practice one faces estimation "bias" induced by shortages in sample sizes, especially as the time horizon increases. One illustration of this "bias" is in the case where the default rates associated with coarse rating categories over a period of 5 years are different if the cumulative average method is employed versus using the empirical transition rates or the cumulative transition rates under the assumption of a first-order Markov process governing the transitions. However, these default rates are the same across the three estimation procedures when restricted to a one-year time horizon. Since transition to default is only a fraction of the information contained in a TPM (assuming that default is one of the states), and since each row of a TPM must add to one, estimation "bias" is propagated to the entire matrix and therefore undermines the validity and usefulness of TPMs.

The systems and processes described herein include an alternative approach to the discrete cohort approach, which poses the computing and smoothing of one-year TPM as a constrained optimization problem. The objective function to be minimized is an error function that calculates the discrepancy between the predicted transition matrices and the empirical data over the required time horizon. All the required structural properties of the one-year TPM are captured in the form of constraints. The problem however is complex due to the following reasons: (1) the objective function is highly non-linear due to the non-linear nature of the error function and the matrix exponential operation involved in calculating the later-year transition probability matrices; (2) the problem dimension is very high as the number of variables in the TPM is of the order of a few hundreds considering that there may be a large number of credit ratings; and (3) the optimized one-year TPM is expected to satisfy structural and default properties. Due to the above difficulties, a traditional non-linear programming method is not efficient to find the global optimal solution. Therefore, a set of population-based evolutionary algorithms, such as differential evolution (DE) and particle swarm optimization (PSO), were considered.

In a preliminary investigation, it was discovered that in view of the above mentioned problem complexities a straightforward adaptation of an EA approach did not yield satisfactory results: the algorithm either converged very slowly or frequently stagnated at a local minimum. Several variations of EA algorithms were used to find the best approach for the concerned optimization problem. In addition, an aspect impacting performance of an EA algorithm is the representation method of the problem. To fine-tune EA performance, several representation schemas were used. In the final product, the self-adaptive DE algorithm, JADE, was implemented as the optimizer based on a representation schema that implicitly satisfies constraints.

The industry standard for estimating discrete time credit transition probability matrices is the cohort approach. This approach applies to discrete credit migration data and employs two key assumptions: (1) future rating transitions are independent of past ratings (Markov assumption); and (2) the transition probabilities are solely a function of the distance between the calendar dates and are independent of the calendar dates (time-homogeneity assumption). In this approach, a discrete cohort TPM for one year is calculated. Then, a later-year TPM is obtained by raising the one-year TPM to a power.

Three types of error functions were considered including the square, the exponential and the probit for measuring the discrepancy between the predicted probability and the empirical data. Each of these functions has some advantages and disadvantages in measuring the discrepancy: e.g., the square and exponential functions are relatively easy to compute, while the probit function typically takes longer to compute; the square function treats the discrepancy on an absolute scale, while the exponential and probit functions work on a relative scale.

The above specification satisfies the structural constraints and the default constraints for the one-year TPM, by definition. The default constraints or structure constraints are not explicitly imposed on the later-year TPMs predicted by the one-year TPM. Instead, it is assumed that the error minimization procedure implicitly enforces these constraints. This is of course in general not true, but our results on a wide variety of test data show that these constraints are implicitly satisfied by the optimized TPM for later years. The objective function is non-convex and non-separable as a result of the power operation of the one-year TPM and the nonlinearity of the error function. An initial optimization procedure was attempted using a quasi Newton approximation-based non-linear programming approach provided by a standard mathematical programming package. However, even with a good starting point (the one year empirical TPM), we could rarely find a solution that was significantly better than the one-year empirical when the problem dimension was high. This motivated us to explore evolutionary optimization based ideas.

The success of the use of evolutionary optimization is contingent on finding a good representation schema for the problem and also selecting the most suitable EA from the plethora of evolutionary algorithm variants available.

As explained above, the TPM problems are highly non-linear optimization problems with large problem dimension and a large number of equality and inequality constraints. For example, we considered a problem with 22 credit ratings. The problem dimension is 462 and the number of constraints is at least 924. Due to the complexity of the underlying problem, a penalty function based approach for constraint enforcement in EA was deemed impractical.

Below, we discuss different representation schemas that make monotonicity constraint satisfaction inherent to the optimization problem. In addition, the problem dimension is reduced to $(n-1)^2$ by transforming the equality constraints into an inherent property of the representation methods. The optimization problem thus obtained has only boundary constraints so that an EA generates only feasible solutions at all times. We also consider the utilization of domain knowledge to facilitate the problem optimization.

To devise a constraint enforcing representation schema for evolutionary optimization, we initially tried a simple heuristic approach.

TABLE 1

A simple heuristics based representation schema

Scheme R1

Construct a solution $M = \{m_{ij}\}$, $i, j = 1, 2, \ldots, n$.
    from a matrix $X = \{x_{ij}\}$, $i, j = 1, 2, \ldots, n-1$.
$m_{n,1} = 1$; $m_{ni} = 0$ for $i = 1, 2, \ldots, n-1$.
Set $(y_1, y_2 \ldots y_{n-1}) = \text{sort}(x_{1,n-1}, x_{2,n-1})$ in ascending order
$m_{in} = y_i$, $i = 1, 2, \ldots, n-1$
FOR $i = 1$:n $-1$
    Set $(y_1, y_2, \ldots y_{n-2}) = \text{sort}(x_{i,1}, x_{i,2} \ldots x_{i, n-2})$ in descending order
    $m_{ii} = 1$; $j = k = i$; $l = 1$;
    WHILE $l \leq n-2$
        $j = j + 1$; $k = k - 1$;
        IF $j \leq n-1$
            $m_{i,j} = y_l$
            $l = l + 1$;
        END IF
        IF $k \geq 1$
            $m_{i,k} = y_l$
            $l = l + 1$
        END IF
    END WHILE
    $m_{ij} = m_{ij}/\Sigma_{j=1}^{n-1} m_{ij} \times (1-m_{in})$, $j = 1, 2, \ldots, n-1$
END FOR Table 1. A simple heuristics based representation schema We used a string of length $(n-1)^2$, where each element $\in [0, 1]$ represents a probability (or a probability to be normalized later), to construct an n×n TPM M in the following manner: (a) set the elements in the last row of M according to equation (10), (b) reshape the string into an $(n-1)\times(n-1)$ matrix X, (c) sort the last-column elements of X and set them to be the default probabilities in the last column of M, (d) set the diagonal terms of M to be 1, (e) sort the first $(n-2)$ elements in each row of X and set them to be the pending off-diagonal terms of M so that the row elements decrease in value as we move away from the diagonal, and (f) normalize the first n−1 elements in each row of M so that the row adds up to 1. The detailed operations are shown in Table 1.

However, the above representation schema has certain limitations, which are: (A) Since we sort the row elements or the last-column elements and rearrange them so as to satisfy the constraints in (11) or (12), the relative order of the elements of the string that are assigned to the same matrix row or assigned to the last column does not matter. That is, the mapping from the representation space to the solution space to is many to one: multiple chromosomes can represent a single solution matrix. (B) The sorting operation involved in solution decoding is computationally intensive and slows down the algorithm's response times. (C) The use of heuristics to rearrange the matrix so as to enforce constraint satisfaction leads to bias in the representation schema, i.e., certain feasible matrices have fewer chromosomes that represent them when compared to others. For example, using the approach in Table 1, we always assign sorted values first to the element on the right-hand side of the diagonal and then to the element on the other side. In this way, only matrices where the upper triangle dominates the lower triangle can be represented. (D) The representation schema does not use any domain knowledge. We determined that the use of domain knowledge is beneficial for successful application of EAs. The underlying problem for the TPM optimization is to modify the one-year ETPM so that it approximates higher order transitions better. It could therefore be useful to incorporate information about the one-year ETPM in the EA, which the above representation schema fails to do.

To overcome the problems described above, we devised another representation schema that produces only feasible solutions without the use of sorting. Similar to the previous method, we also use a string of length $(n-1)^2$, whose each element $\epsilon[0, 1]$, to construct a TPM M. For notational convenience, the string is also reshaped to an $(n-1)\times(n-1)$ matrix X. However, the meaning of each element $x_{ij}$ of X is different from that in the previous method: the last-column element of X represents a ratio between adjacent last-column elements of M (to satisfy the monotonic constraints), and each element in the first n−2 columns of X represents a ratio between adjacent row elements of M (to satisfy the monotonic constraints). The detailed operations are presented in Table 2, where cumprod calculates the cumulative product of an input vector.

TABLE 2

Representation Schema to automatically enforce constraints: cumprod(x) returns the cumulative product of an input vector x.

Scheme R2

Construct a solution M = $\{m_{ij}\}$, i, j = 1, 2, . . . , n,
from a matrix X = $\{x_{ij}\}$, i, j = 1, 2, . . . , n − 1.
$m_{nn}$ = 1; $m_{nl}$ = 0 for i = 1, 2, . . . , n − 1.
Set $(y_{n-1}, y_{n-2} \ldots y_1)$ = cumprod$(x_{n-1,n-1}, x_{n-2,n-1} \ldots x_{1,n-1})$
$m_{in}$ = $y_i$, i = 1, 2, . . . , n − 1
FOR i = 1 : n
   $m_{ii}$ = 1;
   FOR j = i + 1 : n − 1
      $m_{ij}$ = $m_{i(j-1)}$*$x_{i,j-1}$
   END
   FOR j = i − 1 : −1 : 1
      $m_{ij}$ = $m_{i(j+1)}$*$x_{i,j}$
   END
   $m_{ij}$ = $m_{ij}/\Sigma_{j=1}^{n-1} m_{ij} \times 1 - m_{in})$, j = 1, 2, . . . , n − 1
END This representation schema automatically satisfies the monotonicity constraints. Furthermore, there is a one-to-one mapping between a solution string and the corresponding TPM matrix represented. However, this representation schema still does not address the issue of the use of domain knowledge.

A good starting point for the optimization problem is a smoothed estimate of the one-year empirical matrix. Our experience with the non-linear optimization mentioned above supported this belief since there were significant improvements when using the one-year empirical to seed the search, instead of starting from a random solution vector.

To use this domain knowledge in our search procedure, we initially attempted to make the deviation from the one-year empirical matrix as the search variable. That is, let Y represent the one-year empirical matrix that is passed through a filtering process so that it satisfies the required constraints. The search variable M can be represented as M=Y+Δ where Δ is the deviation of the optimal matrix from the one year empirical. If Δ satisfies the monotonic constraints, then Y+Δ also satisfies the monotonic constraints. To enforce normality constraints on M, a simple normalization procedure can be used on (Y+Δ). Our approach was to use Δ as the search variable, instead of searching over M. Since a majority of elements of Δ are expected to be near zero, the search over Δ was assumed to be easier then searching over M. The search over Δ could be made easier by seeding the initial random population with a string whose all elements are zeros. This ensures that we start the search procedure at the smoothed version of the one-year empirical.

However, for this procedure, constraining each element $\Delta_{ij}$ of Δ will not represent the whole search space. For example, constraining $\Delta_{ij} \epsilon[0, 1]$ will constrain $m_{ij}$, the ijth element of the optimized TPM M, to the range $[y_{ij}/2, (y_{ij}+1)/2]$ assuming both Y and Δ are normalized so that rows sum to 1. Clearly, this does not represent the entire search space ($m_{ij} \epsilon[0, 1]$). In order to represent the entire search space, we should let $\Delta_{ij} \epsilon[0, \infty]$. However, relaxing the constraint on $\Delta_{ij}$ will no longer allow us to automatically implement constraints from the equations above. Another option would be allow negative values of $\Delta_{ij}$. Enforcing monotonic constraints is very difficult even in this scenario as can be easily verified. Therefore, modifying the representation schema to search over the deviation from the one-year empirical transition probability matrices was not possible.

To avoid this difficulty, we used an alternate procedure, R3, for using domain knowledge that includes: (1) Use representation schema in Table 2; and (2) Generate a chromosome which when using the schema in R2 gets translated into the one year empirical matrix Y. Using this methodology, we ensure that EA starts with the one year empirical and improves upon it in successive generations. The comparison of the three representation schemas R1, R2 and R3 is presented below.

Evolutionary algorithms are stochastic, population-based search methods that mimic the metaphor of natural biological evolution, such as mutation, recombination, selection, migration, locality and neighborhood. They generally operate on a population of potential solutions applying the principle of survival of the fittest to produce better and better approximations to a solution. As shown by successes in various fields such as engineering, finance, biology, evolutionary algorithms consistently perform well in searching optimal solutions to various types of problems. As discussed below, we describe the basic procedure of two canonical evolutionary algorithms: particle swarm optimization (PSO) and differential evolution (DE), and also introduce a novel self-adaptive DE algorithm.

Particle Swarm Optimization (PSO)

Particle swarm optimization (PSO) is an optimization technique based on swarm intelligence, proposed by Kennedy and Eberhart (Kennedy and Eberhart, 1995). While there are many variants of the algorithm since its invention, we introduce the basic PSO operations as follows.

The PSO is initialized with a population (called swarm) of N random individuals (called particles). Each particle is represented by its position in a D-dimensional space, where D is the problem dimension. Throughout the optimization process, each particle i monitors its current position $x_i=(x_{i1}, x_{i2}, \ldots, x_{iD})$, the best position it ever reached $p_i=(p_{i1}, p_{i2}, \ldots, p_{iD})$, and its flying velocity $v_i=(v_{i1}, v_{i2}, \ldots, v_{iD})$. The population benefits from sharing information among particles' discoveries and past experience to the whole population. In each generation (called a cycle), the global best position $p_g$ is calculated as the best position that the swarm ever reached. Then, each particle updates its velocity $v_i$ to approach the global best position and its personal best position:

$$v_i = w \cdot v_i + c_1 \cdot rand(0,1) \cdot (p_i - x_i) + c_2 \cdot rand(0,1) \cdot (p_g - x_i), \quad (15)$$

where $c_1$ and $c_2$ are two positive constants named learning factors, rand(a,b) is a uniform random number on the interval [a, b], w is an inertia weight to control the impact of the previous history of velocities on the current velocity. The inertia weight can be set as a constant or be decreased linearly with time, for example from 1.4 to 0.5, to favor local search more and more over global search.

The particle then updates positions using the new velocity:

$$x_i = x_i + v_i \quad (16)$$

It is worth noting that, to control the change of particles' velocities, upper and lower bounds for velocity change is limited to a user-specified value of $v_{max}$. Once the new position of a particle is calculated using equation (16), the particle moves to it and a new cycle begins.

Differential Evolution (DE) and Self-Adaptive Differential Evolution (JADE).

Differential evolution is another latest branch of EAs and was suggested by Storn and Price in 1995. The crucial idea behind DE is a scheme of generating mutant vectors: DE adds to a parent vector the weighted difference between two randomly selected vectors. This approach requires no separate probability distribution to generate mutant vectors and it makes the scheme self-organizing.

Similar to PSO and other EAs, differential evolution's performance is usually significantly affected by their problem-dependent control parameters. In general, there is no single parameter setting that is suitable for various problems or even at different evolution stages of a single problem. To address this issue, various parameter adaptation or self-adaptation strategies have been introduced to improve the performance of DE algorithms.

As discussed below, we briefly describe the operations of a conventional DE algorithm, DE/rand/1/bin, and a self-adaptive DE algorithm, JADE. The former is the first DE algorithm proposed in (Storn and Price, 1995) and is observed to be the most successful and widely used classic DE scheme in the literature. The latter shows very promising results compared to the classic DE/rand/1/bin and other self-adaptive approaches. Also, it differs from DE/rand/1/bin only in its mutation strategy and self-adaptation operation on control parameters.

Differential evolution follows the basic procedure of an evolutionary algorithm. The initial population is randomly generated according to a uniform distribution between the lower and upper bounds defined for each component of an individual vector. After the initialization, DE enters a loop (called a generation in the literature of EA) of evolutionary operations: mutation, crossover and selection. In addition, in an adaptive algorithm such as JADE, control parameters are adapted at the end of each generation.

Mutation: At each generation g, this operation creates mutant vectors $v_{i,g}$ based on the current parent population $\{x_{i,g}, i=1, 2, \ldots, NP\}$, where NP is the population size. In the classic DE/rand/1/bin, the mutation vectors are generated as follows:

$$v_{i,g} = x_{r2,g} + F \cdot (x_{r1,g} - x_{r2,g}), \quad (17)$$

where the indices $r_1$, $r_2$ and $r_3$ are distinct integers uniformly chosen from the set $\{1, 2, \ldots, NP\} \setminus \{i\}$, $x_{r1,g} - x_{r2,g}$ is a difference vector to mutate the parent, and $F \in (0, 1]$ is the mutation factor that is fixed throughout the optimization process.

Different from equation (17), JADE adopts a relatively greedy mutation strategy named 'DE/current-to-p-best/1':

$$v_{i,g} = x_{i,g} + F_i(x_{best,g}^p - x_{i,g}) + F_i(x_{r1,g} - x_{r2,g}), \quad (18)$$

where $x^p_{best,g}$ is randomly chosen as one of the top 100p % individuals in the current population, and $F_i \in (0, 1]$ is the mutation factor associated with each individual $x_{i,g}$ and are randomly generated by the parameter self-adaptation described below.

Crossover: After mutation, a 'binary' crossover operation forms the final trial vector $u_{i,g} = (u_{1,i,g}, u_{2,i,g}, \ldots, u_{D,i,g})$:

$$u_{j,i,g} = \begin{cases} v_{j,i,g} & \text{if } rand_j(0, 1) \le CR_i \text{ or } j = j_{rand} \\ x_{j,i,g} & \text{otherwise,} \end{cases} \quad (19)$$

where $rand_j(a,b)$ is a uniform random number on the interval (a, b] and newly generated for each j, $j_{rand}=randint_i(1, D)$ is an integer randomly chosen from 1 to D and newly generated for each i, and the crossover probability, $CR_i \in (0, 1]$, roughly corresponds to the average fraction of vector components that are inherited from the mutant vector. In JADE, the crossover probabilities are newly generated by the parameter self-adaptation at each generation. As a comparison, DE/rand/1/bin uses a single crossover probability CR (i.e., $CR_i = CR$ for all i) to generate all trial vectors during the whole optimization process.

Selection: The selection operation selects the better one from the parent vector $x_{i,g}$ and the trial vector $u_{i,g}$ according to their fitness values f( ) For example, since we consider a minimization problem, the selected vector is given by:

$$x_{i,g+1} = \begin{cases} u_{i,g} & \text{if } f(u_{i,g}) < f(x_{i,g}) \\ x_{i,g} & \text{otherwise,} \end{cases} \quad (20)$$

and used as a parent vector in the next generation. If the trial vector $u_{i,g}$ succeeds, the selection is considered as a successful update and the corresponding control parameters $F_i$ and $CR_i$ are called a successful mutation factor and successful crossover probability, respectively.

The above compose a complete evolutionary loop of the classic DE/rand/1/bin. The two involved control parameters, F and CR, are usually problem dependent and need to be tuned by trial and error. In JADE, F and CR are updated by a self-adaptation mechanism that is based on a simple principle: Better values of control parameters tend to generate individuals that are more likely to survive and thus these values should be propagated. To be specific, $F_i$ and $CR_i$ are generated by two random processes:

$$CR_i = randn_i(\mu_{CR}, 0, 1), \quad (21)$$

$$F_i = randc_i(\mu_F, 0, 1)^1, \quad (22)$$

where randn($\mu$, $\sigma^2$) denotes a random value from a normal distribution of mean $\mu$ and variance $\sigma^2$, randc($\mu$, $\delta$) denotes a random value from a Cauchy distribution with location and scale parameters $\mu$ and $\delta$, respectively. The mean $\mu_{CR}$ and location parameter $\mu_F$ are updated in a self-adaptive manner:

$$\mu_{CR}=(1-c)\mu_{CR}+c \cdot \text{mean}_A(S_{CR}), \quad (23)$$

$$\mu_F=(1-c)\mu_F+c \cdot \text{mean}_L(S_F), \quad (24)$$

where $S_{CR}$ and $S_F$ are the respective sets of all successful crossover probabilities and successful mutation factors obtained in the selection (20) at generation g, c is a positive constant between 0 and 1 and $\text{mean}_A(\ )$ is the usual arithmetic mean operation and $\text{mean}_L(\ )$ is the Lehmer mean $$\text{mean}_L(S_F) = \frac{\sum_{F \in S_F} F^2}{\sum_{F \in S_F} F}, \quad (25)$$

which plays more weight on larger mutation factor F to improve evolutionary progress.

The two parameters c and p introduced in JADE determine the adaptation rates of $\mu_{CR}$ and $\mu_F$ and the greediness of the mutation strategy, respectively. These have been shown to be relatively problem insensitive from extensive experimental studies. While it works well with c and p in a large range, JADE is shown to perform best with values $1/c \in [1, 20]$ and $p \in [5\%, 20\%]$.

We considered the TPM optimization problem based on the annual ratings data from Standard and Poor's for over 6,000 obligors over the time period from 1989 to 2005. This data contains 21 rating classes, which are condensed to 7 classes corresponding to S&P major rating categories. In the two scenarios where 7 or 21 credit ratings/categories plus default are considered, the respective TPM matrix to be optimized has n=8 and 22 rows and columns. As explained above, the dimensions D of these two problems are n(n−1), i.e., 56 and 462, respectively. For simplicity, we call the optimization in the two scenarios as small and large problems, respectively. In addition, we summarize in Table 3 the six optimization cases where different error functions are considered as the objective function of the small or the large problem. These are useful to test the applicability of the proposed algorithm to different error functions, each of which may satisfy different business needs. For convenience, we summarize in Table 4 the optimal results obtained by JADE after 20,000 generations in each optimization case. JADE works best among the several algorithms studied below and usually approaches the optimum very fast; thus the values in Table 4 may serve as reference points to estimate the performance of different algorithms after a moderate number of generations.

TABLE 3

Experimental scenarios studied in the optimization of TPM problems.

|  | Square | Exp | Probit |
|---|---|---|---|
| Small problem | Case 1 | Case 2 | Case 3 |
| Large problem | Case 4 | Case 5 | Case 6 |

TABLE 4

|  | Square | Exp | Probit |
|---|---|---|---|
| Small problem | 0.01311228 | 0.48003384 | 0.58578289 |
| Large problem | 0.23664939 | 8.30159986 | 10.39986283 |

The best function values obtained after running JADE with R2 for 20,000 generations: the weights used in the objective function are set to be $w_t = 1$ for any t, and $w_{ij} = 0.1$ for $j \neq n$ and $w_{ij} = 5$ for $j = n$.

The weights defined in the objective function are set to be $w_t=1$ for any t, and $w_{ij}=0.1$ for $j \neq n$ and $=5$ for $j=n$. The values of imply a much higher priority of the default probability than other transition probabilities.

TPM problems are solved using the conventional PSO and DE/rand/1/bin algorithms, as well as JADE and another self-adaptive DE algorithm, jDE. For JADE and jDE, we used the parameter settings p=5% and c=0.1 for JADE, and $\tau_1=0.1$ and $\tau_2=0.1$ for jDE. Both DE and PSO's performance are significantly affected by the control parameter settings. For a specific problem, their parameters need to be tuned by trial and error. In the case of DE, we test nine different parameter settings with F and CR $\in \{0.2, 0.5, 0.9\}$. Experimental results showed that F=0.5 and CR=0.9 generally leads to the best performance. In the case of PSO, it is not an easy task to systematically study the effect of its three parameters w, $c_1$, and $c_2$. Thus, we compare different parameter settings in the literature, as summarized in Table 5. Experimental results showed that PSO works best with w=0.6, $c_1=c_2=1.7$ in all optimization problems studied. These parameter values will be used for PSO in the comparison with other algorithms.

TABLE 5

A summary of parameter settings of PSO.

| References | (Kennedy, et al., 2001) | (Shi and Eberhart, 1999) | (Carlisle and Dozier, 2001) | (Eberhart and Shi 2000) | (Trelea, 2003) |
|---|---|---|---|---|---|
| w | 1 | 0.9 → 0.4 | 0.729 | 0.729 | 0.6 |
| $c_1$ | 2 | 2 | 2.8w | 1.494 | 1.7 |
| $c_2$ | 2 | 2 | 1.3w | 1.494 | 1.7 |

In all simulations, the population size NP is set to be 5D. All results reported below are calculated based on 30 independent runs of each algorithm.

Table 6 summarizes the mean and standard deviation of the best values obtained by each algorithm after 500 or 2000 generations. Other than the curve of median values, box-and-whisker diagrams are plotted at certain generations for the first and second best algorithms. This is helpful to illustrate the spread of results in 30 independent experiments and indicate the robustness of the algorithms.

TABLE 6

A performance comparison of different evolutionary algorithms after 500 and 2000 generations

|  | Gen | JADE Mean (Std Dev) | jDE Mean (Std Dev) | DE/rand/1/bin Mean (Std Dev) | PSO Mean (Std Dev) |
|---|---|---|---|---|---|
| Case 1 | 500 | 1.31e−002 (6.16e−007) | 1.47e−002 (5.04e−004) | 2.13e−002 (1.37e−003) | 1.91e−002 (1.44e−002) |
|  | 2000 | 1.31e−002 (4.62e−007) | 1.31e−002 (5.01e−007) | 1.33e−002 (3.96e−005) | 1.82e−002 (1.44e−002) |
| Case 2 | 500 | 4.85e−001 (1.56e−003) | 8.96e−001 (6.14e−002) | 1.22e+000 (8.19e−002) | 8.63e−001 (1.95e−001) |
|  | 2000 | 4.81e−001 (3.41e−004) | 4.87e−001 (2.48e−003) | 6.16e−001 (2.22e−002) | 6.94e−001 (1.42e−001) |
| Case 3 | 500 | 5.96e−001 (3.08e−003) | 1.14e+000 (9.61e−002) | 1.55e+000 (7.55e−002) | 1.06e−000 (1.59e−001) |
|  | 2000 | 5.88e−001 (1.00e−003) | 6.03e−001 (5.73e−003) | 7.78e−001 (2.69e−002) | 8.90e−001 (1.36e−001) |
| Case 4 | 500 | 2.42e−001 (5.96e−004) | 4.85e−001 (1.13e−002) | 6.57e−001 (1.49e−002) | 3.60e−001 (4.22e−002) |
|  | 2000 | 2.37e−001 (2.19e−005) | 2.59e−001 (2.85e−003) | 5.16e−001 (1.23e−002) | 3.37e−001 (4.03e−002) |
| Case 5 | 500 | 8.72e−000 (2.74e−002) | 1.30e+001 (2.10e−001) | 1.55e+001 (2.30e−001) | 1.11e+001 (5.36e−001) |
|  | 2000 | 8.43e+000 (1.82e−002) | 9.21e+000 (9.53e−002) | 1.37e+001 (2.14e−001) | 1.05e+001 (5.73e−001) |
| Case 6 | 500 | 1.09e+001 (5.55e−002) | 1.62e+001 (3.29e−001) | 1.89e+001 (2.44e−001) | 1.39e+001 (8.09e−001) |
|  | 2000 | 1.06e+001 (3.57e−002) | 1.18e+001 (2.44e−001) | 1.69e+001 (2.97e−001) | 1.31e+001 (8.04e−001) |

Figure 19A:
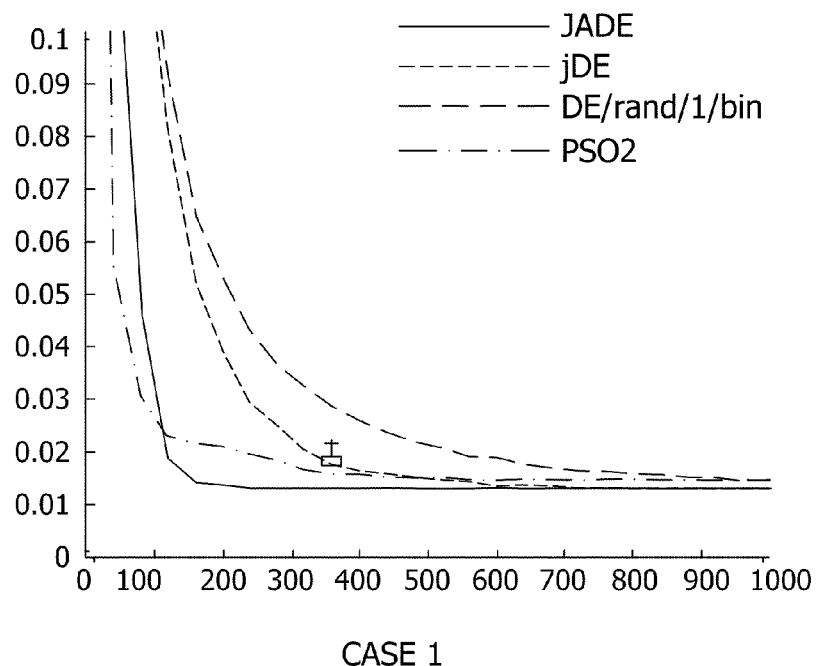
FIG. 19A is a two-dimensional graphical representation of a convergence of evolutionary algorithms in a first case.
Figure 19B:
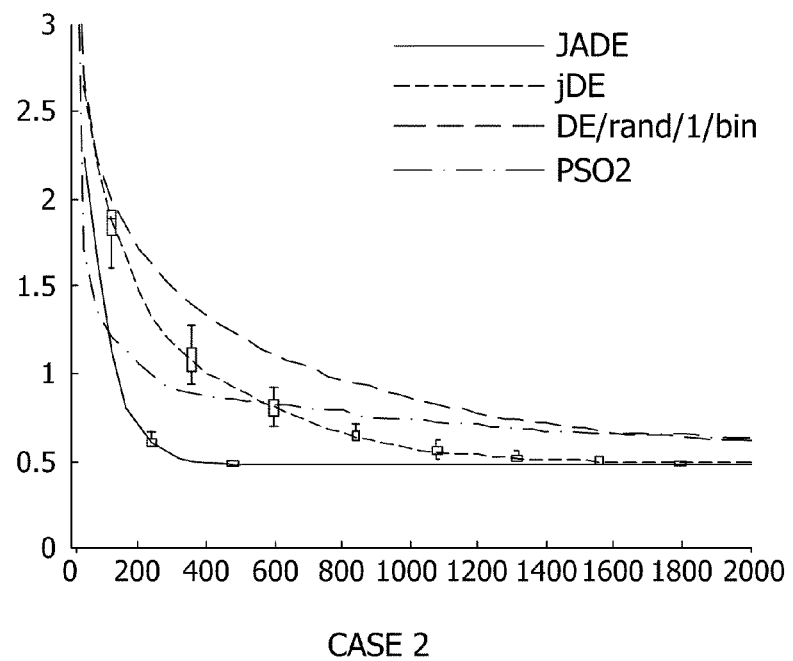
FIG. 19B is a two-dimensional graphical representation of a convergence of evolutionary algorithms in a second case.
Figure 19C:
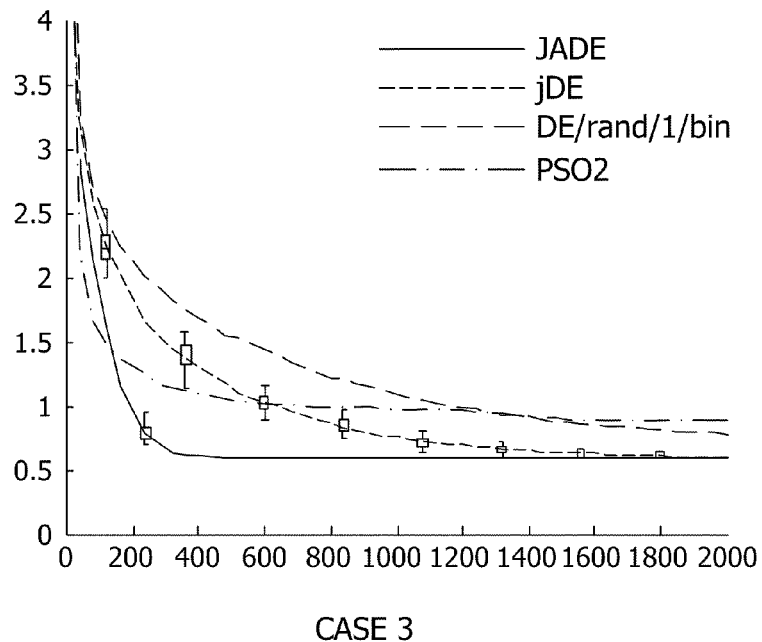
FIG. 19C is a two-dimensional graphical representation of a convergence of evolutionary algorithms in a third case.
Figure 19D:
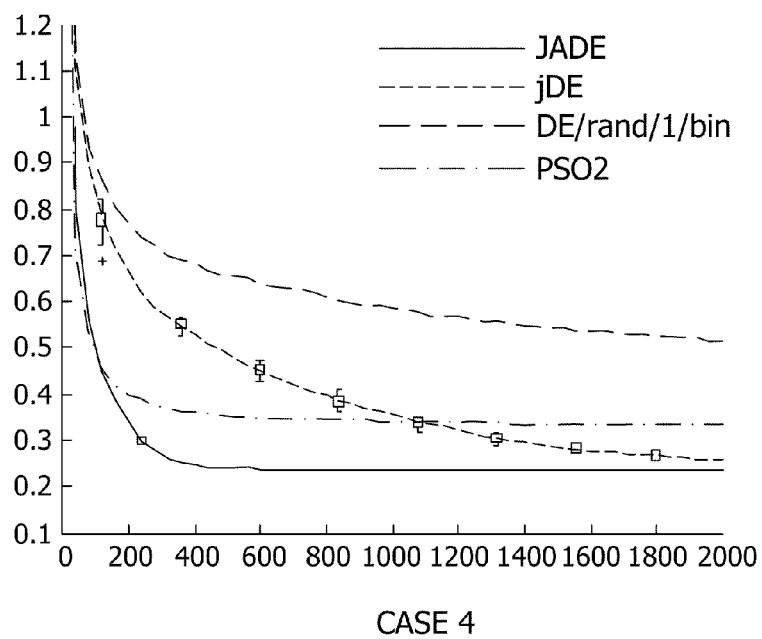
FIG. 19D is a two-dimensional graphical representation of a convergence of evolutionary algorithms in a fourth case.
Figure 19E:
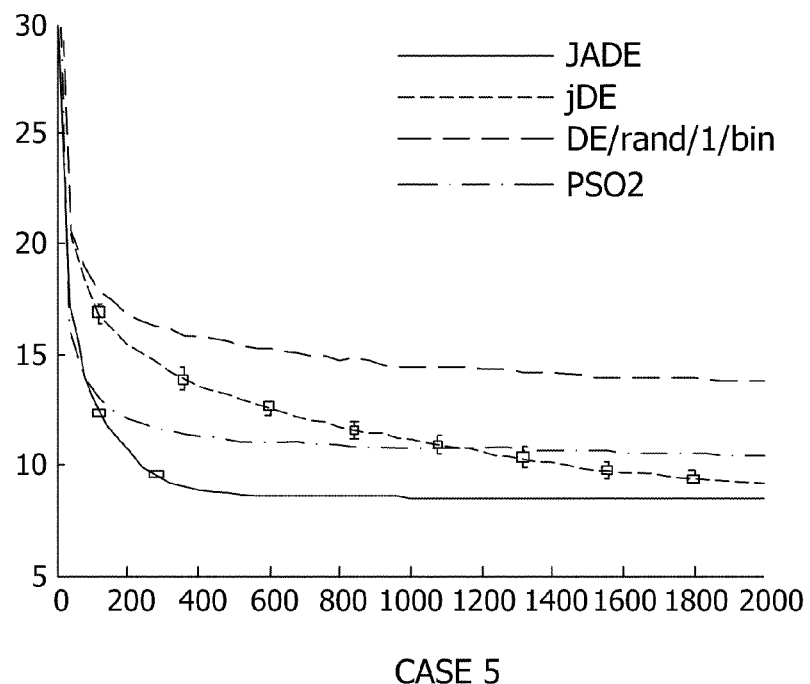
FIG. 19E is a two-dimensional graphical representation of a convergence of evolutionary algorithms in a fifth case.
Figure 19F:
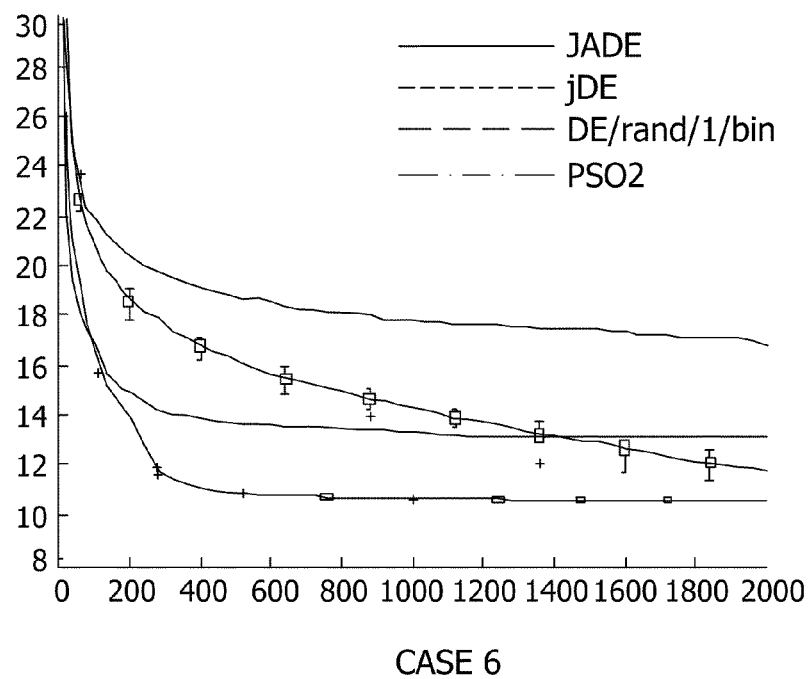
FIG. 19F is a two-dimensional graphical representation of a convergence of evolutionary algorithms in a sixth case.

FIG. 19A is a two-dimensional graphical representation of a convergence of evolutionary algorithms in a first case. FIG. 19B is a two-dimensional graphical representation of a convergence of evolutionary algorithms in a second case. FIG. 19C is a two-dimensional graphical representation of a convergence of evolutionary algorithms in a third case. FIG. 19D is a two-dimensional graphical representation of a convergence of evolutionary algorithms in a fourth case. FIG. 19E is a two-dimensional graphical representation of a convergence of evolutionary algorithms in a fifth case. FIG. 19F is a two-dimensional graphical representation of a convergence of evolutionary algorithms in a sixth case. FIGS. 19A through 19F each include a horizontal axis that represents the number of generations, and a vertical axis that represents the median of function values over 30 independent experiments. The curses illustrated in FIGS. 19A through 19F are plotted at certain generations for the first and second best algorithms.

It is clear from Table 6 and FIGS. 19A through 19F that JADE works best in terms of both convergence rate and robustness for this set of TPM optimization problems. JADE generally obtains near-optimal values in 500 generations, compared to the values achieved after 20,000 generations as summarized in Table 4. As a comparison, jDE usually approaches the optimal value after 2,000 generations (except the 800 generations in Case 1) and the classic DE/rand/1/bin converges even slower. PSO also has difficulty to solve the TPM problems due to premature convergence, although its convergence rate is fastest during the early generations.

We also focuses on the optimization with an exponential error function; i.e., we considered the Case 2 and Case 5 in Table 3. Among the different error functions, the exponential function is relatively easy to compute and treats the discrepancy on a relative scale.

Figure 20A:
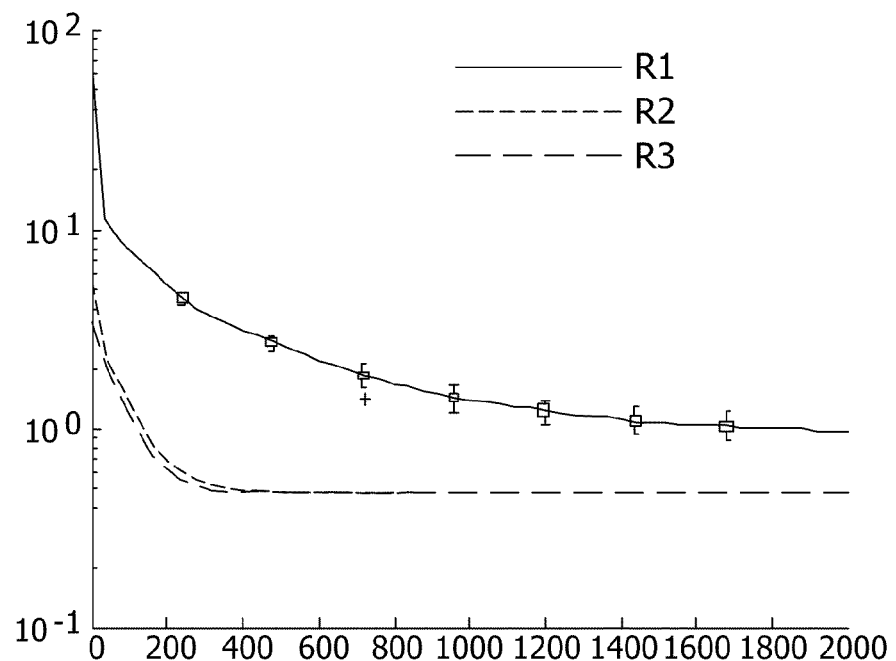
FIG. 20A is a two-dimensional graphical representation of the second case optimized with an exponential error function.
Figure 20B:
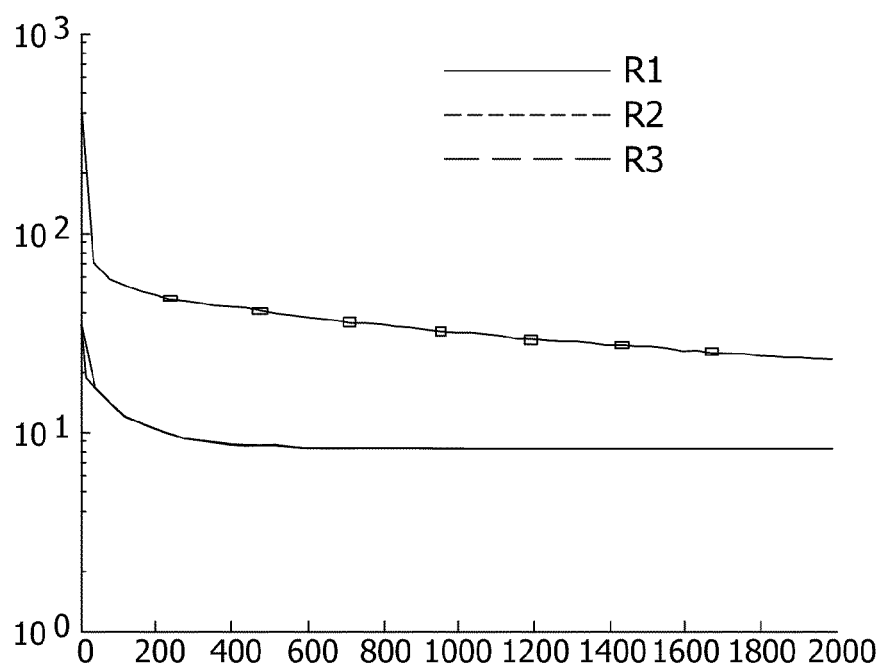
FIG. 20B is a two-dimensional graphical representation of the fifth case optimized with an exponential error function.

FIG. 20A is a two-dimensional graphical representation of the second case optimized with an exponential error function. FIG. 20B is a two-dimensional graphical representation of the fifth case optimized with an exponential error function. FIGS. 20A and 20B show the convergence graphs of optimization based on R1, R2 and R3. It is clear that the representation schema R1 is much worse than R2 and R3 in terms of both the convergence rate and the final performance. The slow convergence rate of R1 is mainly attributed to the increased complexity of the optimization problem because R1 is a many-to-one mapping and biases towards some solutions in the search space, as explained above.

The inferiority of the final performance of R1 can be explained by its undesired inherent constraint that the upper diagonal terms of TPM dominate lower diagonal terms. In other words, the optimal solution is out of the search space of R1 if is does not satisfy this constraint (this is usually the case).

Also, it is interesting to note that R3 dominates R2 at the beginning of the optimization but their difference becomes insignificant (at 5% significance level) after a small number of generations. This stands in contrast to the traditional (not population-based) approach, which produced significantly better results when seeded with an empirical TPM. This is explained by the fact that unlike the traditional approaches, EA algorithms use multiple trajectories to search for an optimum value, thereby rendering a single good starting point less significant.

We also compared the results obtained by the propose methodology (JADE and representation schema R2) or the cohort approach with the empirical data. To be specific, we consider the one-year empirical TPM calculated by a cohort method and the optimized one-year TPM obtained by the proposed methodology. The t-year TPM calculated by raising one-year (empirical or optimized) TPM to the t-th power are compared to the target t-year empirical TPMs.

First, we focused on the default structure over an 8-year period. The choice of 8 years as the horizon over which the optimization is performed is arbitrary and does not limit the generality of our method. For practical applications, users are free to set the time horizon that is most relevant to the application for which the TPMs are required.

Figure 21A:
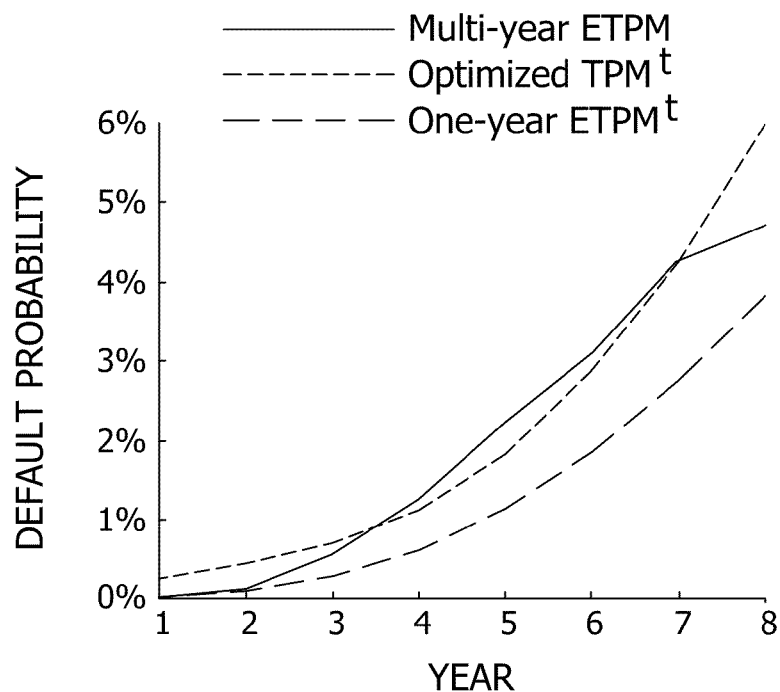
FIG. 21A is a two-dimensional graphical representation of a of a plurality of TPMs illustrating a default probability of an AA rating.
Figure 21B:
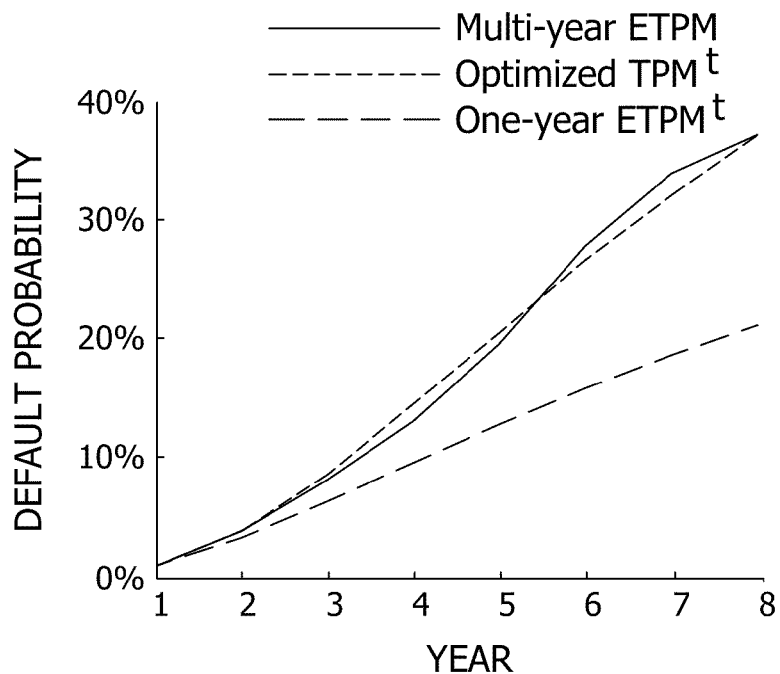
FIG. 21B is a two-dimensional graphical representation of a of a plurality of TPMs illustrating a default probability of a bb rating.
Figure 21C:
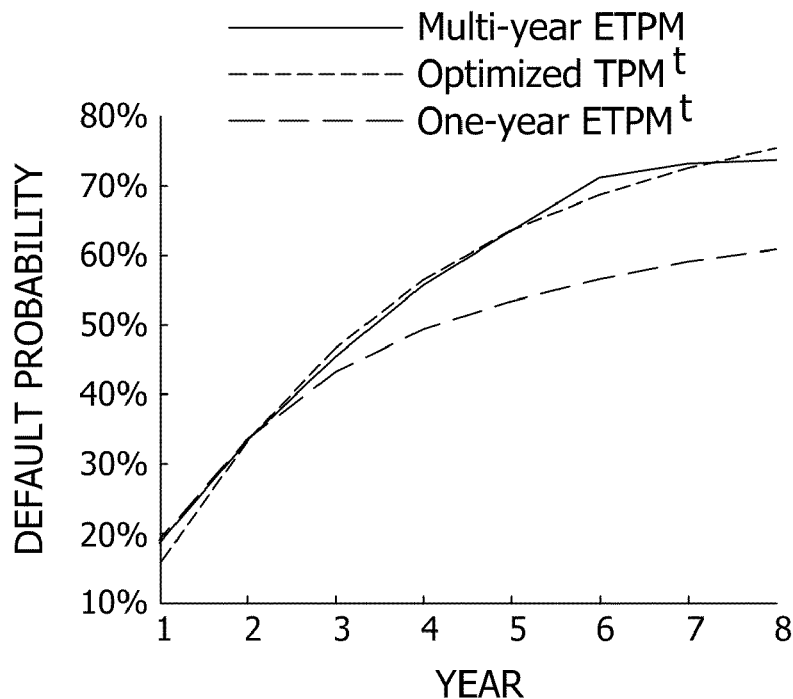
FIG. 21C is a two-dimensional graphical representation of a of a plurality of TPMs illustrating a default probability of a CC rating.
Figure 21D:
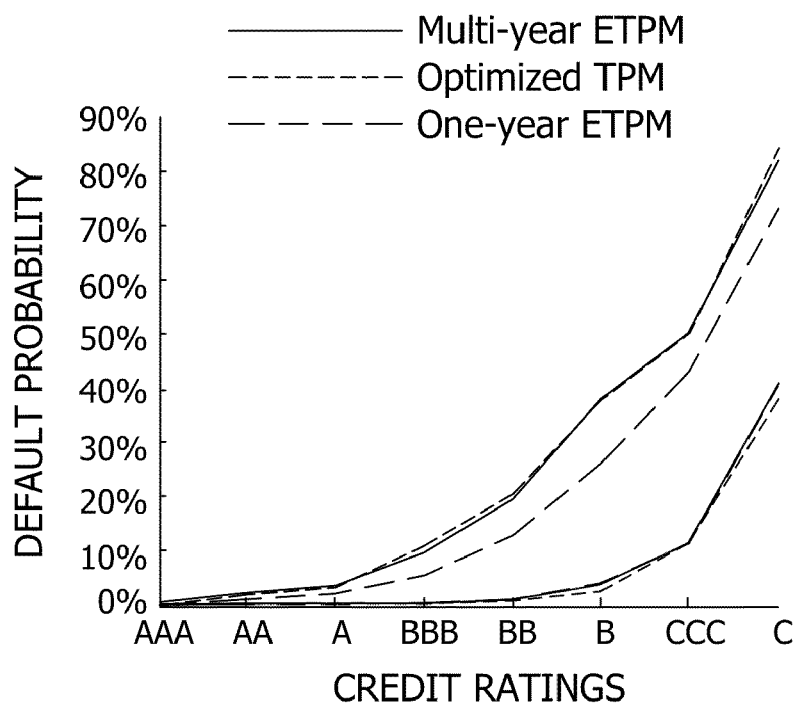
FIG. 21D is a two-dimensional graphical representation of a of a plurality of TPMs illustrating a plurality of default probabilities for a plurality of credit ratings.

FIG. 21A is a two-dimensional graphical representation of a of a plurality of TPMs illustrating a default probability of an AA rating. FIG. 21B is a two-dimensional graphical representation of a of a plurality of TPMs illustrating a default probability of a bb rating. FIG. 21C is a two-dimensional graphical representation of a of a plurality of TPMs illustrating a default probability of a CC rating. FIG. 21D is a two-dimensional graphical representation of a of a plurality of TPMs illustrating a plurality of default probabilities for a plurality of credit ratings. As is shown in FIGS. 21A through 21D, the default probabilities calculated from the cohort TPM are much lower than the empirical default probabilities.

The default structure of the optimized TPM is very close to the empirical curves in nearly every time period. This shows that the forecast bias is greatly reduced by using the optimized TPM as compared to the cohort TPM.

It is also interesting to observe the shape of the default structure. For practical business reasons, the line should be convex for higher quality rate classes (say AA), gradually become straight for intermediate ratings (say BB), and eventually become concave for lower quality ratings (say CC). It is clear from FIGS. 21A through 21C that the optimized TPM satisfies these desired properties very well, although the multi-year empirical TPMs do not consistently exhibit these properties.

Figure 22A:
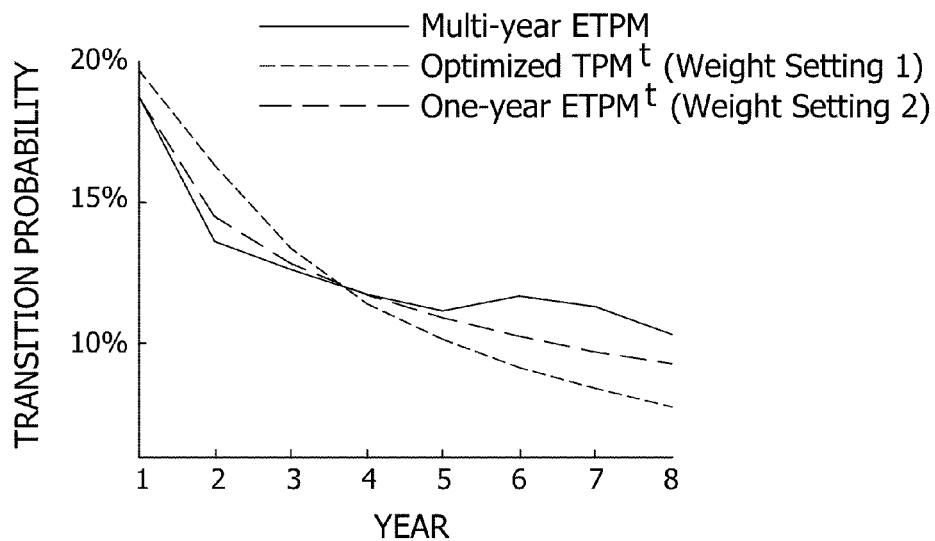
FIG. 22A is a two-dimensional graphical representation of a plurality of TPMs illustrating a transition probability from a BBB+ rating to a BBB rating.
Figure 22B:
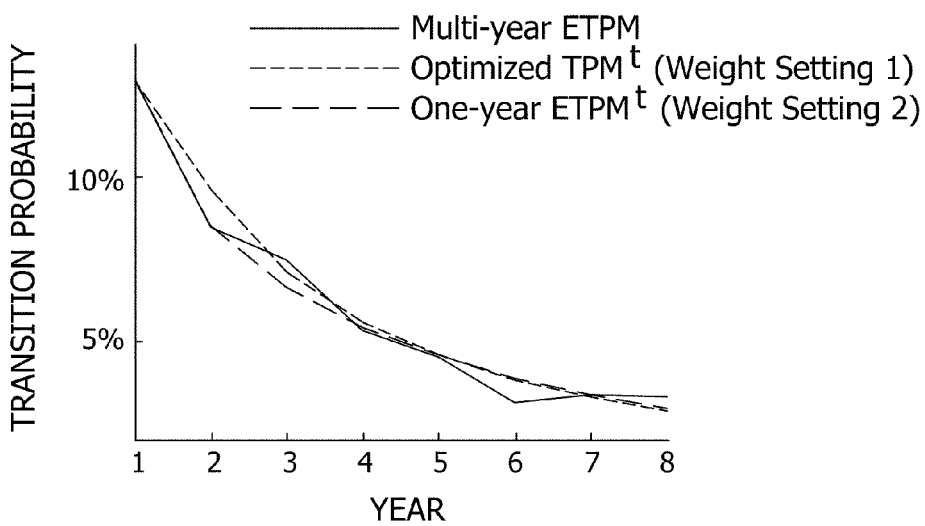
FIG. 22B is a two-dimensional graphical representation of a plurality of TPMs illustrating a transition probability from a B+ rating to a B rating.

FIG. 22A is a two-dimensional graphical representation of a plurality of TPMs illustrating a transition probability from a BBB+ rating to a BBB rating. FIG. 22B is a two-dimensional graphical representation of a plurality of TPMs illustrating a transition probability from a B+ rating to a B rating. The above results are obtained based on the priority of optimizing the default probabilities by setting a much larger weight for them in the objective function. In this context, a weight setting of 1 implies use of a relatively small weight for the transition probability from a rating to adjacent rating. Moreover, a weight setting of 2 implies a relatively large weight for the above transition probability. As expected, the obtained TPM may not have a good prediction for other transitions, e.g., from rating BBB+ to rating BBB. This is the case as shown in FIGS. 22A and 22B. The emphasis can be changed, however, by applying more weight on specific rating categories according to business needs.

For example, we may set $w_{ij}=5$ if $j=n$ or $|i-j| \leq 1$, and $w_{ij}=0.1$ otherwise. This weight setting is useful for emphasizing both the default probability and the transition probabilities to adjacent ratings. The simulation results obtained using this setting (called weight setting 2) are compared to those obtained using the previous setting (called weight setting 1). It is clear from FIGS. 22A and 22B that the transition probabilities predicted by optimized TPM have a better match with empirical data, when their corresponding weights get larger.

As discussed herein, we have considered the problem of computationally smoothing a one-year transition probability matrix by minimizing the discrepancy between predicted later-year TPMs and empirical data over the time horizon of interest. The minimization problem is very complex not only in its non-convex non-separable properties but also in the large number of variables and constraints (desired properties) involved. An efficient representation schema is proposed to transform the constraints into inherent properties and thus greatly simplifies the optimization to a problem with only boundary constraints. Then, a self-adaptive DE algorithm (JADE) is adopted to calculate the optimal solution. Simulation results show that the proposed methodology, the representation schema and the self-adaptive JADE algorithm perform significantly better than other methods in terms of both the convergence speed of the optimization and the final solution obtained. In addition, the default term structure of the optimized TPM is much closer to the empirical curves than the cohort TPM.

Described in detail herein are exemplary embodiments of processes and systems for calculating and smoothing transition probability matrices (TPMs). These processes and systems are applied iteratively over a predetermined number of periods and thereby provide an improve forecasting capability of the calculated matrices. Moreover, these processes and systems include an integrated approach to estimation and smoothing that produce matrices that are "optimal" for forecasting, that is more accurately forecast, an obligor's credit rating migration. Specifically, these processes and systems yield superior forecasts by comparing these optimized forecasts to previously generated TPMs using the cohort method. TPMs obtained using this optimization approach closely match certain key aspects of the empirical data, while exhibiting properties that make them better suited to their most important business applications, and help to provide a contextual benchmark against which certain aspects of the credit cycle can be highlighted and understood.

The processes and systems described herein offer improved flexibility with respect to optimizing. For example, this methodology may be used to estimate a one-year transition matrix that, when raised to successive powers, produces default rates that most closely resemble the cumulative average default rates rather than the empirical transition rates produced with a "push-through-time" method. Moreover, the optimization framework as described herein facilitates sufficient flexibility to serve multiple business applications. For example, the weight parameters as described herein may be adjusted to focus on reducing errors in different segments of the TPMs or to focus solely on defaults, ignoring migration between intervening credit states entirely. Time weight factors can also be adjusted to improve performance over various time horizons. The OTPMs as described herein may be embedded within a variety of pricing models, for example, pricing models that use a discount rate to capture the time value of forecast errors.

While the invention has been described in terms of various specific embodiments, those skilled in the art recognizes that the invention can be practiced with modification within the spirit and scope of the claims.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal languages of the claims.

What is claimed is:

1. A method for generating an optimized transition probability matrix (OTPM), said method performed using a computer coupled to a database, said method comprising:
   storing in the database financial data including obligor credit ratings;
   generating multi-period empirical transition probability matrices (ETPMs) for a selected time horizon using the financial data stored within the database, wherein each generated ETPM includes transition probability values indicating a likelihood that a credit rating of an obligor will migrate from one credit state to another credit state during a time period included within the selected time horizon, the transition probability values included within the generated ETPMs are defined as target ETPM values;
   generating a mathematical expression to minimize a difference between target ETPM values and candidate OTPM values, wherein the mathematical expression is generated using an objective function including at least one of a probit transform function and an exponential function, and by applying predetermined constraints to the objective function;
   calculating the OTPM from the generated mathematical expression and the financial data stored within the database, wherein the calculated OTPM includes a first set of optimized transition probability values for predicting a likelihood that a credit rating of an obligor will migrate from one credit state to another credit state during a first time interval in the future, wherein the calculating is performed by the computer; and
   predicting the likelihood that the credit rating of the obligor will migrate from one credit state to another credit state during the first time interval based at least in part on the calculated OTPM.

2. A method in accordance with claim 1 wherein generating a mathematical expression further comprises generating a constrained optimization problem by applying the predetermined constraints to the objective function.

3. A method in accordance with claim 2 further comprising creating a representation schema for the constrained optimization problem that satisfies the predetermined constraints.

4. A method in accordance with claim 3 further comprising:
optimizing the constrained optimization problem based on the representation schema using at least one of a nonlinear programming method, an evolutionary algorithm method, and a particle swarm optimization method.

5. A method in accordance with claim 1 further comprising:
calculating additional sets of optimized transition probability values by raising the calculated OTPM to successive powers wherein each successive power represents a subsequent future time interval.

6. A method in accordance with claim 5 wherein calculating additional sets of optimized transition probability values comprises calculating additional sets of optimized transition probability values by raising the calculated OTPM to successive powers wherein each successive power represents a subsequent future time interval and each additional set of optimized transition probability values predicts a likelihood that a credit rating of an obligor will migrate from one credit state to another credit state during the corresponding future time interval.

7. A method in accordance with claim 1 further comprising:
selecting a business or geographical sector for creating the ETPMs, wherein the generated ETPMs and the calculated OTPM relate to the selected business sector or selected geographical sector.

8. A method in accordance with claim 1 further comprising:
selecting a time horizon for creating the ETPMs, wherein the time horizon includes a plurality of historical years, and each multi-period ETPM is for a one-year historical time period during the time horizon.

9. A method in accordance with claim 1 further comprising:
selecting a business or geographical sector for creating the ETPMs;
selecting a time horizon for creating the ETPMs; and
retrieving financial data from the database for creating the ETPMs, wherein the retrieved financial data includes obligor credit ratings for obligors included within the selected sector during the selected time horizon.

10. A method in accordance with claim 9 wherein generating multi-period ETPMs comprises:
selecting a sampling technique for creating the ETPMs, wherein the sampling technique includes either overlapping or non-overlapping sampling.

11. A method in accordance with claim 1 wherein generating multi-period ETPMs comprises:
retrieving financial data from a database for creating the ETPMs, wherein the retrieved financial data includes obligor credit ratings for obligors included within a selected sector during the selected time horizon; and
generating the ETPMs for the selected sector based on the retrieved financial data and a selected sampling technique, wherein the generated ETPMs are based purely on known historical financial data for the selected sector and the selected time horizon.

12. A method in accordance with claim 1 wherein calculating the OTPM comprises calculating an optimized transition probability value for each of a plurality of credit states, wherein each value indicates a likelihood that a credit rating of an obligor will migrate from one credit state included within the plurality of credit states to another credit state included within the plurality of credit states.

13. A method in accordance with claim 1 wherein selecting an objective function comprises:
selecting an objective function including a probit transform function, wherein the probit transform function is defined by $$f = |\Phi^{-1}[(y+\epsilon)/2 - \Phi^{-1}(x+\epsilon)/2]|$$

wherein the variable "x" is defined as a target transition probability value in the ETPMs, the variable "y" is defined as a candidate transition probability value in the OTPM, and $\epsilon$ is an adder used to comply with the robustness property when the value of x is zero.

14. A method in accordance with claim 1 wherein selecting an objective function comprises:
selecting an objective function including an exponential function, wherein the exponential function is defined by $$f = (e^{|y-x|} - 1)/e^x$$

wherein the variable "x" is defined as a target transition probability value in the ETPMs, and the variable "y" is defined as a candidate transition probability value in the OTPM.

15. A method in accordance with claim 1 wherein generating a mathematical expression comprises:
generating a mathematical expression to minimize a difference between target ETPM values and candidate OTPM values by applying predetermined constraints to the selected objective function, wherein the predetermined constraints include at least one of strict equality constraints, monotonic decreasing property constraints, and monotonic increasing rating categories constraints.

16. A method in accordance with claim 1 wherein generating a mathematical expression comprises generating the following mathematical expression for calculating the OTPM:

$$\operatorname*{Min}_{M} \sum_{t=1}^{T} \sum_{i=1}^{N} \sum_{j=1}^{N} w_t \, w_{ij} \left[ e^{|m_{t,ij} - m'_{t,ij}|} - 1 \right] / e^{m'_{t,ij}}$$

wherein, $m_{t,ij}$ represents a cell in the $i^{th}$ row and $j^{th}$ column of $M_t$, and $m'_{t,ij}$ represents a cell in the $i^{th}$ row and $j^{th}$ column of $M'_t$, and $w_t$ represents an optimization weight for $t^{th}$ year, and $w_{ij}$ represents an optimization weight for transition probability from $i^{th}$ to $j^{th}$ rating categories, and $M_t$ represents $t^{th}$ year optimized TPM, and $M'_t$ represents $t^{th}$ year empirical TPM.

17. A method in accordance with claim 1 wherein generating a mathematical expression comprises generating the following mathematical expression for calculating the OTPM:

$$\operatorname*{Min}_{M} \sum_{t=1}^{T} \sum_{i=1}^{N} \sum_{j=1}^{N} w_t \, w_{ij} |\Phi^{-1}[(m_{t,ij} + \varepsilon)/2] - \Phi^{-1}[(m'_{t,ij} + \varepsilon)/2]|$$

wherein, $m_{t,ij}$ represents a cell in the $i^{th}$ row and $j^{th}$ column of $M_t$, and $m'_{t,ij}$ represents a cell in the $i^{th}$ row and $j^{th}$ column of $M'_t$, and $w_t$ represents an optimization weight for $t^{th}$ year, and $w_{ij}$ represents an optimization weight for transition probability from $i^{th}$ to $j^{th}$ rating categories, and $M_t$ represents $t^{th}$ year optimized TPM, and $M'_t$ represents $t^{th}$ year empirical TPM, and $\epsilon$ is an adder used to comply with the robustness property when the value of x is zero.

18. A system for generating an optimized transition probability matrix (OTPM), said system comprising:
a computer comprising a processor for executing computer-readable instructions, said computer configured to:

store financial data including obligor credit ratings within a database;

generate multi-period empirical transition probability matrices (ETPMs) for a selected time horizon using the financial data stored within the database, wherein each generated ETPM includes transition probability values indicating a likelihood that a credit rating of an obligor will migrate from one credit state to another credit state during a time period included within the selected time horizon, the transition probability values included within the generated ETPMs are defined as target ETPM values;

generate a mathematical expression to minimize a difference between target ETPM values and candidate OTPM values, wherein the mathematical expression is generated using an objective function including at least one of a probit transform function and an exponential function, and by applying predetermined constraints to the objective function; and calculate the OTPM from the generated mathematical expression and the financial data stored within the database, wherein the calculated OTPM includes a first set of optimized transition probability values for predicting a likelihood that a credit rating of an obligor will migrate from one credit state to another credit state during a first time interval in the future.

19. A system in accordance with claim 18 wherein said computer is further configured to generate a constrained optimization problem by applying the predetermined constraints to the objective function.

20. A system in accordance with claim 19 wherein said computer is further configured to create a representation schema for the constrained optimization problem that satisfies the predetermined constraints.

21. A system in accordance with claim 20 wherein said computer is further configured to optimize the constrained optimization problem based on the representation schema using at least one of a nonlinear programming method, an evolutionary algorithm method, and a particle swarm optimization method.

22. A system in accordance with claim 18 wherein said computer is further configured to:
calculate additional sets of optimized transition probability values by raising the calculated OTPM to successive powers wherein each successive power represents a subsequent future time interval.

23. A system in accordance with claim 22 wherein each additional set of optimized transition probability values predicts a likelihood that a credit rating of an obligor will migrate from one credit state to another credit state during the corresponding future time interval.

24. A system in accordance with claim 18 wherein said computer is further configured to:
receive a selected business or geographical sector for creating the ETPMs, wherein the generated ETPMs and the calculated OTPM relate to the selected business sector or selected geographical sector.

25. A system in accordance with claim 18 wherein said computer is further configured to:
receive a selected time horizon for creating the ETPMs, wherein the time horizon includes a plurality of historical years, and each multi-period ETPM is for a one-year historical time period during the time horizon.

26. A system in accordance with claim 18 wherein said computer is further configured to:
receive a selected business or geographical sector for creating the ETPMs;
receive a selected time horizon for creating the ETPMs; and retrieve financial data from the database for creating the ETPMs, wherein the retrieved financial data includes obligor credit ratings for obligors included within the selected sector during the selected time horizon.

27. A system in accordance with claim 18 wherein said computer is further configured to generate multi-period ETPMs by automatically selecting a sampling technique for creating the ETPMs, wherein the sampling technique includes either overlapping or non-overlapping sampling.

28. A system in accordance with claim 18 wherein said computer is further configured to generate multi-period ETPMs by:
retrieving financial data from said database for creating the ETPMs, wherein the retrieved financial data includes obligor credit ratings for obligors included within a selected sector during the selected time horizon; and
generating the ETPMs for the selected sector based on the retrieved financial data and a selected sampling technique, wherein the generated ETPMs are based purely on known historical financial data for the selected sector and the selected time horizon.

29. A system in accordance with claim 18 wherein said computer is further configured to calculate an optimized transition probability value for each of a plurality of credit states, wherein each value indicates a probability that a credit rating of an obligor will migrate from one credit state included within the plurality of credit states to another credit state included within the plurality of credit states.

30. A system in accordance with claim 18 wherein said computer is further configured to select an objective function including a probit transform function, wherein the probit transform function is defined by $$f = |\Phi^{-1}[(y+\epsilon)/2 - \Phi^{-1}(x+\epsilon)/2]|$$

wherein the variable "x" is defined as a target transition probability value in the ETPMs, the variable "y" is defined as a candidate transition probability value in the OTPM, and $\epsilon$ is an adder used to comply with the robustness property when the value of x is zero.

31. A system in accordance with claim 18 wherein said computer is further configured to select an objective function including an exponential function, wherein the exponential function is defined by $$f = (e^{|y-x|} - 1)/e^x$$

wherein the variable "x" is defined as a target transition probability value in the ETPMs, and the variable "y" is defined as a candidate transition probability value in the OTPM.

32. A system in accordance with claim 18 wherein said computer is further configured to generate a mathematical expression to minimize a difference between target ETPM values and candidate OTPM values by applying predetermined constraints to the selected objective function, wherein the predetermined constraints include at least one of strict equality constraints, monotonic decreasing property constraints, and monotonic increasing rating categories constraints.

33. A system in accordance with claim 18 wherein said computer is further configured to calculate the OTPM using the following mathematical expression:

$$\min_M \sum_{t=1}^{T} \sum_{i=1}^{N} \sum_{j=1}^{N} w_t \, w_{ij} \left[ e^{|m_{t,ij} - m'_{t,ij}|} - 1 \right] / e^{m'_{t,ij}}$$

wherein, $m_{t,ij}$ represents a cell in the $i^{th}$ row and $j^{th}$ column of $M_t$, and $m'_{t,ij}$ represents a cell in the $i^{th}$ row and $j^{th}$ column of $M'_t$, and $w_t$ represents an optimization weight for $t^{th}$ year, and $w_{ij}$ represents an optimization weight for transition probability from $i^{th}$ to $j^{th}$ rating categories, and $M_t$ represents $t^{th}$ year optimized TPM, and $M'_t$ represents $t^{th}$ year empirical TPM.

34. A system in accordance with claim 18 wherein said computer is further configured to calculate the OTPM using the following mathematical expression:

$$\underset{M}{\text{Min}} \sum_{t=1}^{T} \sum_{i=1}^{N} \sum_{j=1}^{N} w_t, w_{ij} |\Phi^{-1}[(m_{t,ij}+\varepsilon)/2] - \Phi^{-1}[(m'_{t,ij}+\varepsilon)/2]|$$

wherein, $m_{t,ij}$ represents a cell in the $i^{th}$ row and $j^{th}$ column of $M_t$, and $m'_{t,ij}$ represents a cell in the $i^{th}$ row and $j^{th}$ column of $M'_t$, and $w_t$ represents an optimization weight for $t^{th}$ year, and $w_{ij}$ represents an optimization weight for transition probability from $i^{th}$ to $j^{th}$ rating categories, and $M_t$ represents $t^{th}$ year optimized TPM, and $M'_t$ represents $t^{th}$ year empirical TPM, and $\epsilon$ is an adder used to comply with the robustness property when the value of x is zero.

35. A non-transitory computer readable medium comprising instructions thereon, said instructions configured to instruct a computer to generate an optimized transition probability matrix (OTPM), said instructions comprising at least one code segment that:
   stores in a database financial data including obligor credit ratings;
   generates multi-period empirical transition probability matrices (ETPMs) for a selected time horizon using the financial data stored within the database, wherein each generated ETPM includes transition probability values indicating a likelihood that a credit rating of an obligor will migrate from one credit state to another credit state during a time period included within the selected time horizon, the transition probability values included within the generated ETPMs are defined as target ETPM values;
   generates a mathematical expression to minimize a difference between target ETPM values and candidate OTPM values, wherein the mathematical expression is generated using an objective function including at least one of a probit transform function and an exponential function, and by applying predetermined constraints to the objective function; and
   calculates the OTPM from the generated mathematical expression and the financial data stored within the database, wherein the calculated OTPM includes a first set of optimized transition probability values for predicting a likelihood that a credit rating of an obligor will migrate from one credit state to another credit state during a first time interval in the future.

36. A non-transitory computer readable medium in accordance with claim 35 further comprising instructions comprising at least one code segment that generates a constrained optimization problem by applying the predetermined constraints to the objective function.

37. A non-transitory computer readable medium in accordance with claim 36 further comprising instructions comprising at least one code segment that creates a representation schema for the constrained optimization problem that satisfies the predetermined constraints.

38. A non-transitory computer readable medium in accordance with claim 37 further comprising instructions comprising at least one code segment that optimizes the constrained optimization problem based on the representation schema using at least one of a nonlinear programming method, an evolutionary algorithm method, and a particle swarm optimization method.

39. A non-transitory computer readable medium in accordance with claim 35 further comprising instructions comprising at least one code segment that calculates additional sets of optimized transition probability values by raising the calculated OTPM to successive powers wherein each successive power represents a subsequent future time interval.

40. A non-transitory computer readable medium in accordance with claim 39 wherein each additional set of optimized transition probability values predicts a likelihood that a credit rating of an obligor will migrate from one credit state to another credit state during the corresponding future time interval.

41. A non-transitory computer readable medium in accordance with claim 35 further comprising instructions comprising at least one code segment that receives a selected business or geographical sector for creating the ETPMs, wherein the generated ETPMs and the calculated OTPM relate to the selected business sector or selected geographical sector.

42. A non-transitory computer readable medium in accordance with claim 35 further comprising instructions comprising at least one code segment that receives a selected time horizon for creating the ETPMs, wherein the time horizon includes a plurality of historical years, and each multi-period ETPM is for a one-year historical time period during the time horizon.

43. A non-transitory computer readable medium in accordance with claim 35 further comprising instructions comprising at least one code segment that:
   receives a selected business or geographical sector for creating the ETPMs;
   receives a selected time horizon for creating the ETPMs; and
   retrieves financial data from the database for creating the ETPMs, wherein the retrieved financial data includes obligor credit ratings for obligors included within the selected sector during the selected time horizon.

44. A non-transitory computer readable medium in accordance with claim 35 further comprising instructions comprising at least one code segment that selects a sampling technique for creating the ETPMs, wherein the sampling technique includes either overlapping or non-overlapping sampling.

45. A non-transitory computer readable medium in accordance with claim 35 further comprising instructions comprising at least one code segment that:
   retrieves financial data from the database for creating the ETPMs, wherein the retrieved financial data includes obligor credit ratings for obligors included within a selected sector during the selected time horizon; and
   generates the ETPMs for the selected sector based on the retrieved financial data and a selected sampling technique, wherein the generated ETPMs are based purely on known historical financial data for the selected sector and the selected time horizon.

46. A non-transitory computer readable medium in accordance with claim 35 further comprising instructions comprising at least one code segment that calculates an optimized transition probability value for each of a plurality of credit states, wherein each value indicates a likelihood that a credit rating of an obligor will migrate from one credit state included within the plurality of credit states to another credit state included within the plurality of credit states.

47. A non-transitory computer readable medium in accordance with claim 35 further comprising instructions comprising at least one code segment that selects an objective function including a probit transform function, wherein the probit transform function is defined by $$f = |\Phi^{-1}[(y+\epsilon)/2 - \Phi^{-1}(x+\epsilon)/2]|$$

wherein the variable "x" is defined as a target transition probability value in the ETPMs, the variable "y" is defined as a candidate transition probability value in the OTPM, and $\epsilon$ is an adder used to comply with the robustness property when the value of x is zero.

48. A non-transitory computer readable medium in accordance with claim 35 further comprising instructions comprising at least one code segment that selects an objective function including an exponential function, wherein the exponential function is defined by $$f = (e^{|y-x|} - 1)/e^x$$

wherein the variable "x" is defined as a target transition probability value in the ETPMs, and the variable "y" is defined as a candidate transition probability value in the OTPM.

49. A non-transitory computer readable medium in accordance with claim 35 further comprising instructions comprising at least one code segment that:
generates a mathematical expression to minimize a difference between target ETPM values and candidate OTPM values by applying predetermined constraints to the selected objective function, wherein the predetermined constraints include at least one of strict equality constraints, monotonic decreasing property constraints, and monotonic increasing rating categories constraints.

50. A non-transitory computer readable medium in accordance with claim 35 further comprising instructions comprising at least one code segment that calculates the OTPM using the following mathematical expression:

$$\min_{M} \sum_{t=1}^{T} \sum_{i=1}^{N} \sum_{j=1}^{N} w_t, w_{ij} \left[ e^{|m_{t,ij} - m'_{t,ij}|} - 1 \right] / e^{m'_{t,ij}}$$

wherein, $m_{t,ij}$ represents a cell in the $i^{th}$ row and $j^{th}$ column of $M_t$, and $m'_{t,ij}$ represents a cell in the $i^{th}$ row and $j^{th}$ column of $M'_T$, and $w_t$ represents an optimization weight for $t^{th}$ year, and $w_{ij}$ represents an optimization weight for transition probability from $i^{th}$ to $j^{th}$ rating categories, and $M_t$ represents $t^{th}$ year optimized TPM, and $M'_T$ represents $t^{th}$ year empirical TPM.

51. A non-transitory computer readable medium in accordance with claim 35 further comprising instructions comprising at least one code segment that calculates the OTPM using the following mathematical expression:

$$\min_{M} \sum_{t=1}^{T} \sum_{i=1}^{N} \sum_{j=1}^{N} w_t, w_{ij} |\Phi^{-1}[(m_{t,ij} + \varepsilon)/2] - \Phi^{-1}[(m'_{t,ij} + \varepsilon)/2]|$$

wherein, $m_{t,ij}$ represents a cell in the $i^{th}$ row and $j^{th}$ column of $M_t$, and $m'_{t,ij}$ represents a cell in the $i^{th}$ row and $j^{th}$ column of $M'_t$, and $w_t$ represents an optimization weight for $t^{th}$ year, and $w_{ij}$ represents an optimization weight for transition probability from $i^{th}$ to $j^{th}$ rating categories, and $M_t$ represents $t^{th}$ year optimized TPM, and $M'_t$ represents $t^{th}$ year empirical TPM, and $\varepsilon$ is an adder used to comply with the robustness property when the value of x is zero.

* * * * *